US012730072B1

(12) United States Patent
Schwartz

(10) Patent No.: US 12,730,072 B1
(45) Date of Patent: Sep. 8, 2026

(54) SYSTEMS AND METHODS USING PHOTONIC STRUCTURE SUBSTRATES

(71) Applicant: Ultima Genomics, Inc., Fremont, CA (US)

(72) Inventor: Osip Schwartz, Lafayette, CA (US)

(73) Assignee: ULTIMA GENOMICS, INC., Fremont, CA (US)

( * ) Notice: Subject to any disclaimer, the term of this patent is extended or adjusted under 35 U.S.C. 154(b) by 59 days.

(21) Appl. No.: 18/910,815

(22) Filed: Oct. 9, 2024

Related U.S. Application Data

(60) Provisional application No. 63/543,147, filed on Oct. 9, 2023.

(51) Int. Cl.
*G01N 21/64* (2006.01)

(52) U.S. Cl.
CPC ... *G01N 21/648* (2013.01); *G01N 2201/0873* (2013.01)

(58) Field of Classification Search
CPC ..................... G01N 21/648; G01N 2201/0873
See application file for complete search history.

(56) References Cited

U.S. PATENT DOCUMENTS

2003/0049693 A1* 3/2003 Goh ................ G01N 33/54373 356/322
2005/0017191 A1* 1/2005 Montagu ................ G02B 21/16 250/393
2007/0035818 A1* 2/2007 Bahatt .................... G01N 21/76 359/366
2009/0146081 A1* 6/2009 Stark ...................... B82Y 35/00 250/493.1
2009/0218514 A1* 9/2009 Klunder ............. G01N 21/6452 250/459.1
2010/0167413 A1* 7/2010 Lundquist ........ G01N 27/44721 436/172
2011/0109891 A1* 5/2011 Farnsworth ......... G03F 7/70825 219/69.11
2011/0278475 A1* 11/2011 Lundquist ........ G01N 27/44721 250/459.1
2012/0229891 A1* 9/2012 Liu .................... G01N 21/6458 359/355
2012/0257197 A1* 10/2012 Feldkhun ........... G01N 21/4795 356/450
2013/0023039 A1* 1/2013 Zaccarin ................ B05D 1/005 435/287.2
2015/0369728 A1* 12/2015 Bahatt ................ G01N 21/6452 356/326
2017/0243994 A1* 8/2017 Dougakiuchi ..... G01N 21/3504
2018/0177401 A1* 6/2018 Yang .................. G01N 21/6458
2019/0219835 A1* 7/2019 Skinner ................ G02B 21/367
2023/0091403 A1* 3/2023 Ilkov ......................... G01J 1/10
2023/0287480 A1* 9/2023 Stern .................... C12Q 1/6825
2024/0361698 A1* 10/2024 Hartgers ................ G03F 7/706
2024/0369486 A1* 11/2024 Rinker .............. G01N 21/6452

* cited by examiner

*Primary Examiner* — Blake C Riddick
(74) *Attorney, Agent, or Firm* — Schmidt Patent Law, Inc.

(57) ABSTRACT

A photonic structure on a substrate, when illuminated with one of multiple predetermined illumination conditions, may transform the illumination light beam(s) to provide optical excitation to a predetermined subset of locations on a substrate. Signals collected from different subsets of locations on the substrate may be processed to yield a high-resolution optical readout.

20 Claims, 30 Drawing Sheets
(4 of 30 Drawing Sheet(s) Filed in Color)

SYSTEMS AND METHODS USING PHOTONIC STRUCTURE SUBSTRATES

CROSS REFERENCE TO RELATED APPLICATIONS

This application claims benefit of priority to U.S. Provisional Patent Application 63/543,147 filed 9 Oct. 2023, which is incorporated herein by reference in its entirety.

BACKGROUND

Biological sample processing has various applications in the fields of molecular biology and medicine (e.g., diagnosis). For example, nucleic acid (e.g., genome) sequencing may provide information that may be used to diagnose a certain condition in a subject and in some cases to determine a subject-specific treatment plan. Sequencing is widely used for molecular biology applications, including nucleic acid vector designs, gene therapy, vaccine design, industrial strain design, and diagnostic verification. Biological sample processing may involve a fluidics system and/or a detection system.

Historically, genome sequencing methods have evolved rapidly towards higher throughput and lower cost per unit of information. Thus, modern sequencing-by-synthesis methods are often powered by high-throughput optical readouts of fluorescence signals from clonal clusters of labeled DNA molecules, with each cluster occupying a site on a substrate. Continuing this improvement will require a progressive, dramatic increase in the density of analyte-containing sites, coupled with a reduction in the volume and occupied surface area of analytes at individual sites.

SUMMARY

The density of analyte-containing sites on a substrate may be increased several orders of magnitude over current methods until the ultimate limit of one DNA strand per site is reached, obviating the need for library amplification. The progressive increase of density faces two main obstacles: the diffraction limit, which hinders the ability to optically address individual sites, and the downward scaling of the amount of light available for signal readout. For example, many current fluorescence-based sequencing methods operate at densities close to the diffraction limit. Further, significant density increase requires an optical system with a resolution below the diffraction limit. A number of super-resolution optical methods allow for imaging at a resolution well below the diffraction limit, such as STED, PALM, STORM, RESOLFT, etc. However, such techniques are orders of magnitude slower than conventional imaging systems and are not suitable for high-throughput sequencing. A family of methods using patterned illumination, such as structured illumination microscopy (SIM), patterned excitation microscopy (PEM), and image scanning microscopy (ISM), enable a resolution improvement up to approximately double the resolution of conventional imaging systems. However, while some structured illumination methods are compatible with high-throughput imaging, the limited resolution improvement makes such methods insufficient for a sustained and significant progression of density increase.

A higher resolution can be achieved in a related group of imaging methods, based on surface plasmon excitations supported by a specially designed substrate. In plasmon SIM (PSIM), for example, illumination light excites plasmon waves at a metal-dielectric interface. The wavelength of the surface waves can be much shorter than the wavelength of light, which enables the creation of an intensity pattern with deep sub-diffraction features. A variant of this method, localized plasmon SIM (LPSIM), uses arrays of plasmon-supporting nanostructures to generate an intensity pattern with sub-diffraction-limited features. However, a major drawback of these methods is that they need a large number of images (each at a different illumination configuration) to reconstruct a high-resolution image, resulting in a smaller throughput.

In addition to increased resolution requirements, the progressive miniaturization of analyte-containing sites is accompanied by a reduction of the number of fluorophores per site, potentially down to the level of a single fluorophore per site. To maintain high signal detection accuracy and low sequencing error rates, the reduction of the number of emitted photons needs to be offset by an increased collection efficiency. To some extent, collection efficiency can be boosted by increasing the numerical aperture of the detection optics. However, the numerical aperture is limited by the refractive index of the immersion fluid, so typically only a moderate improvement can be achieved. Furthermore, the complexity and cost of optical systems increase dramatically when both a high NA and a large field of view (FOV) are required.

Thus, recognized herein is a need for a further improved optical system that enables high-throughput readout of optical signals at deeply sub-wavelength densities, while significantly improving collection efficiency. Such optical systems may be useful for fluorescence-based sequencing methods. In various aspects, the present disclosure provides substrates, optical systems, and detection methods for high-resolution optical readout that addresses at least the above-mentioned needs and problems. The substrates may include photonic structures that enable high-resolution optical readout of analytes bound to the substrate at high densities.

In an aspect, provided is a substrate, comprising: a plurality of predetermined locations configured to immobilize a plurality of analytes; and a photonic structure that is configured to transform one or more illumination light beams of an illumination condition impinging thereon to provide excitation to a subset of the plurality of predetermined locations, whereby: at a first illumination condition, a first subset of the plurality of predetermined locations is provided with a first range of excitation intensities that is higher than a predetermined excitation intensity threshold, wherein a remainder of the plurality of predetermined locations excluding the first subset is provided with a second range of excitation intensities lower than the predetermined excitation intensity threshold, and at a second illumination condition, a second subset of the plurality of predetermined locations is provided with the first range of excitation intensities, wherein a remainder of the plurality of predetermined locations excluding the second subset is provided with the second range of excitation intensities; and wherein the first illumination condition differs from the second illumination condition, and wherein the first subset differs from the second subset.

In some embodiments, the one or more illumination light beams of the illumination condition forms an intensity pattern, wherein the one or more illumination light beams comprise one or more predetermined characteristics selected from the group consisting of an angle of incidence, a wavelength, a spectrum, a polarization, a phase, an amplitude, an intensity, a power, an intensity distribution pattern, an interference pattern, a spatial, angular or spectral distribution of any of said predetermined characteristics, and a combination thereof.

In some embodiments, the illumination condition consists of a single light beam.

In some embodiments, the illumination condition comprises a plurality of light beams.

In some embodiments, the photonic structure comprises a plurality of features corresponding to the plurality of predetermined locations.

In some embodiments, the photonic structure comprises a plurality of features, and wherein the plurality of predetermined locations is different from locations of the plurality of features.

In some embodiments, the plurality of predetermined locations comprises a plurality of predefined analyte binding sites, and wherein each predefined analyte binding site comprises a binder for immobilizing an analyte.

In some embodiments, each predefined analyte binding site is spatially separated from other analyte binding sites of the plurality of predefined analyte binding sites.

In some embodiments, each predefined analyte binding site is smaller than 10 micrometers (μm) in its longest dimension.

In some embodiments, each predefined analyte binding site is larger than 0.01 μm in its smallest dimension.

In some embodiments, a predefined analyte binding site of the plurality of predefined analyte binding sites has a cross-sectional shape of a circle, a square, a rectangle, a line, an oval, a trapezoid, a polygon, or an irregular shape.

In some embodiments, a predefined analyte binding site of the plurality of predefined analyte binding sites comprises a pad, trough, protrusion, or well configured to immobilize an analyte thereon.

In some embodiments, a predefined analyte binding site of the plurality of predefined analyte binding sites has an affinity for the analyte.

In some embodiments, a predefined analyte binding site of the plurality of predefined analyte binding sites has an analyte-binding surface that confers an affinity for the analyte.

In some embodiments, a predefined analyte binding site of the plurality of predefined analyte binding sites comprises a chemical modification.

In some embodiments, a predefined analyte binding site comprises a material having an electrostatic charge.

In some embodiments, the plurality of predetermined locations is configured to immobilize at least $10^6$, at least $10^7$, at least $10^8$, at least $10^9$, at least $10^{10}$, at least $10^{11}$, at least $10^{12}$, at least $10^{13}$, or at least $10^{14}$ analytes or clusters thereon.

In some embodiments, the photonic structure comprises a material having a predetermined refractive index, wherein the material is selected from the group consisting of a metal, a dielectric material, a semiconductor, and a combination thereof.

In some embodiments, the metal comprises aluminum, gold, platinum, copper, or titanium.

In some embodiments, the dielectric material comprises glass, mica, quartz, fused silica, a polymer material, an organic material, a photoresist material, a ceramic material, or a metal oxide.

In some embodiments, the photonic structure comprises a layered structure, a nanopillar array, a nanowell array, a planar waveguide, an optical antenna array, a nanoantenna array, a reflective underlayer, a diffraction grating, a waveguide, a photonic crystal, or a combination thereof.

In some embodiments, the planar waveguide is configured to propagate a guided wave or a surface plasmon wave to the predetermined locations.

In some embodiments, the substrate further comprises one or more additional layers, wherein a layer of the one or more additional layers has a different material than the photonic structure.

In some embodiments, the photonic structure is integral to the plurality of predetermined locations, is layered on top of the plurality of predetermined locations, is layered under the plurality of predetermined locations, or is in contact with the plurality of predetermined locations.

In some embodiments, the substrate has a largest dimension between 0.1 mm and 0.5 m.

In some embodiments, the substrate has a smallest dimension between 0.1 mm and 0.5 m.

In some embodiments, the total surface area of the substrate is between 0.1 $mm^2$ to 0.2 $m^2$.

In some embodiments, the photonic structure occupies 5% to 100% of the total surface area of the substrate.

In some embodiments, the substrate has a depth between 0.1 mm and 50 mm, and the photonic structure spans between 1% to 100% of the full depth.

In some embodiments, the photonic structure occupies 0.1% to 100% of the total volume of the substrate.

In some embodiments, the photonic structure is patterned on the substrate.

In some embodiments, the photonic structure comprises a first plurality of features.

In some embodiments, the photonic structure further comprises a second plurality of features.

In some embodiments, features of the first or second plurality of features are arranged in a periodic pattern.

In some embodiments, the first or second plurality of features is embedded in, coated onto, etched into, or in contact with the plurality of predetermined locations.

In some embodiments, the first or second plurality of features comprises a planar waveguide, a diffraction grating, or a photonic crystal.

In some embodiments, the first or second plurality of features comprises one or more layers, each of the layers comprising a diffraction grating.

In some embodiments, features in the first plurality of features comprise layers separated by a first pitch between 0.1 μm and 10 μm, between 0.2 μm and 5 μm, between 0.3 μm and 3 μm, between 0.5 μm and 2 μm, between 0.7 μm and 1.5 μm, between 0.8 μm and 1.3 μm, or between 0.9 μm and 1.2 μm.

In some embodiments, features in the second plurality of features comprise layers separated by a second pitch that is an integer multiple of the first pitch.

In some embodiments, the first subset and the second subset comprise approximately the same number of predetermined locations.

In some embodiments, the first subset and the second subset overlap at under 90%, 80%, 70%, 60%, 50%, 40%, 30%, 20%, 10%, 5%, or 1% of the plurality of predetermined locations.

In some embodiments, the first subset forms a first periodic arrangement.

In some embodiments, the second subset forms a second periodic arrangement.

In some embodiments, a pitch of the first or second periodic arrangement is less than a predetermined threshold pitch selected from the group consisting of 2 μm, 1 μm, 800 nm, 600 nm, 500 nm, 400 nm, 300 nm, 200 nm, and 100 nm.

In some embodiments, two adjacent predetermined locations of the first subset of the plurality of predetermined locations have a center-to-center distance smaller than 5 μm.

In some embodiments, two adjacent predetermined locations of the second subset of the plurality of predetermined locations have a center-to-center distance smaller than 5 μm.

In some embodiments, two adjacent predetermined locations of the first subset of the plurality of predetermined locations have a center-to-center distance larger than 100 nm.

In some embodiments, two adjacent predetermined locations of the second subset of the plurality of predetermined locations have a center-to-center distance larger than 100 nm.

In some embodiments, each pair of predetermined locations in the first subset or second subset of the plurality of predetermined locations has a center-to-center distance between 125 nm and 500 nm, between 150 nm and 400 nm, between 175 nm and 300 nm, or between 200 nm and 250 nm.

In another aspect, provided is a system, comprising: a substrate comprising: a plurality of predetermined locations configured to immobilize a plurality of analytes; and a photonic structure that is configured to transform one or more illumination light beams of an illumination condition impinging thereon to provide excitation to a subset of the plurality of predetermined locations, whereby: at a first illumination condition, a first subset of the plurality of predetermined locations is provided with a first range of excitation intensities that is higher than a predetermined excitation intensity threshold, wherein a remainder of the plurality of predetermined locations excluding the first subset is provided with a second range of excitation intensities lower than the predetermined excitation intensity threshold, and at a second illumination condition, a second subset of the plurality of predetermined locations is provided with the first range of excitation intensities, wherein a remainder of the plurality of predetermined locations excluding the second subset is provided with the second range of excitation intensities; and wherein the first illumination condition differs from the second illumination condition, and wherein the first subset differs from the second subset. Embodiments of the system may comprise, for example, any suitable embodiment of the substrate as summarized above in the previous aspect.

In some embodiments, the system further comprises an illumination unit and one or more processors in operable communication with the illumination unit, wherein the one or more processors are configured to direct the illumination unit to provide predetermined illumination conditions to the substrate.

In some embodiments, the illumination unit comprises one or more optics components selected from the group consisting of: light patterning optics, a microlens array, a phase control element, a prism, a reflective surface, and combinations thereof.

In some embodiments, the system further comprises one or more data storage devices in operable communication with the one or more processors, wherein the one or more data storage devices store a plurality of configuration instructions of the illumination unit corresponding to the predetermined illumination conditions.

In some embodiments, the system further comprises a detector in optical communication with the substrate, wherein the detector is configured to detect one or more signals from the substrate.

In some embodiments, the system further comprises a fluidics unit in operable communication with the one or more processors, wherein the one or more processors are configured to direct the fluidics unit to dispense a reagent to the substrate to contact an analyte of the plurality of analytes.

In some embodiments, the reagent is a sequencing reagent.

In some embodiments, the system further comprises an actuator operably coupled to the substrate or to the illumination unit, configured to change an excitation pattern produced by the illumination condition on the substrate.

In some embodiments, the substrate is rotatable.

In another aspect, provided is a method comprising: a. providing a substrate comprising (i) a plurality of predetermined locations comprising a plurality of analytes immobilized thereto and (ii) a photonic structure that is configured to transform one or more illumination light beams of an illumination condition impinging thereon to provide excitation to a subset of the plurality of predetermined locations; b. at a first time point, receiving a first illumination condition by the substrate and, via transformation of one or more first illumination light beams of the first illumination condition by the photonic structure, providing a first subset of the plurality of predetermined locations with a first range of excitation intensities that is higher than a predetermined excitation intensity threshold, wherein a remainder of the plurality of predetermined locations excluding the first subset is provided with a second range of excitation intensities lower than the predetermined excitation intensity threshold; and c. at a second time point, receiving a second illumination condition by the substrate and, via transformation of one or more second illumination light beams of the second illumination condition by the photonic structure, providing a second subset of the plurality of predetermined locations with the first range of excitation intensities, wherein a remainder of the plurality of predetermined locations excluding the second subset is provided with the second range of excitation intensities, wherein the first illumination condition differs from the second illumination condition, and wherein the first subset differs from the second subset. Embodiments of the method may utilize, for example, any suitable embodiment of the substrate as summarized above in the previous aspects.

In some embodiments, the method further comprises, subsequent to (b), detecting first optical signals from a first subset of the plurality of analytes immobilized at the first subset of the plurality of predetermined locations, and subsequent to (c), detecting second optical signals from a second subset of the plurality of analytes immobilized at the second subset of the plurality of predetermined locations.

In some embodiments, the method further comprises generating an optical readout based on the first optical signals and the second optical signals.

In some embodiments, the first optical signals or second optical signals are fluorescent signals.

In some embodiments, the first optical signals and second optical signals are detected at identical or substantially identical wavelengths.

In some embodiments, the first optical signals and second optical signals are detected at different wavelengths.

In some embodiments, the method further comprises redistributing an emission angle of the first optical signals via the photonic structure, thereby enhancing the optical readout.

In some embodiments, the plurality of analytes comprises a nucleic acid molecule, and the method further comprises processing the first optical signals and the second optical signals to generate a sequencing read of the nucleic acid molecule.

In some embodiments, the method further comprises rotating the substrate while detecting signals from the substrate.

In some embodiments, the substrate comprises the substrate of any one of the above embodiments.

In some embodiments, the method is performed using the system of any one the above embodiments.

In some embodiments, the first time point and the second time point are the same.

In some embodiments, the first time point and the second time point are different.

In some embodiments, the plurality of analytes comprises a plurality of biological analytes.

In some embodiments, the plurality of biological analytes comprises a plurality of nucleic acid molecules.

In another aspect, provided is a method of making a substrate as in any of the substrate embodiments summarized above in the previous aspects. The method comprises generating the photonic structure in or on the substrate via a lithography method.

In some embodiments, the lithography method comprises etching, reactive (and deep reactive) ion etching, ion milling, spin-coating, ink-jetting, dip pen nanolithography, contact printing, grayscale lithography, holographic (or interference) lithography, plasma etching, wet etching, chemical vapor deposition, atomic layer deposition (ALD), photolithography, contact photolithography, nanoimprint lithography (NIL), extreme ultraviolet lithography, electron beam lithography, focused ion beam lithography, plasmonic direct write lithography, direct write laser lithography, multiple e beam lithography, i-line stepper/scanner lithography, deep ultraviolet (DUV) lithography, extreme ultraviolet (EUV) lithography, X-ray lithography, micro/nano molding, injection compression molding, hot embossing, or a combination thereof.

Another aspect of the present disclosure provides a system comprising one or more computer processors and computer memory coupled thereto. The computer memory comprises machine executable code that, upon execution by the one or more computer processors, implements any of the methods above or elsewhere herein. Another aspect of the present disclosure provides a non-transitory computer readable medium comprising machine executable code that, upon execution by one or more computer processors, implements any of the methods above or elsewhere herein.

Additional aspects and advantages of the present disclosure will become readily apparent to those skilled in this art from the following detailed description, wherein only illustrative instances of the present disclosure are shown and described. As will be realized, the present disclosure is capable of other and different instances, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein) of which:

DETAILED DESCRIPTION

Figure 1:
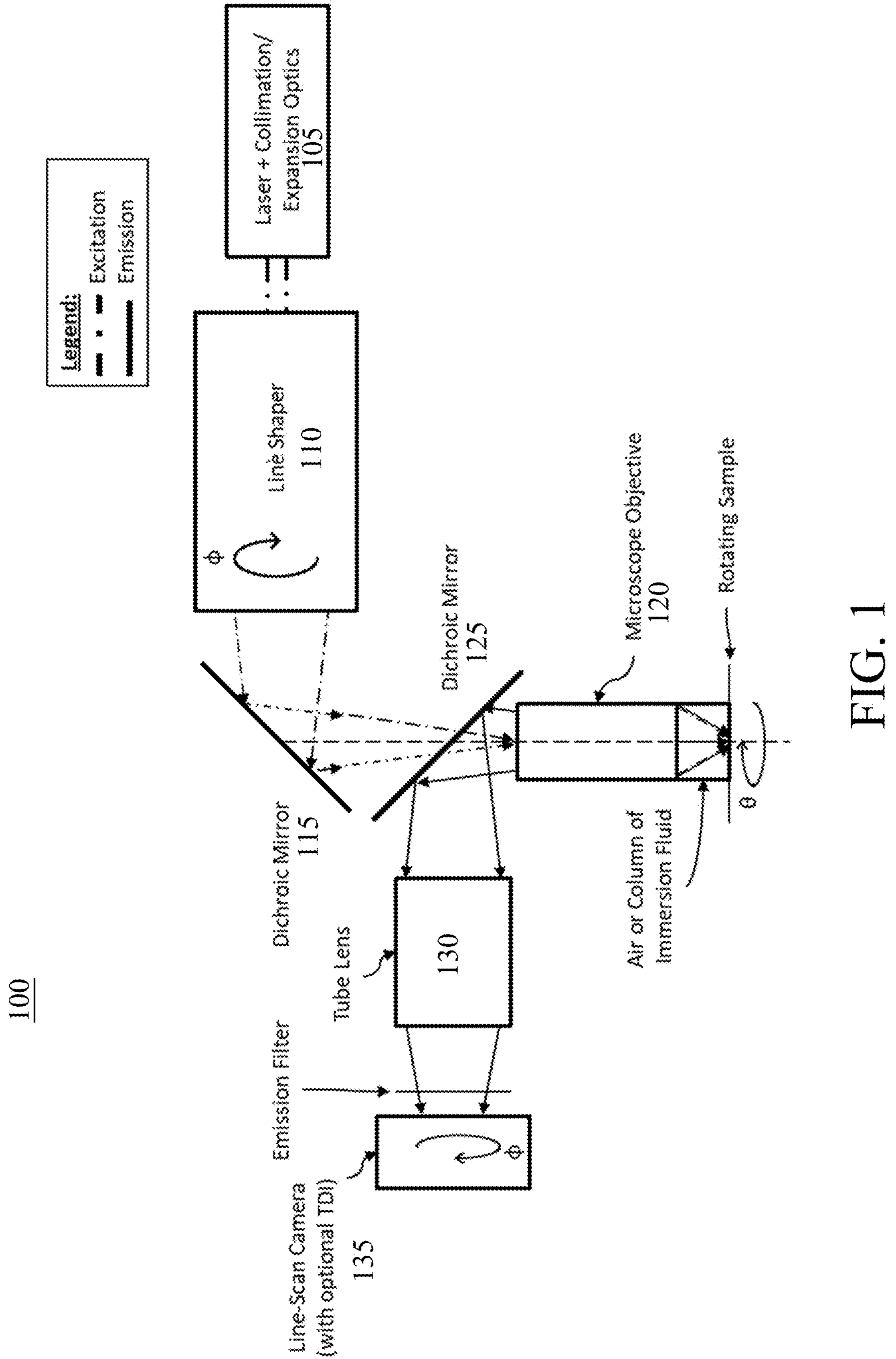
FIG. 1 provides a non-limiting example of an imaging setup.

Described herein are systems and methods for generating high-resolution optical signals. The systems and methods of the present disclosure may be used to selectively excite subsets of analytes to produce super-resolution optical information. For example, an optical system described herein may be used for super-resolution detection of a biological analyte, such as a DNA synthesis intermediate for high-throughput sequencing.

Sequencing techniques, such as sequencing-by-synthesis methods, may utilize high-throughput optical readout of fluorescence signals from clonal clusters of labeled DNA fragments to sequence large numbers of fragments on a single substrate. Each clonal cluster may occupy a spatially separated site on the substrate (e.g., a flow cell). Increasing sequencing throughput can decrease the cost per unit information (e.g., sequencing cost per genome or cost per 100 bases). One way to increase throughput is to increase the density of clonal clusters on the substrate while maintaining read times per unit area. However, current high-throughput sequencing techniques may be limited to cluster densities greater than the diffraction limit of the optical system or by the long scan times typical for super-resolution imaging. The diffraction limit may limit the ability to optically address individual sites (e.g., individual clonal clusters), and scan times may be limited by the amount of signal collected (e.g., the number of photons received). The optical systems and methods described herein may enable detection of clonal clusters or single DNA molecules at super-resolution densities (e.g., with cluster spacing that is smaller than the diffraction limit of the optical system) with short scan times.

High-resolution optical readout systems and methods, such as super-resolution optical readout via substrate engineering (SORSE), may collect optical signals (e.g., fluorescence intensities) from a substrate comprising an array of sites with pre-defined geometry without the need to generate an image of the sample. Alternative approaches may first generate an image of a substrate or sample and then process the image to obtain a signal readout, which may be slower than directly collecting the optical signals using a system or method of the present disclosure. In contrast, the high-resolution optical readout systems described herein may be designed to directly collect optical signals from a discrete array of sites (e.g., analyte binding sites) on a substrate, bypassing image generation, enabling rapid signal readout. Furthermore, the high-resolution optical readout systems and methods of the present disclosure may be designed to resolve optical signals from arrays that are too dense to resolve with conventional optical detection systems (e.g., conventional fluorescence microscopy). Alternatively, or in addition, the systems and methods described herein may enhance optical signals generated on a substrate, increasing signal to noise ratios, and enabling signal detection and differentiation from high density arrays with low analyte concentrations (e.g., single particle detection).

The substrates and optical systems, and methods for using them, described herein may be compatible with the sample processing systems and methods (e.g., open substrate systems and methods) described in U.S. Patent Pub. No.

20200326327A1, U.S. Patent Pub. No. 20210079464A1, International Patent Pub. No. WO2022072652A1, U.S. Patent Pub. No. 20210354126A1, and International Patent Pub. No. WO2023/192403A2, each of which is incorporated herein by reference in its entirety for all purposes. For example, the substrates and/or optical systems described in the present disclosure may substitute or be used in addition to the substrates described in the above publications. In some cases, the substrates and optical systems of the present disclosure may have common and/or different characteristics and features (e.g., dimensions, materials of layers, surface chemical modifications, etc.) as the substrates and optical systems in the above publications.

Selective Excitation

Systems and methods for high-resolution optical readout may be engineered to selectively excite predetermined locations (e.g., a pattered array of analyte binding sites) on a substrate. High resolution (e.g., sub-diffraction limit resolution) may be achieved by selectively exciting subsets of predetermined locations in a spatially or temporally separated manner. Each selectively excited subset may be optically resolvable (e.g., separated by distances longer than a diffraction limit of the optical system), even when the full set of predetermined locations, comprising multiple subsets of predetermined locations, is not. For example, an array of analyte binding sites may be patterned on a substrate at a high density at which the spacing between neighboring binding sites is shorter than the diffraction limit of the optical system. Subsets of the analyte binding sites may be selectively excited, with excitation of each subset either spatially or temporally separated, and an optically resolvable readout may be collected for each subset. The combined readout from the subsets may provide high-resolution optical data of analyte binding sites with sub-diffraction limit spacing.

As described herein, selective excitation of predetermined locations may be facilitated by engineered substrates comprising arrays of sites at predetermined locations, photonic structures that convert excitation light into a selective excitation pattern, or both. Alternatively, or in addition, structured illumination providing excitation patterns with sub-diffraction limit intensity peaks may be used to selectively excite subsets of predetermined locations on a substrate.

Engineered Substrates

The systems and methods of the present disclosure may utilize an engineered substrate to facilitate high-resolution optical readout. A substrate (e.g., an open substrate or a flow cell) may comprise a plurality of predetermined locations. The plurality of predetermined locations may be arranged as an array, in any pattern, or randomly. In some cases, the locations may function as analyte binding sites capable of recruiting analytes (e.g., fluorescent particles) to the predetermined locations. In some cases, a substrate may be unpatterned. In some cases, a plurality of analytes may bind to locations on the substrate, which locations may or may not correspond to the plurality of predetermined locations. Optical signals (e.g., fluorescence) produced by the analytes, or derivatives thereof (e.g., complementary nucleic acid molecule), and read by the optical system may correspond with a property of interest of the analyte. For example, a fluorescence signal produced by an analyte, or derivative thereof, bound to an analyte binding site may be indicative of a nucleotide base addition during a nucleotide sequencing reaction (e.g., nucleotide incorporation during a primer extension reaction). In some embodiments, the substrate may comprise at least $10^6$, at least $10^7$, at least $10^8$, at least $10^9$, at least $10^{10}$, at least $10^{11}$, at least $10^{12}$, at least $10^{13}$, or at least $10^{14}$ analyte binding sites at predetermined locations on the substrate. In some embodiments, the substrate may comprise not less than $10^6$ and not more than $10^{14}$, not less than $10^7$ and not more than $10^{14}$, not less than $10^8$ and not more than $10^{14}$, not less than $10^9$ and not more than $10^{14}$, not less than $10^{10}$ and not more than $10^{14}$, or not less than $10^{11}$ and not more than $10^{14}$ analyte binding sites at predetermined locations on the substrate.

The substrate may be engineered for use with an optical system comprising an illumination system (e.g., a patterned illumination system), a signal collection system (e.g., fluorescent signal collection or optical detection system), an optical detector (e.g., a camera or a photodiode), or combinations thereof. In some embodiments, the sites in the array may be arranged in a pattern (e.g., a hexagonal lattice, a rectangular lattice, or a square lattice) with known spacing, such that the sites are positioned at predetermined locations. In some embodiments, the sites may be arranged such that a center-to-center distance between neighboring sites is shorter than a diffraction limit of an optical system used to detect a readout from the substrate. For example, the center-to-center distance between neighboring sites may be less than about 125 nm, less than about 150 nm, less than about 175 nm, less than about 200 nm, less than about 225 nm, less than about 250 nm, less than about 275 nm, less than about 300 nm, less than about 325 nm, less than about 350 nm, less than about 375 nm, less than about 400 nm, less than about 425 nm, less than about 450 nm, less than about 475 nm, or less than about 500 nm.

In addition to the array of sites (e.g., analyte binding sites), a substrate may further comprise features that facilitate selective excitation (e.g., fluorescence excitation) of subsets of sites within the array of sites, creation of excitation patterns (e.g., patterns with sub-diffraction-limited features), or increased emission (e.g., fluorescence emission) collection efficiency. In some embodiments, the features may comprise photonic structures arranged to convert excitation light impinging on the photonic structure into patterned excitation light, direct excitation light to subsets of sites based on properties of the excitation light, or enhance emission detection. Examples of features (e.g., photonic structures) that may be included in a substrate of the present disclosure include multi-layered structures (e.g., diffraction gratings), topographical structures (e.g., patterns of protrusions or depressions), or patterns of different materials (e.g., metal or dielectric nanostructures). The features may have spatially patterned electromagnetic properties to shape, facilitate, or enhance excitation or emission of an analyte on the substrate. In some embodiments, the features may be arranged in a periodic pattern, such as a hexagonal lattice, a rectangular lattice, or square lattice. The periodic pattern may have a period, or a distance over which the pattern repeats, of from about 100 nm to about 1 μm. In some embodiments, the period may be from about 10 nm to about 10 μm, from about 50 nm to about 10 μm, from about 100 nm to about 10 μm, from about 250 nm to about 10 μm, from about 500 nm to about 10 μm, from about 750 nm to about 10 μm, from about 1 μm to about 10 μm, from about 10 nm to about 5 μm, from about 50 nm to about 5 μm, from about 100 nm to about 5 μm, from about 250 nm to about 5 μm, from about 500 nm to about 5 μm, from about 750 nm to about 5 μm, from about 1 μm to about 5 μm, from about 10 nm to about 1 μm, from about 50 nm to about 1 μm, from about 100 nm to about 1 μm, from about 250 nm to about 1 μm, from about 500 nm to about 1 μm, from about 750 nm to about 1 μm, from about 10 nm to about 750 nm, from about 50 nm to about 750 nm, from about 100 nm to about 750 nm, from about 250 nm to about 750 nm, from about 500 nm to about 750 nm, from about 10 nm to about 500 nm, from about 50 nm to about 500 nm, from about 100 nm to about 500 nm, from about 250 nm to about 500 nm, from about 10 nm to about 250 nm, from about 50 nm to about 250 nm, from about 100 nm to about 250 nm, from about 10 nm to about 100 nm, or from about 50 nm to about 100 nm.

Patterned Excitation

An engineered substrate, as described herein, may facilitate selective excitation of sites (e.g., analyte binding sites) at predetermined locations on the substrate. In some embodiments, a substrate for optical readout may comprise a photonic structure and a plurality of predetermined locations, wherein the photonic structure is configured to convert an excitation light impinging thereon, based on a characteristic of the excitation light, into a selective excitation pattern which excites a subset of the predetermined locations on the substrate. The predetermined locations may be arranged in an array (e.g., a patterned array), and selective excitation of sites may comprise selectively exciting (e.g., selectively directing excitation light toward) a subset of the predetermined locations in the array.

The predetermined locations may be configured to comprise an analyte immobilized thereon. In some embodiments, the predetermined locations may form pads or wells configured to immobilize an analyte thereon. The predetermined locations may have an affinity for the analyte. In some embodiments, the predetermined locations may have an analyte-binding surface that confers an affinity for the analyte. The analyte-binding surface may comprise a chemical modification. The analyte-binding surface may comprise an electrostatic charge.

Different subsets of predetermined locations may be excited based on one or more properties of the excitation light. Properties of the excitation light used to selectively excite subsets of sites may include angle of incidence, wavelength, polarization, phase, or combinations thereof. In some embodiments, the characteristic comprises an angle of incidence, a wavelength, a polarization, a phase, or a combination thereof. For example, a first subset of predetermined locations may be excited when the excitation light has a first property (e.g., a first angle of incidence, a first wavelength, a first polarization, or a first phase), a second subset of predetermined locations may be excited when the excitation light has a second property (e.g., a second angle of incidence, a second wavelength, a second polarization, or a second phase), and a third subset of predetermined locations may be excited when the excitation light has a third property (e.g., a third angle of incidence, a third wavelength, a third polarization, or a third phase). Changing the property of the excitation light (e.g., changing the angle of incidence, wavelength, polarization, or phase) may change the subset of predetermined locations that is excited. The subsets of predetermined locations (e.g., the first subset, the second subset, and the third subset) within the array of predetermined locations may be arranged such that the subsets spatially intermingled. In some embodiments, a subset of predetermined locations (e.g., the first subset, the second subset, or the third subset) may be arranged in a periodic pattern. In some embodiments, two predetermined locations (e.g., within the periodic pattern) have a center-to-center distance shorter than a diffraction limit. The pattern may have a period that is longer than the period of the array of predetermined locations. In some embodiments, no two predetermined locations within the subset of predetermined locations have a center-to-center distance shorter than a diffraction limit. In some embodiments, each pair of predetermined locations within the subset of predetermined locations has a center-to-center distance longer than a diffraction limit. In some embodiments, the diffraction limit is not less than 125 nm and not more than 500 nm, not less than 150 nm and not more than 400 nm, not less than 175 nm and not more than 300 nm, not less than 200 nm and not more than 250 nm. In some embodiments, the predetermined locations within the subset may be arranged such that a center-to-center distance between neighboring sites within the subset is longer than a diffraction limit of an optical system used to detect a readout from the substrate. For example, the center-to-center distance between neighboring sites within the subset of predetermined locations may be greater than about 125 nm, greater than about 150 nm, greater than about 175 nm, greater than about 200 nm, greater than about 225 nm, greater than about 250 nm, greater than about 275 nm, greater than about 300 nm, greater than about 325 nm, greater than about 350 nm, greater than about 375 nm, greater than about 400 nm, greater than about 425 nm, greater than about 450 nm, greater than about 475 nm, or greater than about 500 nm.

In some embodiments, a substrate may be engineered to generate surface waves (e.g., surface polariton waves or surface plasmon waves) or guided waves (e.g., guided light waves) upon interaction with an excitation light. Surface waves or guided waves may have shorter wavelengths than light, decoupling the corresponding resolution limit from a strict resolution limit, such as the diffraction limit. A substrate engineered to generate surface waves or guided waves may comprise photonic structures configured to support the surface waves or guided waves, couple an excitation light to the surface waves or guided waves, or both. In some embodiments, photonic structures configured to support surface waves or guided waves may comprise an array of incorporated metal patches or a metal layer that supports surface plasmon waves. Alternatively, or in addition, photonic structures configured to support surface waves or guided waves may comprise an array of incorporated planar waveguides or a dielectric layer that support guided waves. Photonic structures configured to couple the excitation light to the surface waves or guided waves may comprise a periodic array of incorporated structures or surface features, for example, an array of protrusions or depressions in the surface of the substrate or an array of structures in a sub-surface layer of the substrate.

In some embodiments, the photonic structure may be embedded in the substrate, coated onto the substrate, etched into the substrate, in contact with the substrate, or a combination thereof. In some embodiments, the photonic structure may comprise an array of features. The array of features may be embedded in the substrate, coated onto the substrate, etched into the substrate, in contact with the substrate, or a combination thereof. The array of features may comprise a metal, a dielectric material, a semiconductor, or a combination thereof. The metal may comprise, for example, aluminum, gold, platinum, copper, or titanium. The dielectric material may comprise, for example, glass, mica, quartz, fused silica, a plastic, porcelain, or a metal oxide. In some embodiments, the array of features may comprise, for example, pillars or optical antennae. Optical antennae may comprise nanoantennae. In some embodiments, the array of features may be arranged in a periodic pattern. In some embodiments, the period may be not longer than 2 μm, not longer than 1 μm, not longer than 800 nm, not longer than 600 nm, not longer than 500 nm, not longer than 400 nm, not longer than 300 nm, not longer than 200 nm, or not longer than 100 nm. In some embodiments, the period may be not shorter than 20 nm and not longer than 2 μm, not shorter than 20 nm and not longer than 1 μm, not shorter than 20 nm and not longer than 800 nm, not shorter than 20 nm and not longer than 600 nm, not shorter than 20 nm and not longer than 500 nm, not shorter than 20 nm and not longer than 400 nm, not shorter than 20 nm and not longer than 300 nm, not shorter than 20 nm and not longer than 200 nm, or not shorter than 20 nm and not longer than 100 nm. In some embodiments, the periodic pattern may have a period that is shorter than a diffraction limit.

Photonic structures may comprise features or arrays of features configured to propagate a guided wave or surface plasmon. In some embodiments, the photonic structure may comprise an array of features that comprises a flat waveguide. The flat waveguide may be configured to propagate a guided wave or a surface plasmon of the excitation light to the predetermined locations. The photonic structure may further comprise a second array of features. The second array of features may be embedded in the substrate, coated onto the substrate, etched into the substrate, in contact with the substrate, or a combination thereof. The second array of features may comprise a diffraction grating or a flat waveguide. In some embodiments, the flat waveguide may be configured to propagate a guided wave or a surface plasmon of the excitation light to the predetermined locations. In some embodiments, the second array of features may be positioned before the array of features with reference to the excitation light. The second array of features may be separated from the array of features by spacing of not less than 0.1 μm and not more than 10 μm, not less than 0.2 μm and not more than 5 μm, not less than 0.3 μm and not more than 3 μm, not less than 0.5 μm and not more than 2 μm, not less than 0.7 μm and not more than 1.5 μm, not less than 0.8 μm and not more than 1.3 μm, or not less than 0.9 μm and not more than 1.2 μm. The second array of features may have a spacing that is an integer multiple of a spacing of the array of features.

The photonic structures may be arranged to produce different configurations of the surface waves or guided waves based on properties of the excitation light impinging on the photonic structure. In some embodiments, a first characteristic of a first excitation light impinging on the substrate may be configured to produce a first selective excitation pattern to achieve selective excitation of a first subset of predetermined locations on the surface of the substrate. In some embodiments, the first characteristic may comprise a second angle of incidence, a second wavelength, a second polarization, or a second phase. In some embodiments, a second characteristic of a second excitation light impinging on the substrate may be configured to produce a second selective excitation pattern to achieve selective excitation of a second subset of the predetermined locations. In some embodiments, the second characteristic may comprise a second angle of incidence, a second wavelength, a second polarization, or a second phase. In some embodiments, a third characteristic of a third excitation light impinging on the substrate may be configured to produce a third selective excitation pattern to achieve selective excitation of a third subset of the predetermined locations. In some embodiments, the third characteristic may comprise a third angle of incidence, a third wavelength, a third polarization, or a third phase. For example, excitation light having a first property (e.g., a first angle of incidence, a first wavelength, a first polarization, or a first phase) may produce a first configuration of surface waves or guided waves, excitation light having a second property (e.g., a second angle of incidence, a second wavelength, a second polarization, or a second phase) may produce a second configuration of surface waves or guided waves, and excitation light having a third property (e.g., a third angle of incidence, a third wavelength, a third polarization, or a third phase) may produce a third configuration of surface waves or guided waves. A configuration of surface waves or guided waves (e.g., the first configuration, the second configuration, or the third configuration) may create an excitation pattern with sub-wavelength features. An excitation pattern may selectively excite a subset of predetermined locations on the substrate. The presence of sub-wavelength features in the excitation pattern may enable high-resolution optical readout by selectively exciting subsets of predetermined locations from a dense array of predetermined locations, for example, a dense array of predetermined locations with spacing shorter than a wavelength of light.

Excitation light properties that may be altered to change a configuration of surface waves or guided waves and excite different subsets of predetermined locations may include polarization angle, angle of incidence, wavelength, or combinations thereof. For example, an excitation light comprising a collimated beam having a first polarization angle may produce a first configuration of surface waves or guide waves upon encountering a photonic structure, producing a first excitation pattern, and exciting a first subset of predetermined locations from a dense array of predetermined locations. Changing the polarization angle of the collimated beam may produce a second configuration of surface waves or guide waves upon encountering the photonic structure, producing a second excitation pattern, and exciting a second subset of predetermined locations from the dense array of predetermined locations. In some embodiments, the excitation light may comprise a plurality of illumination beams or a spatial illumination structure. In some embodiments, the excitation light may comprise an interference pattern.

An optical system (e.g., a system for high-resolution optical readout) used to illuminate a substrate may be configured to selectively excite subsets of predetermined locations on the substrate. Selective excitation may be used to increase the distance between excited locations (e.g., analyte binding sites) on the substrate illuminated at a given time or within a given area to enhance the resolution of an optical readout of the system. For example, the array of predetermined locations may have a spacing that is shorter than a diffraction limit of the optical system, but the subset of predetermined locations may have a spacing that is larger than the diffraction limit of the optical system. Accordingly, the subset of predetermined locations may be optically resolved, even if the array of predetermined locations may not be. Thus, the density of predetermined locations within an array that may be optically resolved may be proportional to the number of selectively excitable subsets of predetermined locations. For example, an array having n selectively excitable subsets of predetermined locations may have a density that is n-fold that of an array with a single set of predetermined locations while still being optically resolvable.

The optical system may be configurable in a plurality of configurations. In each configuration, the optical system may illuminate the substrate in such a way that an excitation pattern is created near the array of predetermined locations (e.g., near the surface of the substrate) that selectively excites one of the subsets of predetermined locations. Cycling through the plurality of configurations over time and collecting optical signals (e.g., fluorescence) from the subsets of predetermined locations may enable excitation of each subset in different temporal segments. For example, the same configurable optical system may be used to selectively excite and acquire the optical signals from each subset of predetermined locations sequentially. The signals from each subset can be detected sequentially by a detector (e.g., a camera). Alternatively, or in addition, directing illumination in different configurations to different, spatially separated, regions of the substrate and collecting optical signals (e.g., fluorescence emission) from the subsets of predetermined locations may enable concurrent or substantially concurrent excitation of the subsets while spatially resolving the excited locations. In some embodiments, two or more optical systems (e.g., two or more excitation beams and two or more detectors) may be used to selectively excite and acquire optical signals from subsets of predetermined locations concurrently or substantially concurrently by directing differently configured excitation light to different areas of the substrate. For example, a first detector may detect optical signals from a first region of the substrate in which a first subset of predetermined locations is selectively excited, a second detector may detect optical signals from a second region of the substrate in which a second subset of predetermined locations is selectively excited, and a third detector may detect optical signals from a third region of the substrate in which a third subset of predetermined locations are selectively excited. In another example, a single detector may be used to detect optical signals from spatially separated subsets of predetermined locations, such as with a pixelated optical detector. In this example, the optical signals from a first subset of predetermined locations may be detected by a first pixel or group of pixels of the detector, the optical signals from a second subset of predetermined locations may be detected by a second pixel or group of pixels, and the optical signals from a third subset of predetermined locations may be detected by a third pixel or group of pixels (e.g., by using a microlens array).

In some embodiments, an optical configuration may excite a first subset of predetermined locations with high intensity light while partially exciting a neighboring subset with lower intensity light. Optical signals produced by each subset may be distinguished by the intensities of the signals. In some embodiments, optical signals produced by the partially excited subset may be weaker than the optical signals produced by the subset excited with high intensity light. The resulting optical signals may be detected, and the signals produced by each subset may be differentiated through signal processing. For example, under certain mathematical conditions (e.g., conditions when the matrix of excitation strength is invertible), the intensities of optical signals produced by the individual predetermined locations can be recovered by digital processing of the detected optical signals.

Structured Illumination

In some embodiments, selective excitation of a subset of predetermined locations may be achieved using structured illumination. Structured illumination may comprise generating an excitation pattern comprising an array of intensity peaks at the surface of the substrate. The intensity peaks of the excitation pattern may be positioned to excite a subset of predetermined locations on the substrate from an array of predetermined locations, while the remaining predetermined locations in the array are not excited. Altering the excitation pattern (e.g., by spatially shifting the pattern) may excite a different subset of the predetermined locations. Optical signals from each subset of the predetermined locations may be detected sequentially as the excitation pattern changes. Structured illumination may increase the resolution of the optical system, thereby increasing the resolvable density of predetermined locations on the substrate, by providing an excitation pattern with intensity peaks that are smaller than a diffraction limit of the optical system. For example, a full width at half maximum (FWHM) of an intensity peak of an excitation pattern may be less than about 125 nm, less than about 150 nm, less than about 175 nm, less than about 200 nm, less than about 225 nm, less than about 250 nm, less than about 275 nm, less than about 300 nm, less than about 325 nm, less than about 350 nm, less than about 375 nm, less than about 400 nm, less than about 425 nm, less than about 450 nm, less than about 475 nm, or less than about 500 nm.

In some embodiments, patterned illumination with intensity peaks smaller than a diffraction limit of the optical system may be achieved using interference patterns. For example, an excitation pattern with sub-diffraction-limited features can be achieved by illuminating a substrate with several mutually coherent collimated beams. Alternatively, or in addition, some of the patterned illumination beams may be directed to the substrate at small angles relative to the surface of the substrate, outside of a collection cone of the detection optics of the optical system, resulting in a large effective numerical aperture and a lower effective diffraction limit of the illumination. In this configuration, the effective numerical aperture may be limited by a refractive index of a substrate medium (e.g., a solution on an open substrate). In some embodiments, applying structured illumination from a back side of the substrate (e.g., from below an open substrate) may enable illumination at smaller angles due to a higher refractive index of the back side of the substrate.

Localized Excitation Patterns

In some embodiments, a localized excitation pattern (e.g., an excitation pattern with sub-wavelength features) may be generated by applying an electromagnetic field in the vicinity of a photonic structure (e.g., a metal nanostructure or a dielectric nanostructure) in a substrate. For example, an excitation light may excite localized surface plasmons in a metal nanostructure or localized electromagnetic modes in a dielectric nanostructure, creating localized excitation via near-field interactions. The size, geometry, or location of the features of the photonic structure (e.g., the features of the metal or dielectric nanostructure) may affect an intensity pattern of the localized excitation. In some embodiments, distinct excitation intensity patterns may be generated by applying excitation light with different properties (e.g., different angles of incidence, different wavelengths, different polarizations, different phases, or combinations thereof) and exciting different localized electromagnetic modes within the photonic structure.

Examples of photonic structures that may generate localized excitation patterns may include arrays of plasmon-supporting metal nanostructures, arrays of metal nanocubes, arrays of metal nanocylinders, arrays of plasmon-supporting nanoantennae, or combinations thereof. In some embodiments, a photonic structure (e.g., a plasmon-supporting metal nanostructure) may be embedded in a sub-surface layer of a substrate. The sub-surface photonic structures may be covered by a protective layer, such as a layer of silica. In some embodiments, a photonic structure (e.g., an array of metal nanocubes or an array of metal nanocylinders) may be located on a surface of the substrate. Features of the surface photonic structures may be positioned between groups of predetermined locations (e.g., analyte binding sites). In some embodiments, photonic structures may be etched into or deposited onto the surface of the substrate. The substrate surface may comprise silicon or another material with a high refractive index. In some embodiments, a photonic structure (e.g., an array of plasmon-supporting nanoantennae) may concentrate electromagnetic energy from an excitation light to different locations based on a property of the excitation light (e.g., an angle of incidence, a wavelength, a polarization, a phase, or a combination thereof), producing a patterned illumination. In some embodiments, a photonic structure may be embedded in a substrate, coated onto a substrate, etched into a substrate, or in contact with a substrate.

Emission Enhancement

A photonic structure, such as a photonic structure embedded in a substrate, coated onto a substrate, etched into a substrate, or in contact with a substrate, may enhance an emission intensity of an excited analyte. The photonic structure may be configured to enhance an optical signal produced by the analyte. In some embodiments, the optical signal may comprise a fluorescence emission. In some embodiments, emission enhancement may be achieved by enhancing local excitation strength at a predetermined location of the analyte. For example, excitation strength may be enhanced by concentrating electromagnetic energy in a small volume or by resonance enhancement of the excitation intensity. Alternatively, or in addition, emission enhancement may be achieved by increasing a collection rate of emission photons. Emission enhancement may enable optical readout at sufficient signal to noise ratios with low number of analytes per predetermined location. In some embodiments, the systems and methods described herein may enhance emission such that single particles (e.g., single analyte molecules with a single fluorophore) may be detected with sufficiently high signal to noise ratios. The fluorescence intensity of a single particle (e.g., a single fluorophore) may be limited by excitation saturation and photodamage, producing a limited number of photons per particle per unit time. Thus, increasing excitation strength may not increase emission intensity past a certain point.

One way to maintain a sufficiently high optical signal intensity and signal to noise ratio at low particle densities is to increase integration time (e.g., camera frame time). However, increasing integration time increases data collection times. Alternatively, or in addition, increasing photon collection efficiency (e.g., the fraction of emitted photons that are collected by a detector) from an analyte on a substrate may increase the optical signal intensity and signal to noise ratio without increasing detector integration times. Photon collection efficiency may be increased by increasing a numerical aperture of an optical system used to collect the photons, increasing the angular field of view, but numerical aperture is limited by physical constraints including the refractive index of the medium. A photonic structure of the present disclosure may also be used to increase photon collection efficiency. The photonic structure may be engineered to reshape the angular distribution of emitted photons, increasing photon collection efficiency for a given numerical aperture of the optical system. In some embodiments, the photonic structure may generate a local electromagnetic environment in the vicinity of individual analyte binding sites that may be structured to control the angular distribution of photon emission via near field coupling between the fluorophore and adjacent features of the photonic structure. Alternatively, or in addition, the photonic structure may alter (e.g., decrease) a radiative lifetime of a fluorophore via the Purcell effect due to proximity of the fluorophore to features of the photonic structure. A decreased radiative lifetime may increase the quantum efficiency of the fluorophore, thus increasing the number of photons emitted per unit time and increasing the number of collected photons. This effect may be more pronounced in fluorophores with a low quantum efficiency.

In some embodiments, a photonic structure to increase photon collection efficiency may comprise a planar antenna. A planar antenna may comprise a plurality of stacked layers having different electromagnetic properties. Each layer of the planar antenna may comprise a dielectric material, semiconductor material, or a metallic material. The electromagnetic properties of the layer materials (e.g., refractive index, absorption coefficient, or complex permittivity) may affect the photon collection efficiency. The electromagnetic properties may depend on a wavelength of the emitted light. A planar antenna may increase photon collection efficiency by angular redistribution of the fluorescence emission toward a detector, increasing the quantum efficiency of the fluorophore, or both. Angular redistribution of the fluorescence emission may result from interference of the fluorescence emission with secondary light waves emitted by features of the photonic structure (e.g., the planar antenna). In some embodiments, a planar antenna may be used in combination with other photonic structures (e.g., nanopillar arrays or diffraction gratings) to increase photon collection efficiency while generating selective excitation patterns. The layered structure of a planar antenna may be produced using a variety of methods known in the art, such as using techniques from the semiconductor or optical coating industries used to produce a uniform layer of material. An appropriate method for producing a planar antenna may allow inexpensive, large-volume production of layered structures. Examples of methods that may be used to produce a planar antenna include spin-coating, chemical vapor deposition, physical vapor deposition, sputtering, ion beam sputtering, or other film deposition techniques.

In some embodiments, a photonic structure to increase photon collection efficiency may comprise a patterned substrate. A patterned substrate may comprise an array of nanoantennae. A nanoantenna of the array may interact with one or more analyte binding sites to increase the photon collection efficiency of fluorophores at those sites. The substrate patterning (e.g., nanoantenna array) may increase photon collection efficiency by angular redistribution of the fluorescence emission toward a detector, increasing the quantum efficiency of the fluorophore, or both. Angular redistribution of the fluorescence emission may result from interference of the fluorescence emission with secondary light waves emitted by features of the photonic structure (e.g., the patterned substrate). Nanoantennae may comprise dielectric features, metal features, or combinations thereof. In some embodiments, a patterned substrate may be used in combination with other photonic structures (e.g., nanopillar arrays or diffraction gratings) to increase photon collection efficiency while generating selective excitation patterns. Substrate patterning may be produced using a variety of methods known in the art. For example, substrate patterns may be produced using lithographic tools (e.g., nanoimprinting, electron beam lithography, ion beam milling, or photolithography). In another example, substrate patterns may be produced by self-assembled layers of nanoparticles (e.g., beads).

In some embodiments, substrate patterning (e.g., nanoantennae) can be used in combination with a planar antenna by patterning one or more layers of the planar antenna. In some embodiments, substrate patterning may be applied to a single-material substrate by generating a patterned surface topography on or in the substrate. Features of the patterned substrate (e.g., nanoantennae) may be located in a subsurface layer of the substrate or on the surface of the substrate. For example, nanoantennae may be interspersed between the analyte binding sites on the surface of the substrate. Patterned substrates may be designed in a variety of geometries and materials to satisfy various design criteria, such as low manufacturing costs, compatibility with analyte chemistry, compatibility with other photonic structures, or combinations thereof. Examples of pattered substrate geometries (e.g., nanoantenna array geometries) include concentric rings or "bull's eye" patterns centered on analyte binding sites, nanopillars, nanodiscs, nano-bowtie elements, other types of dipole resonators, patches of plasmon-supporting metal surface (e.g., patches that may be overcoated with a protective layer), planar dielectric waveguide resonators, or combinations thereof.

Optical Systems and Methods

A system for optical readout may comprise a light source configured to provide an excitation light; a substrate comprising a photonic structure comprising a plurality of predetermined locations, wherein the photonic structure is configured to convert the excitation light, based a characteristic of the excitation light, into a selective excitation pattern which excites a subset of the predetermined locations on the substrate; and an excitation light modulator operably coupled to or in optical communication with the light source and configured to direct the excitation light to the substrate and impart the characteristic on the excitation light to generate the selective excitation pattern. The substrate may comprise a substrate as described herein. The characteristic of the excitation light may comprise an angle of incidence, a wavelength, a polarization, a phase, or combinations thereof. The excitation light modulator may comprise a controller operably coupled to the excitation light modulator and configured to change the excitation light to a second excitation light having a second characteristic to generate a second selective excitation pattern which excites a second subset of the predetermined locations. The excitation light modulator may be configured to produce the excitation light having the characteristic and a second excitation light having a second characteristic, wherein the second excitation light is configured to generate a second selective excitation pattern which excites a second subset of the predetermined locations. The second characteristic of the second excitation light may comprise a second angle of incidence, a second wavelength, a second polarization, or a second phase.

The excitation light modulator may comprise light patterning optics. The light patterning optics may comprise for example a microlens array, a phase control element, or both. The light patterning optics may be configured to confer the characteristic on the excitation light.

A system for optical readout may also have features aimed to increase the effective numerical aperture of the system, such as methods to re-route the light around the objective to increase the angle of incidence. In some embodiments, the optical system may further comprise a prism positioned in a light path of the excitation light between the light source and the substrate, wherein the prism is further positioned to direct the excitation light to the substrate. The prism may be positioned to confer the characteristic on the excitation light, wherein the characteristic comprises an angle of incidence. The optical system may further comprise a reflective surface in a light path of the excitation light between the light source and the substrate, wherein the reflective surface is further positioned to direct the excitation light to the substrate. The reflective surface may be positioned to confer the characteristic on the excitation light, wherein the characteristic comprises an angle of incidence.

Methods for the optical readout may include methods of reading signal or imaging a substrate as described herein. A method for optical readout may comprise: providing a substrate comprising a photonic structure and a plurality of predetermined locations; directing an excitation light with a characteristic from a light source to the substrate; generating a selective excitation pattern upon interaction of the excitation light with the photonic structure based on the characteristic of the excitation light; exciting a subset of the predetermined locations on the substrate; and generating an optical readout from the subset of the predetermined locations. The substrate may comprise any substrate as described herein. The method may comprise performing the method using any system as described herein. The method may further comprise: directing a second excitation light with a second characteristic to the substrate, wherein the second characteristic is different than the characteristic; generating a second selective excitation pattern upon interaction of the second excitation light with the photonic structure based on the second characteristic of the second excitation light; exciting a second subset of the predetermined locations on the substrate; and generating a second optical readout from the second subset of predetermined locations. In some embodiments, the method may comprise directing the excitation light and directing the second excitation light concurrently or substantially concurrently. In some embodiments, the method may comprise directing the excitation light and directing the second excitation light in different temporal segments. In some embodiments, the method may comprise generating the optical readout and the second optical readout with a detector, wherein the detector is a single detector. In some embodiments, the method may comprise generating the optical readout with a detector and the second optical readout with a second detector. The detector, the second detector, or both may comprise a camera. A camera may be a line-scan camera. A camera may be a time delay integration (TDI) camera. In some embodiments, the method may comprise emitting the excitation light and the second excitation light from the light source. In some embodiments, the method may comprise emitting the excitation light from the light source and the second excitation light from a second light source. In some embodiments, the method may comprise enhancing the optical readout with the photonic structure.

The methods and systems described herein may have an optical read out, such as the detection of an optical signal. The optical readout may comprise a fluorescent signal. The method may comprise redistributing an emission angle of the fluorescence signal with the photonic structure, thereby enhancing the optical readout. The method may comprise differentiating an optical signal corresponding to a single predetermined location in the subset of the predetermined locations from optical signals corresponding to other predetermined locations in the subset. The method may comprise rotating the substrate while generating the optical readout. The method may comprise exciting a subset of predetermined locations, wherein exciting the subset of the predetermined locations may comprise exciting an analyte adhered to the subset. The analyte may comprise a biological analyte. The biological analyte may comprise a polynucleotide. The polynucleotide may comprise a DNA or an RNA. The methods described herein may comprise a biological analyte wherein the biological analyte comprises a polynucleotide sequencing reaction product. The methods described herein may be used for an optical readout, wherein the optical readout is indicative of a nucleotide sequence.

Scanning Systems

An optical system or method of the present disclosure may be incorporated into a scanning system, such as an open substrate processing system. The scanning system may be configured to scan a sample coated onto a substrate, also referred to herein as a "wafer", a "substrate", a "planar sample", or a "planar surface". The substrate may be an open substrate coated with an analyte (e.g., biological analyte) and a fluid that is exposed to the environment. In some embodiments, the substrate may comprise an array (e.g., a planar array) of individually addressable locations. Each location, or a subset of such locations, may have immobilized thereto an analyte (e.g., a nucleic acid molecule, a protein molecule, a carbohydrate molecule, etc.). For example, an analyte may be immobilized to an individually addressable location via a support, such as a bead. A plurality of analytes immobilized to the substrate may be copies of a template analyte. For example, the plurality of analytes may have sequence homology. In other instances, the plurality of analytes immobilized to the substrate may be different. The plurality of analytes may be of the same type of analyte (e.g., a nucleic acid molecule) or may be a combination of different types of analytes (e.g., nucleic acid molecules, protein molecules, etc.).

Described herein are devices, systems, and methods that use open substrates or open flow cell geometries to process a sample. The term "open substrate," as used herein, generally refers to a substrate in which any point on an active surface of the substrate is physically accessible from a direction normal to the substrate. A sample processing system may comprise a substrate, and devices and systems that perform one or more operations with or on the substrate. The sample processing system may permit highly efficient dispensing of analytes and reagents onto the substrate. The sample processing system may permit highly efficient imaging of one or more analytes, or signals corresponding thereto, on the substrate. Substrates, detectors, and sample processing hardware that can be used in the sample processing system are described in further detail in U.S. Pat. Pub. Nos. 2020/0326327A1, 2021/0079464A1, and 2021/0354126A1, and International Pat. Pub. No. WO2022/072652A1, each of which is incorporated herein by reference in its entirety.

Substrates

An open substrate may be a solid substrate. The substrate may entirely or partially comprise one or more materials (e.g., rubber, glass, silicon, metal, ceramic, plastic, etc.). The substrate may be entirely or partially coated with one or more layers of, for example, a metal, an oxide, a photoresist, a surface coating such as an aminosilane or hydrogel, polyacrylic acid, polyacrylamide dextran, polyethylene glycol (PEG), or any combination of any of the preceding materials, or any other appropriate coating. The substrate may comprise multiple layers of the same or different type of material. The substrate may be fully or partially opaque to visible light. A surface of the substrate may be modified to comprise active chemical groups, such as for example amines, esters, hydroxyls, epoxides, and the like, or a combination thereof, or these may be added as an additional layer or coating to the substrate. The substrate may have the general form of a cylinder, a cylindrical shell or disk, a rectangular prism, or any other geometric form.

The substrate may comprise a planar or substantially planar surface. The surface may be textured or patterned, where the texture or pattern may be regular or irregular. For example, the substrate may comprise grooves, troughs, hills, pillars, wells, cavities (e.g., micro-scale cavities or nano-scale cavities), and/or channels. The substrate may have regular or irregular geometric structures (e.g., wedges, cuboids, cylinders, spheroids, hemispheres, etc.) above or below a reference level of the surface. In some instances, the textures and/or patterns of the substrate may define at least part of an individually addressable location on the substrate.

The substrate may comprise a plurality of individually addressable locations. The locations on the one or more surfaces of the substrate are physically accessible for processing (e.g., placement, extraction, reagent dispensing, seeding, heating, cooling, or agitation). The locations may be digitally accessible (e.g., locations may be located, identified, and/or accessed electronically or digitally for indexing, mapping, sensing, associating with a device (e.g., detector, processor, dispenser, etc.)). In some cases, the locations may be defined by physical features of the substrate (e.g., on a modified surface) to distinguish from each other and from non-individually addressable locations. In some cases, the locations may be defined digitally (e.g., by indexing) and/or via the analytes and/or reagents that are loaded on the substrate (e.g., the locations at which analytes are immobilized on the substrate). Each of the plurality of individually addressable locations, or each of a subset of the locations, may be capable of immobilizing thereto an analyte (e.g., a nucleic acid, a protein, a carbohydrate, etc. from a biological sample) or a reagent (e.g., a nucleic acid, a probe molecule, a barcode molecule, an antibody molecule, a primer molecule, a bead, etc.) directly or indirectly (e.g., via a support, such as a bead).

The substrate may have any number of individually addressable locations, for example, on the order of 1, $10^1$, $10^2$, $10^3$, $10^4$, $10^5$, $10^6$, $10^7$, $10^8$, $10^9$, $10^{10}$, $10^{11}$, $10^{12}$, $10^{13}$ or more locations. A location may have any size. In some cases, a location may have an area of at least and/or at most about 0.1, 0.2, 0.25, 0.3, 0.4, 0.5, 0.6, 0.7, 0.8, 0.9, 1, 1.1, 1.2, 1.25, 1.3, 1.4, 1.5, 1.6, 1.7, 1.75, 1.8, 1.9, 2, 2.25, 2.5, 2.75, 3, 3.25, 3.5, 3.75, 4, 4.25, 4.5, 4.75, 5, 5.5, 6, 7, 8, 9, 10 square microns ($\mu m^2$), or more. A substrate may comprise more than one type of individually addressable location arranged as an array, randomly, or according to any pattern, on the substrate. In some cases, different types of individually addressable locations may have different chemical, physical, and/or biological properties (e.g., hydrophobicity, charge, color, topography, size, dimensions, geometry, etc.). For example, a first location type may comprise a first surface chemistry, and a second location type may lack the first surface chemistry.

Individually addressable locations may be distributed on the substrate with a pitch determined by the distance between the center of a first location and the center of the closest or neighboring individually addressable location(s). Locations may be spaced with a pitch of at least and/or at most about 0.1, 0.2, 0.25, 0.3, 0.4, 0.5, 0.6, 0.7, 0.8, 0.9, 1, 1.1, 1.2, 1.25, 1.3, 1.4, 1.5, 1.6, 1.7, 1.75, 1.8, 1.9, 2, 2.25, 2.5, 2.75, 3, 3.25, 3.5, 3.75, 4, 4.25, 4.5, 4.75, 5, 5.5, 6, 6.5, 7, 7.5, 8, 8.5, 9, 9.5, or 10 microns (μm). In some cases, the pitch between two locations may be determined as a function of a size of a loading object (e.g., bead). For example, where a bead has a maximum diameter, the pitch may be at least about that maximum diameter.

In some cases, the individually addressable locations may be segregated or indexed, e.g., spatially. Data (e.g., optical signals) corresponding to an indexed location, collected over multiple periods of time, may be linked to the same indexed location. In some cases, sequencing signal data collected from an indexed location, during iterations of sequencing-by-synthesis flows, are linked to the indexed location to generate a sequencing read for an analyte immobilized at the indexed location. In some cases, the individually addressable locations are indexed by physically demarcating part of the surface, depositing a topographical mark, depositing a sample (e.g., a control nucleic acid sample), depositing a reference object (e.g., reference bead that always emits a detectable signal during detection), and the locations may be indexed with reference to such demarcations.

The substrate may be rotatable about an axis, referred to herein as a rotational axis. The rotational axis may or may not be an axis through the center of the substrate. The systems, devices, and apparatus described herein may further comprise an automated or manual rotational unit configured to rotate the substrate. The rotational unit may comprise a motor and/or a rotor. For instance, the substrate may be affixed to a chuck (such as a vacuum chuck). The substrate may be rotated at a rotational speed of at least about 1 revolution per minute (rpm), at least 2 rpm, at least 5 rpm, at least 10 rpm, at least 20 rpm, at least 50 rpm, at least 100 rpm, at least 200 rpm, at least 500 rpm, at least 1,000 rpm, at least 2,000 rpm, at least 5,000 rpm, at least 10,000 rpm, or greater. The substrate may be configured to rotate with different rotational velocities during different operations described herein, for example with higher velocities during reagent dispense and with lower velocities during analyte loading and imaging operations. The substrate may be configured to rotate with a rotational velocity that varies according to a time-dependent function, such as a ramp, sinusoid, pulse, or other function, or combination thereof.

In some cases, the substrate may be movable in any direction. For example, such motion may be non-linear (e.g., in rotation about an axis), linear (e.g., on a rail track), or a hybrid of linear and non-linear motion. In some instances, the systems, devices, and apparatus described herein may further comprise a motion unit configured to move the substrate. The motion unit may comprise any mechanical component, such as a motor, rotor, actuator, linear stage, drum, roller, pulleys, etc., to move the substrate. Analytes or reagents may be immobilized to the substrate during any such motion. Analytes or reagents may be dispensed onto the substrate prior to, during, or subsequent to motion of the substrate.

Open Substrate Detection Systems

FIG. 1 shows an exemplary optical system 100 that may be used to scan a substrate as disclosed herein, for example a rotating substrate. An optical system comprising a detector may be configured to detect one or more signals from a detection area on the substrate prior to, during, or subsequent to, the dispensing of reagents to generate an output. Signals from multiple individually addressable locations may be detected during a single detection event. Signals from the same individually addressable location may be detected in multiple instances.

The optical system may comprise one or more distinct optical paths. The one or more optical paths may comprise mirrored optical layouts. An optical path may comprise additional optical components not shown in FIG. 1. For example, an optical path may comprise additional splitting, reflecting, focusing, magnifying, filtering, shaping, rotating, polarizing, or other optical elements. An optical path may comprise an excitation path and an emission path. The excitation path and the emission path may each comprise a plurality of optical elements in optical communication with a substrate. In some cases, the excitation path comprises one or more of an excitation light source, a beam expander element (together with the excitation light source, 105), a line shaper element 110, a dichroic mirror 115, and an objective 120. In some cases, the emission path may comprise one or more of an objective (e.g. 120 shared with the excitation path), a dichroic mirror 125, a beam splitter, a lens 130 (e.g., a tube lens or a cylindrical lens), and a detector (e.g., line-scan camera 135).

The objective in the excitation path may be the same as the objective in the emission path. The objective may be an immersion objective or an air objective. The dichroic in the excitation path may be the same as the dichroic in the emission path. The dichroic may be a short pass dichroic, or the dichroic may be a long pass dichroic. In some cases, the dichroic passes the excitation light and reflects the emission light. In other instances, the dichroic reflects the excitation light and passes the emission light.

The excitation light source may be configured to emit light (e.g., coherent light). The excitation light source may comprise one or more light emitting diodes (LEDs), one or more lasers, one or more single-mode laser sources, one or more multi-mode laser sources, one or more laser diodes, a continuous wave laser or a pulsed laser, or a combination thereof. A beam of light emitted by a laser may be a Gaussian or approximately Gaussian beam, which beam may be manipulated using one or more optical elements (e.g., mirrors, lenses, prisms, waveplates, etc.). For example, a beam may be collimated. In some cases, a beam may be manipulated to provide a laser line (e.g., using one or more Powell lenses or cylindrical lenses). The excitation light source may be coupled to an optical fiber.

The line shaper may be configured to expand excitation light provided by the excitation light source along one axis. The line shaper may comprise one or more lenses (e.g., one or more cylindrical lenses). The one or more cylindrical lenses may be convex cylindrical lenses, concave cylindrical lenses, or any combination thereof. In some instances, the line shaper is positioned in a rotating mount, for example a motorized rotating mount. The rotational mount may be configured to rotate the expanded excitation light source about a central axis without substantial deviation of the central point of the excitation light source. The line shaper element may be configured to rotate about the central axis in response to, concurrent with, or in anticipation of a translation of the substrate with respect to the optical system. For example, the line shaper element may rotate about the central axis such that the axis of the expanded excitation light maintains a defined orientation with respect to the rotational axis of the substrate upon translation of the substrate with respect to the optical axis in a direction that is not directly toward or away from the rotational axis.

A beam expander may comprise one or more lenses. For example, a beam expander may comprise two lenses. The lenses may have different focal lengths. In some cases, the lens closer to the excitation light source may have a shorter focal length that the lens farther from the excitation light source. The beam expander may be configured to expand the excitation light about 2×, about 3×, about 4×, about 5×, about 10×, about 15×, or about 20×. The beam expander may be configured to collimate and/or to focus the excitation light.

A lens may comprise one or more lenses. For example, a lens may comprise two lenses. Two lenses may have different focal lengths, or two lenses may have different focal lengths. The lens may be configured to expand the excitation light source about 2×, about 3×, about 4×, about 5×, about 10×, about 15×, or about 20×. The lens may be configured to collimate the emission light and/or to focus the emission light.

Detectors may comprise any combination of cameras (e.g., CCD, CMOS, or line-scan), photodiodes (e.g., avalanche photo diodes), photoresistors, phototransistors, or any other optical detector known in the art. In some cases, the detectors may comprise one or more cameras. For example, the cameras may comprise line-scan cameras, such as time delay and integration (TDI) line-scan cameras. A TDI line-scan camera may comprise two or more vertically arranged rows of pixels. The detector may be configured to rotated with respect to a substrate to correct for tangential velocity blur, as described herein. In some case, the detector may be configured to rotate in response to, concurrent with, or in anticipation of a translation of a substrate with respect to the optical system. For example, the detector may rotate such that the axis of the imaging field maintains a defined orientation with respect to the rotational axis of a substrate upon translation of the substrate with respect to the optical axis in a direction that is not directly toward or away from the rotational axis. The detector may be configured to rotate concurrently with a rotation of the line shaper element, such that the imaging field maintains a defined orientation with respect to the axis of the expanded excitation light. The detector may be configured to rotate independently of the line shaper element.

Optical systems of this disclosure may further comprise one or more autofocus systems. In some cases, each optical path in the optical system comprises an autofocus system. The autofocus system may comprise an autofocus illumination source configured to direct autofocus light through the objective toward the surface. The autofocus illumination source may comprise an infrared (IR) laser, e.g., a speckle-free IR laser. The autofocus light may pass through one or more of the optical elements in the optical path. The autofocus detector may be a position-sensitive detector. The autofocus light may coincide with the autofocus detector at a discrete position when the surface is in focus for an emission detector (e.g., the camera illustrated in FIG. 1). The autofocus illumination source and the autofocus detector may be configured such that a change in a position of the surface relative to the objective results in a change in position of the autofocus illumination on the autofocus detector. For example, a change in a distance between the surface and the objective or a tilt of the surface relative to the objective may cause a displacement of the autofocus illumination position on the autofocus detector. The autofocus system may send a signal to a focusing system in response to the change in position of the autofocus illumination on the autofocus detector. The focusing system may adjust the position of the surface relative to the objective such that the position of the autofocus illumination on the autofocus detector returns to the discrete position when the surface is in focus on the emission detector.

The optical systems of this disclosure may be aligned such that the excitation light and the emission light pass substantially through the center of the optical elements. For instance, the excitation light may be aligned with respect to the line shaper element such that the position of the excitation light after passing through the line shaper does not change substantially upon rotation of the line shaper. The line shaper may be rotated during alignment and the position of the excitation light source, the line shaper, or both may be adjusted to minimize motion of the position of the excitation light after passing through the line shaper upon rotation of the line shaper. In some cases, a position of the detector is aligned with respect to a rotating mount. For example, the detector is centered within the rotational mount by illuminating the center of the detector, rotating the rotational mount, and adjusting the position of the detector within the mount so that the position of the illumination does not move upon rotation of the rotational mount. In some cases, the position of the excitation light and/or the emission light is aligned at two or more points thereby defining both a position and an angle.

High Throughput

An open substrate as described herein may be processed within a modular local sample processing environment. A barrier comprising a fluid barrier may be maintained between a sample processing environment and an exterior environment during certain processing operations, such as reagent dispensing and detecting. Systems and methods comprising a fluid barrier are described further in U.S. Pat. Pub. No. 2021/0354126A1, which is entirely incorporated herein by reference.

Figure 2A:
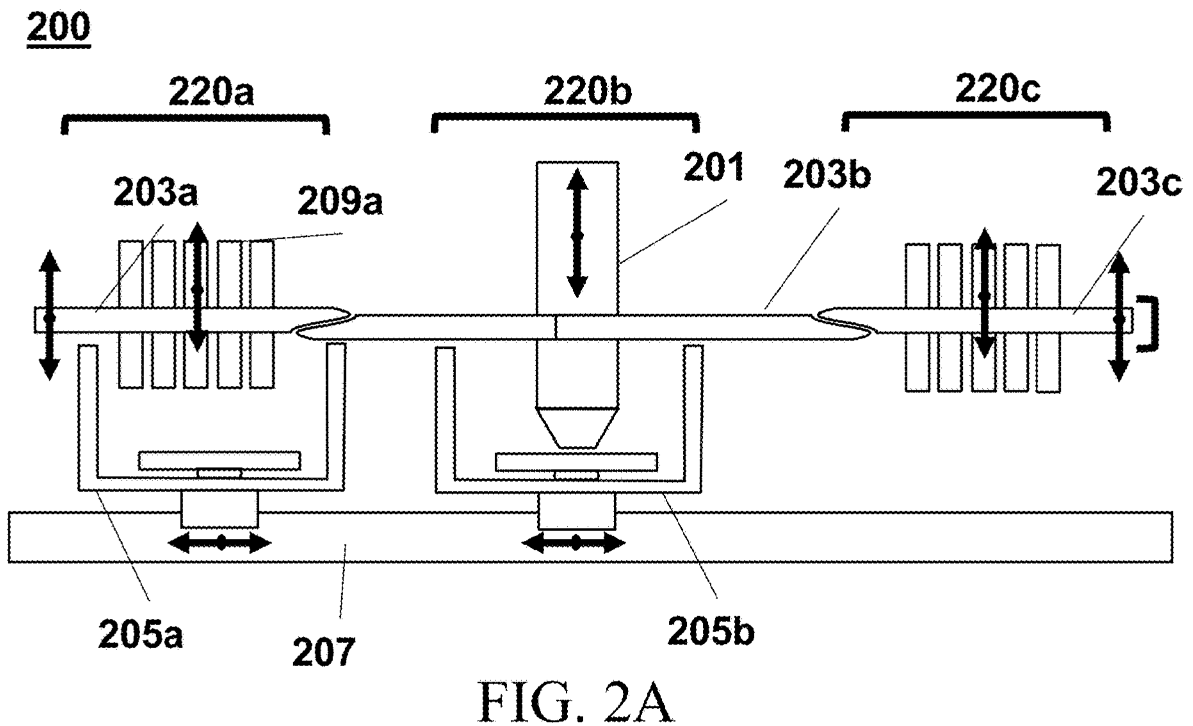
FIG. 2A and FIG. 2B illustrate multiplexed stations in a sequencing system.
Figure 2B:
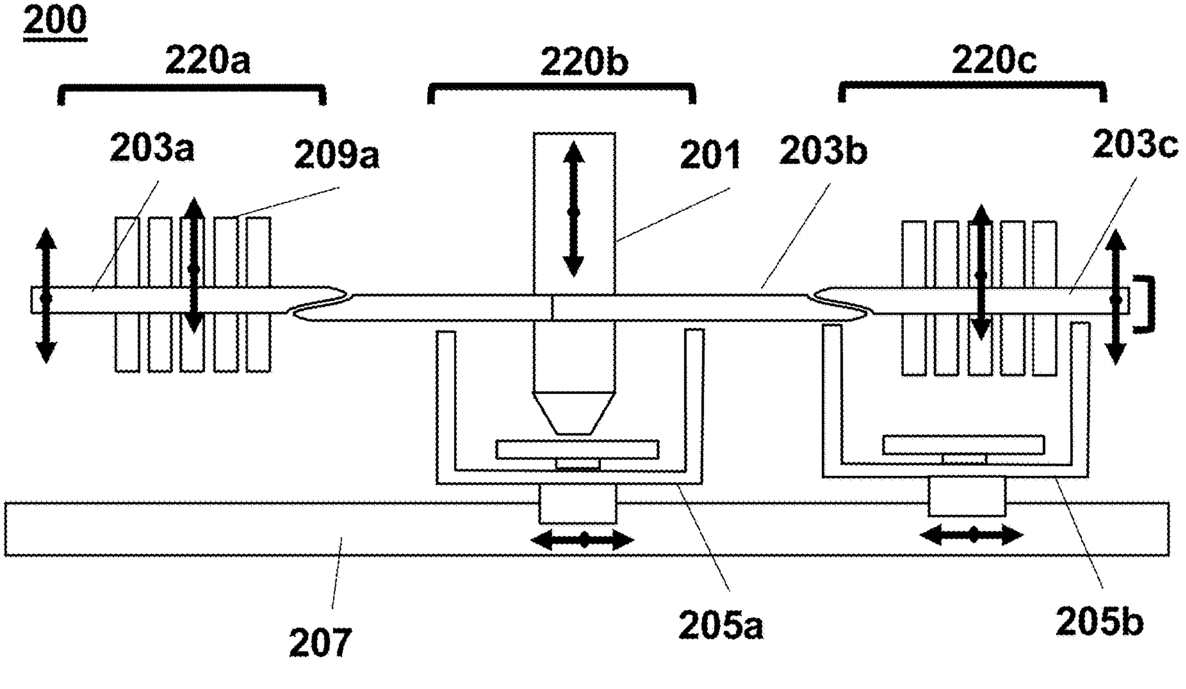

As shown in FIG. 2A and FIG. 2B, a processing system 200 (e.g., for use with open substrates) may comprise different operating stations (e.g., 220*a*, 220*b*, 220*c*). For example, an operating station may comprise a chemical station (e.g., 220*a*, 220*c*) configured for reagent dispensing, analyte processing, and/or washing; a sample loading station, a sample storage station, or a detection station (e.g., 220*b*), such as for detection of a signal or signal change. Any barrier system (e.g., 205*a*, 205*b*) of the processing system may be capable of traveling (e.g., along rail or track 207) between different operating stations, thus moving an open substrate from one operating station to another. In some instances, different barrier systems may share the same rail or track or other motion path for travel between the different operating systems (e.g., as illustrated in FIG. 2A and FIG. 2B). In such cases, the different barrier systems may be configured to move independently of each other on the same rail or track or other motion path, or to move in unison. In some instances, a respective different barrier system may move on a dedicated, separate rail or track or other motion path.

The processing system or any element thereof may be environmentally controlled. For instance, operating stations may have different local temperatures, pressures, and/or humidity. For example, a chemical station may comprise first operating conditions, and a detection station may comprise second, different operating conditions.

A barrier system may be configured to maintain a fluid barrier between a sample processing environment and an exterior environment. The barrier system is described in further detail in U.S. Pat. Pub. No. 2021/0354126, which is entirely incorporated herein by reference. A sample environment system may comprise a sample processing environment defined by a chamber and a lid plate, where the lid plate is not in contact with the chamber. While FIG. 2A and FIG. 2B illustrate a processing system 200 comprising three operating stations (e.g., 220*a*, 220*b*, 220*c*) and two barrier systems (e.g., 203*a*, 203*b*), it will be appreciated that a processing system may have any number of operating stations and any number of barrier systems.

An operating station may have one or more operating units configured to facilitate an operation with respect to a sample or the sample environment (or local environment(s) thereof). An operating unit may protrude into the sample environment of a barrier system from the external environment. An operating unit may comprise one or more detectors 201 configured to facilitate detection of a signal or signal change from a sample; a fluid dispenser (e.g., 209*a*, 209*b*) configured to facilitate reagent or fluid dispensing to a sample; an environmental unit configured to facilitate environment regulation of a sample environment; a light source, heat source, or humidity source; or any one or more sensors.

In some instances, the processing system 200 may comprise a plurality of modular plates (e.g., 203*a*, 203*b*, 203*c*)

that may be coupled or otherwise fastened to each other to create an uninterrupted plate. In some instances, each modular plate may comprise one or more operating stations (e.g., operating stations are coupled or otherwise fastened to the plate). In some instances, a modular plate may be detachable from another modular plate or a remainder of the uninterrupted plate without disturbing sample environments of respective barrier systems, such as during an operation by one or more operating units on a barrier system, while another barrier system is subject to another operation at another operating station. Beneficially, detachment of a modular plate may allow access to a sample environment, such as to load or unload a chamber, without disturbing another sample environment (e.g., contained withing another barrier system).

Chambers of the present disclosure may comprise a base and side walls to define an opening that nearly contacts the plate (or lid). The side walls may be a closed continuous surface, or a plurality of adjacent (and/or adjoining) surfaces. For example, the base may comprise or be the substrate. In some instances, the base may be coupled to the substrate. The substrate may be translatable relative to the base. The substrate may be rotatable relative to the base. While examples herein describe relative rotational motion of the substrates and/or detector systems, the substrates and/or detector systems may alternatively or additionally undergo relative non-rotational motion, such as relative linear motion, relative non-linear motion (e.g., curved, arcuate, angled, etc.), and any other types of relative motion. Beneficially, relative motion between the one or more detection units in the detection station and the substrate may significantly increase detection efficiency. Additional details of detector systems, including immersion optic systems, are available in, for example, International Pat. Pub. Nos. WO2019099886, WO20200118172, WO2020186243, each of which is herein incorporated by reference in their entireties.

In some instances, an open substrate (e.g., 230*a*, 230*b*) is retained in the same or approximately the same physical location during processing of an analyte and subsequent detection of a signal associated with a processed analyte. The open substrate may transition between different stations by transporting a sample processing environment containing the open substrate (such as the one described with respect to the barrier system) between the different stations. One or more mechanical components or mechanisms, such as a robotic arm, elevator mechanism, actuators, rails, and the like, or other mechanisms may be used to transport the sample processing environment.

FIG. 2A and FIG. 2B illustrate the multiplexing processing system 200. In this illustrative re-stationing scheme, the detection station may be kept active (e.g., not have idle time not operating on a substrate) for all operating cycles by providing alternating different sample environment systems to the detection station for each consecutive operating cycle. Beneficially, use of the detection station is optimized. Based on different processing or equipment needs, an operator may opt to run the two chemistry stations (e.g., 220*a*, 220*c*) substantially simultaneously while the detection station (e.g., 220*b*) is kept idle, such as illustrated in FIG. 2A. Beneficially, different operations within the system may be multiplexed with high flexibility and control. For example, one or more processing stations may be operated in parallel with one or more detection stations on different substrates in different modular sample environment systems to reduce or eliminate lag between different sequences of operations (e.g., chemistry first, then detection).

Computer Systems

Figure 3A:
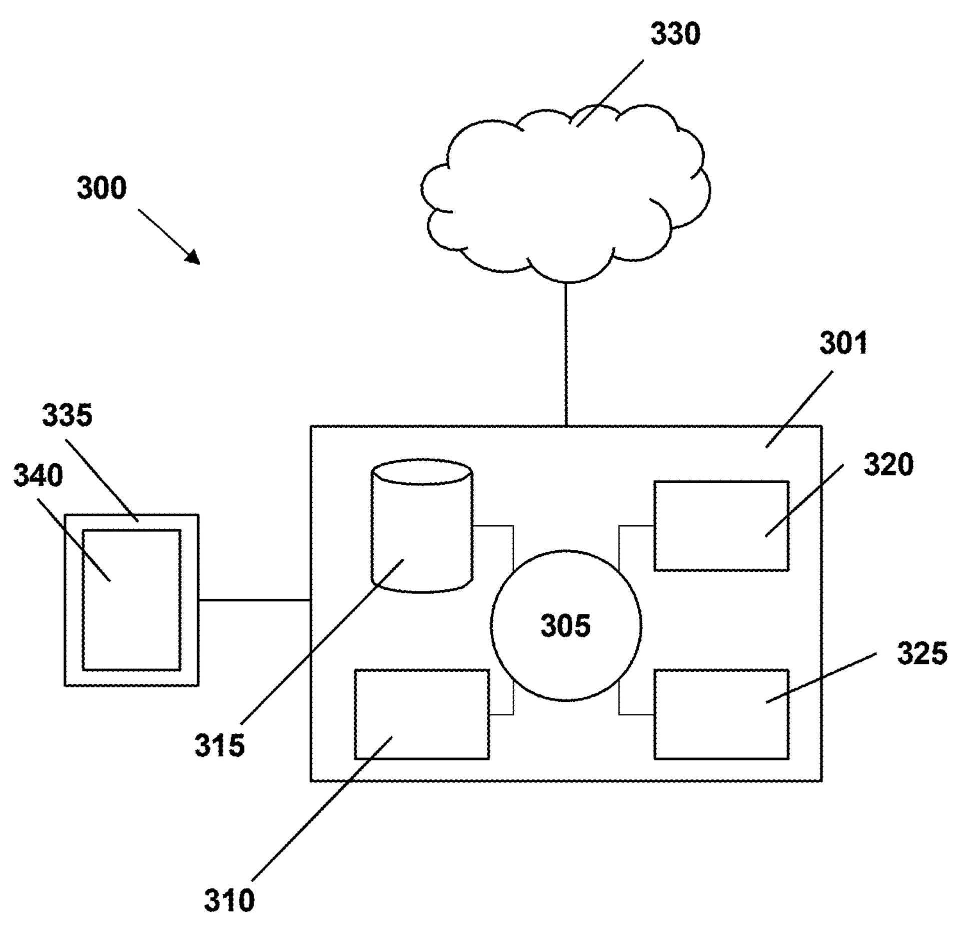
FIG. 3A illustrates a block diagram of an exemplary electronic device.

The present disclosure provides computer systems that are programed to implement systems, methods, and devices of the present disclosure. Beneficially, the systems and methods of the present disclosure may facilitate automated imaging of a sample with minimum user intervention, or in some cases, with lack of user intervention, after initiation of the automated process. FIG. 3A is a block diagram of an exemplary computer system 300 that is programmed or otherwise configured for optically inspecting (e.g., detecting) signals from a sample (e.g., an analyte) in accordance with embodiments of the present disclosure. System 300 can be a host computer connected to a network. System 300 can be a client computer or a server. In some implementations, system 300 can comprise or communicate with one or more processors 305, one or more communication interfaces such as input/output interface 340 and network interface 320, memory 315 for storing programs and instructions for execution by the one or more processors, and one or more communication buses for interconnecting these components.

In some implementations, input/output interface 340 (e.g., a user interface) includes a display and input devices such as a keyboard, a mouse, a touchscreen, or a track-pad. For example, the input/output interface 340 may be configured to provide detection results to a user and/or to receive user input, such as user instructions. In some instances, system 300 can communicate with one or more remote computer systems (e.g., through network 330). For instance, system 300 can communicate with a remote computer system of a user.

In some implements, memory 315 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. In some implementations, memory 315 includes one or more storage devices remotely located from the one or more processors 305. In some implementations, memory 315, or alternatively the non-volatile memory device(s) within memory 315, comprises a non-transitory computer readable storage medium. The components of system 300 can be connected in any suitable manner, e.g., via a physical bus or wirelessly.

Figure 3B:
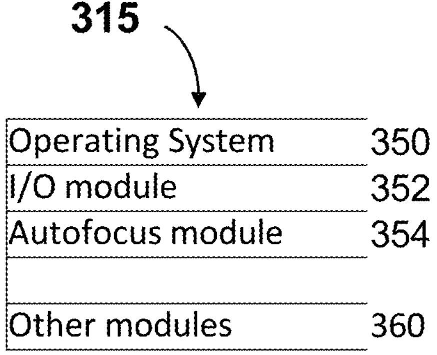
FIG. 3B provides a non-limiting example of a memory architecture.

Methods and systems of the present disclosure can be implemented by way of one or more algorithms. An algorithm can be implemented by way of software upon execution by the one or more processors 305. In some implementations, memory 315 or alternatively the non-transitory computer readable storage medium of memory 315 stores the following programs, modules and data structures, instructions, or a subset thereof (as illustrated in FIG. 3B):

Operating System 350 that includes procedures for handling various basic system services and for performing hardware dependent tasks.

I/O module 352 that includes procedures for handling various basic input and output functions through one or more input and output devices.

Autofocus module 354 that includes instructions and procedures for maintaining focus of an optical system during scanning of a substrate.

Other modules 360 that include instructions for handling other functions and aspects described herein FIG. 3A is merely illustrative of the structures of system 300. A person skilled in the art would recognize that particular embodiments of system 300 may include more or fewer components than those shown. One or more modules may be divided into sub-modules, and/or one or more functions may be provided by different modules than those shown.

While various embodiments of the invention are shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described herein as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general-purpose computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random-access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Aspects of the application are described herein with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

The term "analyte," as used herein, generally refers to an object that is directly or indirectly analyzed during a process (e.g., a chemical process, an imaging process, etc.). An analyte may originate (and/or be derived) from a sample (e.g., a biological sample). For example, an analyte may be or comprise a molecule, a macromolecule (e.g., nucleic acid, carbohydrate, protein, lipid), a cell, a tissue or tissue sample, or any combination thereof. In addition, an analyte may be or comprise a synthetic version or variant of any of the above. Processing an analyte may comprise conducting a chemical reaction, biochemical reaction, enzymatic reaction, hybridization reaction, polymerization reaction, etc. (or a combination thereof) in the presence of or on the analyte. Processing an analyte may comprise physical and/or chemical manipulation of the analyte and detection thereof. An analyte may be indirectly or directly coupled to a substrate.

In a specific example, an analyte may comprise a nucleic acid, where the nucleic acid is derived or obtained from a biological sample (e.g., a cell, a tissue sample, etc.) and where the nucleic acid is immobilized a substrate. Processing such an analyte may comprise performing a sequencing reaction of the analyte and detecting the results of such a reaction (e.g., detecting the incorporation or lack thereof of one or more nucleic acids into a growing primer molecule that is hybridized to a template analyte). Such detection may comprise determining the presence of, amount of, change in, or absence of fluorescence (e.g., a fluorescent label, a Forster resonance energy transfer (FRET) interaction, etc.) or charge (e.g., a chemical charge).

As used herein, a "detector" refers to device capable of detecting or measuring a signal (e.g., a signal derived from analyte processing). In some cases, a detector may be an electronic device that is configured to detect electromagnetic radiation (e.g., radiation incident upon one or more components of the detector). A detector may comprise a single sensor or a plurality of sensors. A detector may detect one or more signals. Detection may comprise continuous area scanning. A continuous area scanning detector may comprise a time delay and integration (TDI) charge coupled device (CCD), Hybrid TDI, or complementary metal oxide semiconductor (CMOS), or pseudo TDI device.

The term "continuous area scanning," as used herein, generally refers to area scanning in linear or non-linear paths such as rings, spirals, or arcs on a moving (e.g., rotating and/or translation) substrate using an optical imaging system and a detector. Continuous area scanning may comprise use of an imaging array sensor capable of continuous integration over a scanning area in which the scanning is synchronized (e.g., electronically synchronized) to the image of an object in relative motion. For example, relative motion between the detector units and the substrate may refer to motion by the detector units, motion of the substrate, or both.

Continuous area scanning detectors may scan at the same rate for all image positions and therefore may not be able to operate at the correct scan rate for all imaged points in a curved (or arcuate or non-linear) scan. Therefore, the scan may be corrupted by velocity blur for imaged field points on an object moving at a velocity different than the scan velocity. Continuous rotational area scanning may comprise an optical detection system or method that makes algorithmic, optical, and/or electronic corrections to substantially compensate for this tangential velocity blur, thereby reducing this scanning aberration. In some cases, different sensors of the detector may be separately configured to compensate for differential velocity blur of separate segments of the substrate being scanned. For example, the compensation is accomplished algorithmically by using an image processing algorithm that deconvolves differential velocity blur at various image positions corresponding to different radii on a rotating substrate to compensate for differential velocity blur. In some cases, the camera or scanner may apply or use a blur to compensate for differential velocity blur.

As used herein, the term "scanning" refers to detection of signals (i.e., capturing images) during relative motion of the detector and the object. As used herein, the term "imaging" refers to processing (e.g., analyzing) or using images collected from scanning.

The terms "immersion lens" or "immersion optical lens," as used herein, refer to an objective that is configured to be immersed or encased in a non-atmospheric environment (e.g., an immersion medium). An immersion lens typically has a higher numerical aperture (NA) than non-immersion lenses of the same magnification. A higher numerical aperture of a lens may be correlated with an increased refractive index of the immersion medium. In some cases, an immersion lens may be enclosed in an immersion jacket (e.g., to encompass immersion media).

The term "open substrate", as used herein, generally refers to a substantially planar substrate in which a single active surface is physically accessible at any point from a direction normal to the substrate. Substantially planar may refer to planarity at a micrometer level or nanometer level.

Alternatively, substantially planar may refer to planarity at less than a nanometer level or greater than a micrometer level (e.g., millimeter level). An open substrate may have a patterned or unpatterned surface. One or more analytes may be coupled to an open substrate (e.g., preparatory for processing the one or more analytes). Different processing operations on substrates (e.g., open substrates), scanning mechanisms, and optical detection systems are described in International Pub. No. WO2019/099886A1 and U.S. Pat. No. U.S. Pat. No. 10,852,528B1, each of which is entirely incorporated herein by reference.

The term "field of view", as used herein, generally refers to the area on the sample or substrate that is optically mapped (or is mappable) to an active area of the detector (e.g., one or more active sensors of the detector). A field of view may be segmented into two or more regions, each of which can be electronically controlled to scan at a different rate. These scanning rates may be adjusted to the mean projected object velocity within each region. The regions may be optically defined using one or more beam splitters or one or more mirrors. The two or more regions may be directed to two or more detectors. The regions may be defined as segments of a single detector or as distinct sensors of a single detector.

As used herein, the term "focal plane" refers to any plane perpendicular to an optical axis of an optical device described herein, specifically to such a perpendicular plane comprising a focal point (e.g., a plane upon where illumination and/or emission light is focused). As used herein, the terms "object plane" or "sample plane" refer to a focal plane in or on the object being imaged. As used herein, the term "image plane" refers to a focal plane incident upon a detector. In general, an image plane is a magnification of the sample plane. As used herein, the term "pupil plane" generally refers to a focal plane located inside the objective of an optical device described herein. In particular, a pupil plane represents a fast Fourier transform (FFT) of the sample plane or image plane.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

As used herein, the singular forms "a," "an," and "the" include the plural reference unless the context clearly dictates otherwise. When a range of values is provided, it is to be understood that each intervening value between the upper and lower limit of that range, and any other stated or intervening value in that stated range is encompassed within the scope of the present disclosure. Where the stated range includes upper or lower limits, ranges excluding either of those included limits are also included in the present disclosure.

As used herein, the terms "about" and "approximately," in reference to a number, is used herein to include numbers that fall within a range of 10%, 5%, or 1% in either direction (greater than or less than) the number unless otherwise stated or otherwise evident from the context (except where such number would exceed 100% of a possible value).

As used herein, the term "plurality" is used to indicate two or more of something.

EXAMPLES

The invention is further illustrated by the following non-limiting examples. These examples are provided for illustrative purposes only and not to limit the scope of the claims provided herein.

Example 1

Systems and Methods for Sequencing

The optical systems and methods described herein may be used as part of the process of sequencing nucleic acid molecules (e.g., via sequencing by synthesis) on an open substrate. It will be appreciated that these optical systems and methods may be used as part of other types of sequencing systems, and further there will be other applications beyond sequencing that may make use of these optical systems and methods (e.g., high-resolution and/or high-speed imaging).

Figures 4, 5:
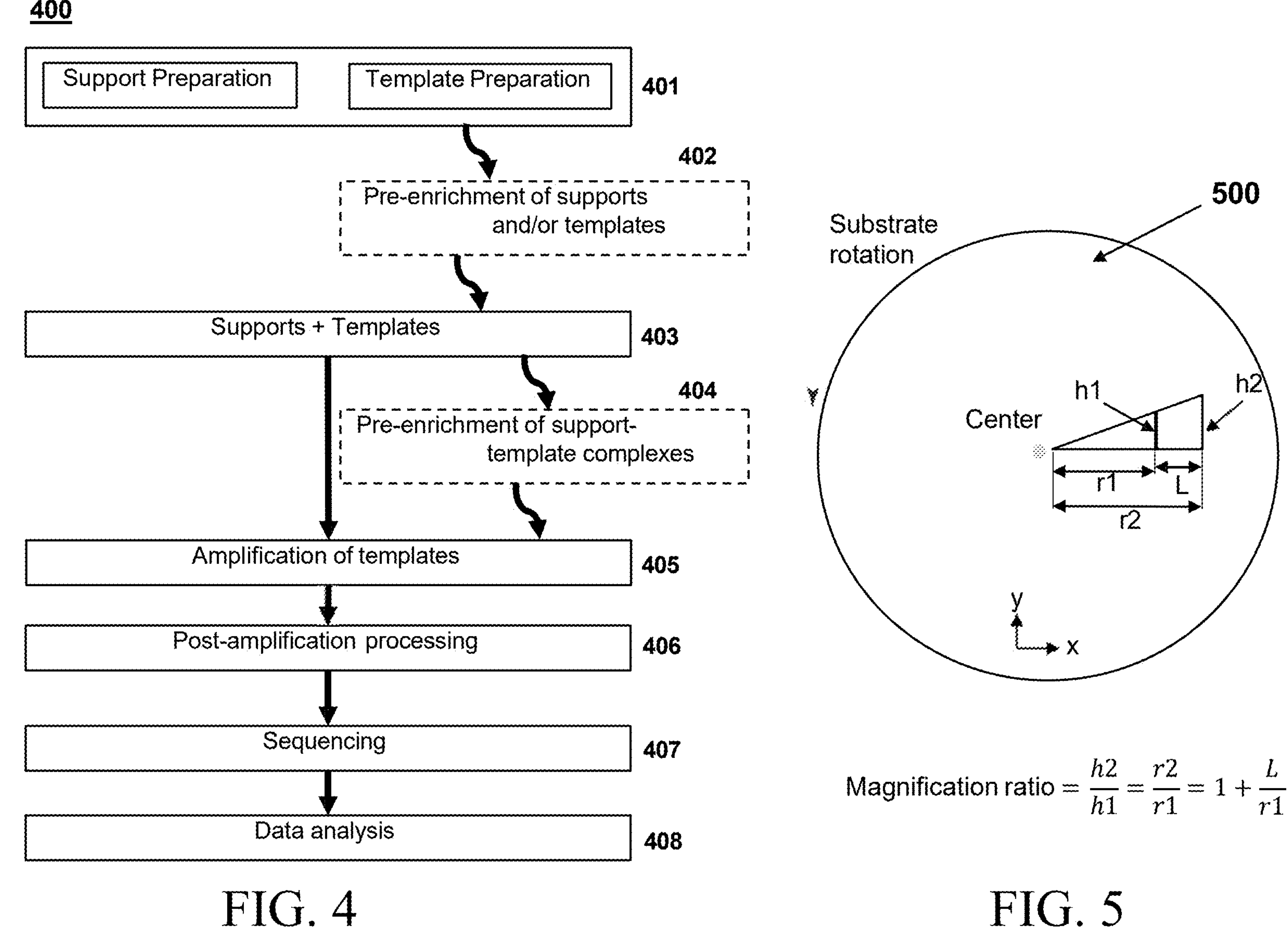
FIG. 4 illustrates an example workflow for processing a sample for sequencing.
FIG. 5 provides a non-limiting schematic illustration of a rotating substrate and a calculation of the differences in magnification required to compensate for relative motion between the substrate and an optical detection system.

Sequencing by synthesis: FIG. 4 illustrates an example sequencing workflow 400, that may be performed in accordance with aspects of the present disclosure. Supports and/or template nucleic acids may be prepared and/or provided (401) to be compatible with downstream processing (e.g., sequencing operations 407). A support (e.g., bead) may be used to help facilitate sequencing of a template nucleic acid on a substrate. The support may help immobilize a template nucleic acid to a substrate, such as when the template nucleic acid is coupled to the support, and the support is in turn immobilized to the substrate. The support may further function as a binding entity to retain molecules of a colony of the template nucleic acid (e.g., copies comprising identical or substantially identical sequences as the template nucleic acid) together for any downstream processing. This may be particularly useful in distinguishing a colony of copies of the template nucleic acid from other colonies (e.g., on other supports) and generating sequencing signals for a plurality of template nucleic acid sequences simultaneously.

A template nucleic acid may include an insert sequence sourced from a biological sample. The template nucleic acid may further comprise an adapter sequence (e.g., for capturing by a support oligonucleotide), a primer sequence, or any other functional sequence useful for a downstream operation. Optionally, the supports and/or template nucleic acids may be pre-enriched (402). Subsequent to preparation of the supports and template nucleic acids, the two may be attached (403). A template nucleic acid may be coupled to a support via any method(s) that results in a stable association between the template nucleic acid and the support. Once attached, a plurality of support-template complexes may be generated. Optionally, support-template complexes may be pre-enriched (404), wherein a support-template complex is isolated from a mixture comprising support(s) and/or template nucleic acid(s) not attached to each other.

Subsequent to attachment of the template nucleic acid molecule to the support, the template nucleic acids may be subjected to amplification reactions (405) to generate a plurality of amplification products immobilized to the support. For example, such amplification reactions may comprise performing polymerase chain reaction (PCR), including but not limited to emulsion PCR (ePCR or emPCR), isothermal amplification (e.g., recombinase polymerase amplification (RPA)), bridge amplification, template walking, etc. Emulsion PCR methods are described in further detail in U.S. Pat. Pub. No. 2022/0042072A1 and International Pat. Pub. No. WO2022/040557A2, each of which is entirely incorporated by reference herein.

Subsequent to amplification, the supports (e.g., comprising the template nucleic acids) may be subjected to post-amplification processing (406) to enrich for positive supports (e.g., those comprising a template nucleic acid molecule). Example methods of enrichment of amplified supports are described in U.S. Pat. No. 10,900,078, U.S. Pat. Pub. No. 2021/0079464A1, and International Pat. Pub. No. WO2022/040557A2, each of which is entirely incorporated by reference herein.

Subsequent to post-amplification processing, the template nucleic acids may be subject to sequencing (407). The template nucleic acid(s) may be sequenced while attached to the support. Alternatively, the template nucleic acid molecules may be free of the support when sequenced and/or analyzed. In some instances, the template nucleic acids may be sequenced while attached to the support which is immobilized to a substrate. Examples of substrate-based sample processing systems are described elsewhere herein. Labeled nucleotides may comprise a dye, fluorophore, or quantum dot.

It will be appreciated that the combinations of termination states on the nucleotides, label types (e.g., types of dye or other detectable moiety), fraction of labeled nucleotides within a flow, type of nucleotide bases in each flow, type of nucleotide bases in each flow cycle, and/or the order of flows in a flow cycle and/or flow order, can be varied for different SBS methods. In cases where unterminated nucleotides are used, multiple nucleotides may be incorporated on a template in a single sequencing flow. In cases where terminated or reversibly terminated nucleotides are used, typically a single nucleotide may be incorporated on a template in a single sequencing flow. Different types of nucleotide bases may be flowed in any order and/or in any mixture of base types that is useful for sequencing. Various flow-based sequencing systems and methods are described in U.S. Pat. Pub. No. 2022/0170089A1, which is entirely incorporated herein by reference.

Subsequent to sequencing, the sequencing signals collected and/or generated may be subjected to data analysis (408). The sequencing signals may be processed to generate base calls and/or sequencing reads. In some cases, the sequencing reads may be processed to generate diagnostics data of the biological sample, or the subject from which it was derived.

While the sequencing workflow 400 with respect to FIG. 4 has been described with respect to the use of supports to bind template molecules, it will be appreciated that the different supports may be effectively replaced by using spatially distinct locations on one or more surfaces, which do not necessarily have to be the surfaces of individual supports (e.g., beads). For example, a first spatially distinct location on a surface may be capable of directly immobilizing a first colony of a first template nucleic acid and a second spatially distinct location on the same surface (or a different surface) may be capable of directly immobilizing a second colony of a second template nucleic acid to distinguish from the first colony. In some cases, the surface comprising the spatially distinct locations may be a surface of the substrate on which the sample is sequenced, thus streamlining the amplification-sequencing workflow.

Example 2

Scanning During Relative, Rotational Motion

When a sensor scans a curved path (e.g., where a rotating substrate is scanned by a stationary camera), frame rate typically will be optimized for the velocity at the center of the sensor's field of view. However, locations on the scanned rotating surface will have differing velocities depending on their distance from the rotational axis; thus, there may be smearing (e.g., decreased resolution) at the edges of the sensor's field of view and hence in the captured frames. One method for reducing this effect is to use relatively small image sensors to minimize the blurring, which may hinder goals to achieve simultaneous high-sensitivity and high-throughput imaging.

Wedged counter scanning: One strategy for compensating for rotational motion without reducing sensor size is to create a magnification gradient across the field-of-view of the camera's image sensor (e.g., "wedged counter scanning"). FIG. 5 illustrates this concept in a top-down view of an object (e.g., a circular substrate 500) to be imaged. During camera exposure time used to acquire an image, the substrate moves a distance h1 at radial position r1 as measured from the center of the substrate (e.g., the innermost edge of the sensor) and a distance of h2 at radial position r2 (e.g., the outermost edge of the sensor). A magnification gradient across the field-of-view of the camera is created (e.g., to reduce smearing across the field-of-view) such that the ratio of the magnification at r2 to that at r1 (magnification ratio, MR) is given by $MR=h2/h1=r2/r1=1+(L/r1)$, where L is the field of view along the x (radial) axis. If L is 1.6 mm and r=60 mm, the ratio of magnification at r2 versus r1 is MR=1.03.

Differential triggering: Another strategy to compensate for rotational motion without modifying overall sensor size is to use a sensor that is modularized. For instance, each sensor module may be configured to scan, or to collect frames (e.g., clock or trigger), at a different rate. Several individual sensor modules, which may or may not be in a single line, can be disposed at differing radii from a rotational axis (e.g., of the sensor and/or of the surface), and each sensor module may be configured to clock at an independent rate based on its radial position from the rotational axis. That is, the trigger rate of each sensor may be correlated to the tangential velocity of the respective portion of the field of view the sensor is scanning. For example, a sensor module disposed closer to the rotational axis may be clocked slower than a module disposed farther from the rotational axis. This method can reduce blurring at both the scanning path of smallest radial distance arc path and the largest radial distance arc path.

Example 3

Three-Dimensional Photonic Structure for High-Resolution Optical Readout

Figure 6A:
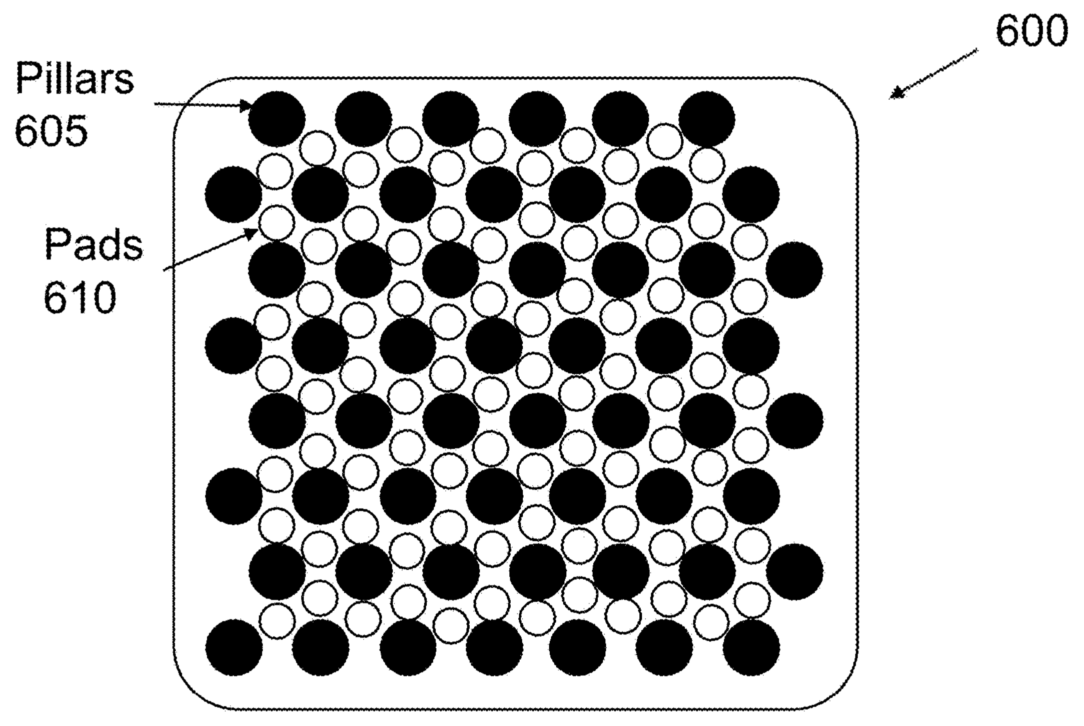
FIG. 6A shows a non-limiting top-view schematic of a substrate comprising a photonic structure.
Figure 6B:
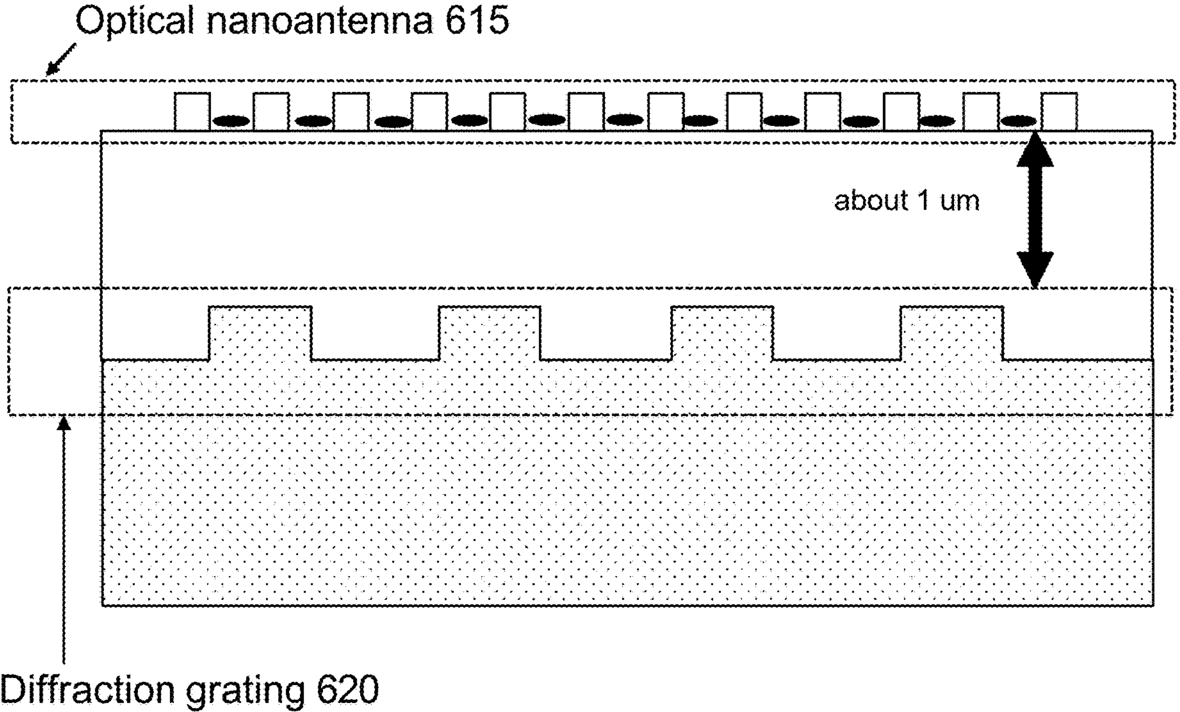
FIG. 6B shows a non-limiting side-view schematic of a substrate comprising a photonic structure.
Figure 6C:
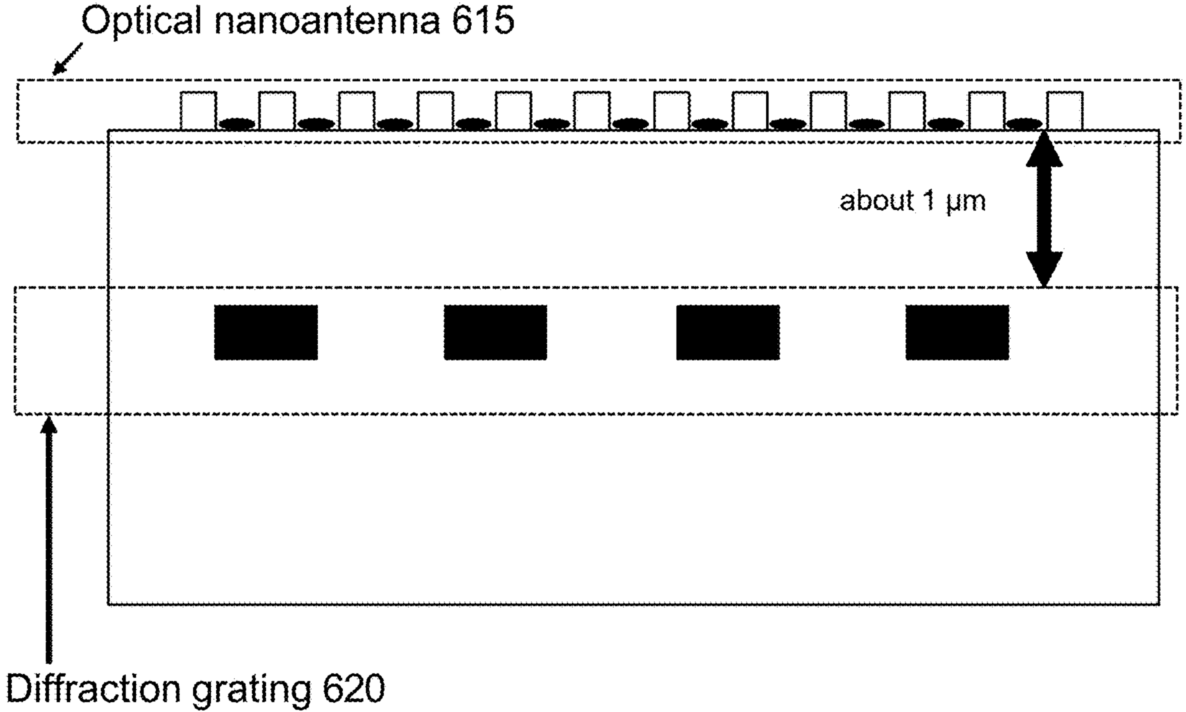
FIG. 6C shows a non-limiting side-view schematic of a substrate comprising a photonic structure.

This example describes a three-dimensional photonic structure for use in an optical system for high-resolution optical readout. The three-dimensional photonic structure is part of a substrate that includes an array of analyte binding sites at predetermined locations on the surface of the substrate. The analyte binding sites bind analytes that produce a fluorescence signal upon excitation with an excitation light. The three-dimensional photonic structure includes a first set of topographical features located on the surface of substrate and interspersed with the analyte binding sites. The first set of topographical features includes an array of nanopillars composed of metal or dielectric material. Optionally, the nanopillars are made of a metal, such as aluminum, gold, platinum, copper, or titanium, or a dielectric material such as glass, mica, quartz, fused silica, a plastic, porcelain, or a metal oxide. The nanopillar array is located on or imbedded in the surface of the substrate. As illustrated by the top view of a substrate shown in FIG. 6A, the nanopillar array (of "pillars" 605) is interspersed with the array of analyte binding sites ("pads" 610). The nanopillar array may be considered an optical nanoantenna 615. The three-dimensional photonic structure further includes a second set of topographical features imbedded in the substrate. The second set of topographical features functions as a diffraction grating 620 and is embedded in the substrate approximately 1 μm below the surface and the first set of topographical features. In a first example substrate, illustrated in the side view shown in FIG. 6B, the second set of topographical features (and thus the diffraction grating) is formed by an interface between two different materials, such as two different metal or dielectric materials, with different refractive indices. In a second example substrate, illustrated in the side view shown in FIG. 6C, the second set of topographical features (and thus the diffraction grating) is formed by imbedding a metal or dielectric material with a different refractive index within the surrounding substrate material. Diffraction grating 620 generates an interference pattern. Lateral shift of the interference pattern is controlled by illumination angle.

Figures 7A, 7B:
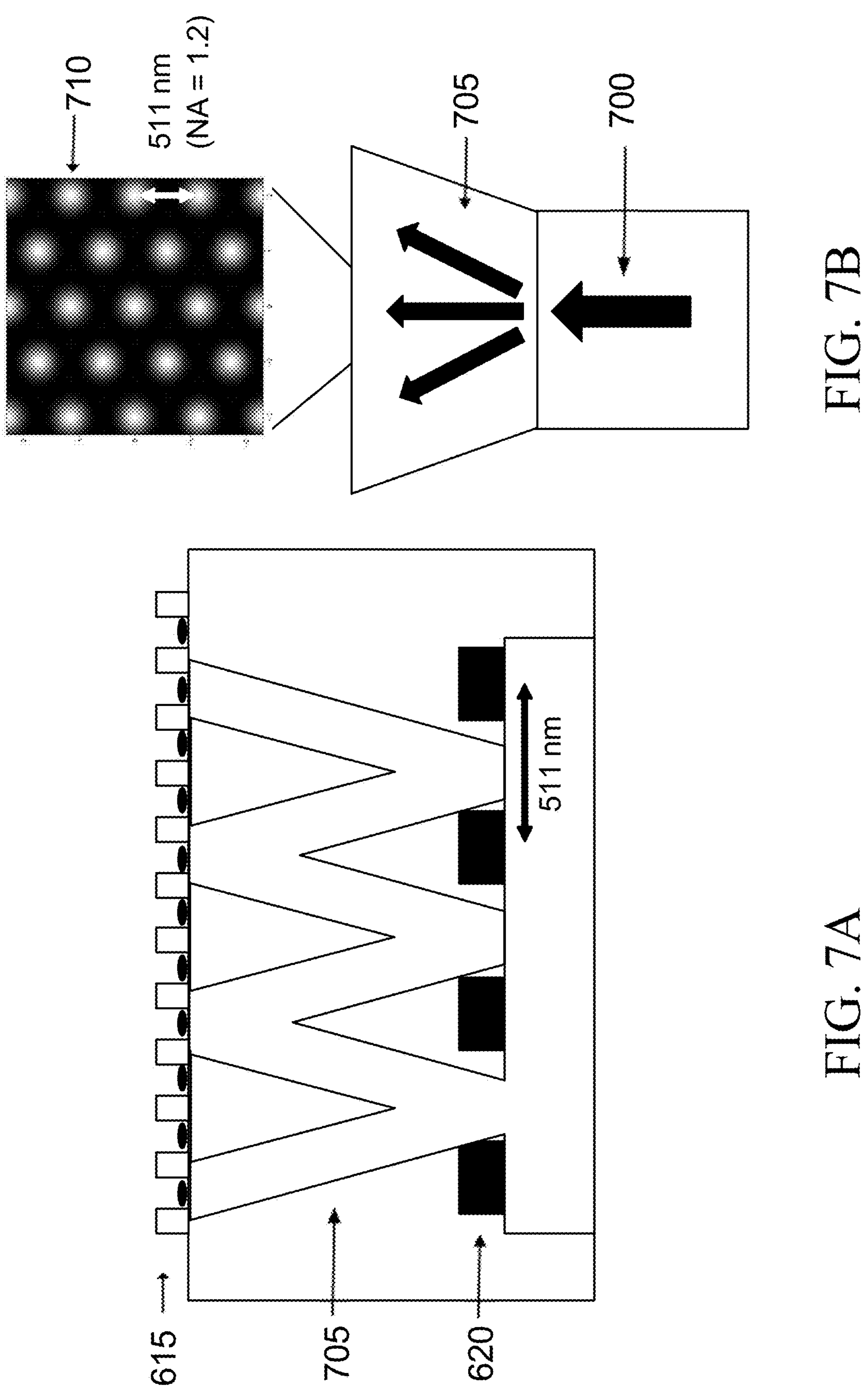
FIG. 7A shows a non-limiting side-view schematic of a patterned excitation produced by a photonic structure.
FIG. 7B shows an exemplary simulation of a selective excitation pattern on a substrate.
Figure 8A:
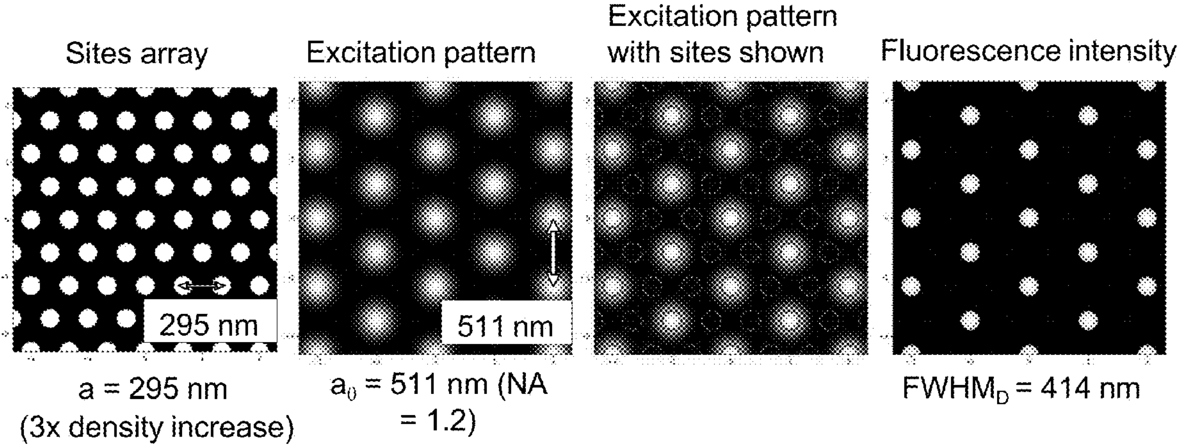
FIG. 8A shows exemplary simulations of an array of sites at predetermined locations on a substrate, a selective excitation pattern exciting a subset of the sites, an overlay of the sites and the excited subset, and the resulting fluorescence intensity from the subset of sites.

A selective excitation pattern is generated when an excitation light interacts with the first set of topographical features and the second set of topographical features. The selective excitation pattern is generated by engineering the spacing and relative positions of the diffraction grating of the second set of topographical features and the nanopillar array of the first set of topographical features. For the three-dimensional substrate illustrated in FIG. 7A and FIG. 7B, the diffraction grating 620 has a spacing of 511 nm and creates from excitation light 700 a corresponding interference pattern 705 with a spacing of 511 nm that is then projected onto the surface of the substrate. The nanopillar array 615 on the surface of the substrate then interacts with the excitation interference pattern 705 generated by the diffraction grating to create the selective excitation intensity pattern 710 (shown in the plane of the substrate) to selectively excite subsets of the analyte binding sites on the surface of the substrate. The resulting selective excitation of analyte binding sites is shown in the simulated illumination data provided in FIG. 8A. The analyte binding site array (far left) is arranged with a site spacing (a) of 295 nm between neighboring sites. The selective excitation pattern (center left) with a spacing of 511 nm selectively excites a subset of the analyte binding sites (center right). The resulting fluorescence intensity (far right) is optically resolvable with a full width at half maximum (FWHMD) of the fluorescence intensity peak of 414 nm and a spacing of 511 nm. Different subsets of analyte binding sites are excited by shifting the angle of incidence of the excitation light on the photonic structure, shifting the selective excitation pattern to excite a different subset of the analyte binding sites, as shown in the simulated illumination data provided in FIG. 8B in which the red excitation pattern corresponds to one illumination angle and the green excitation pattern corresponds to a different illumination angle.

Figure 9:
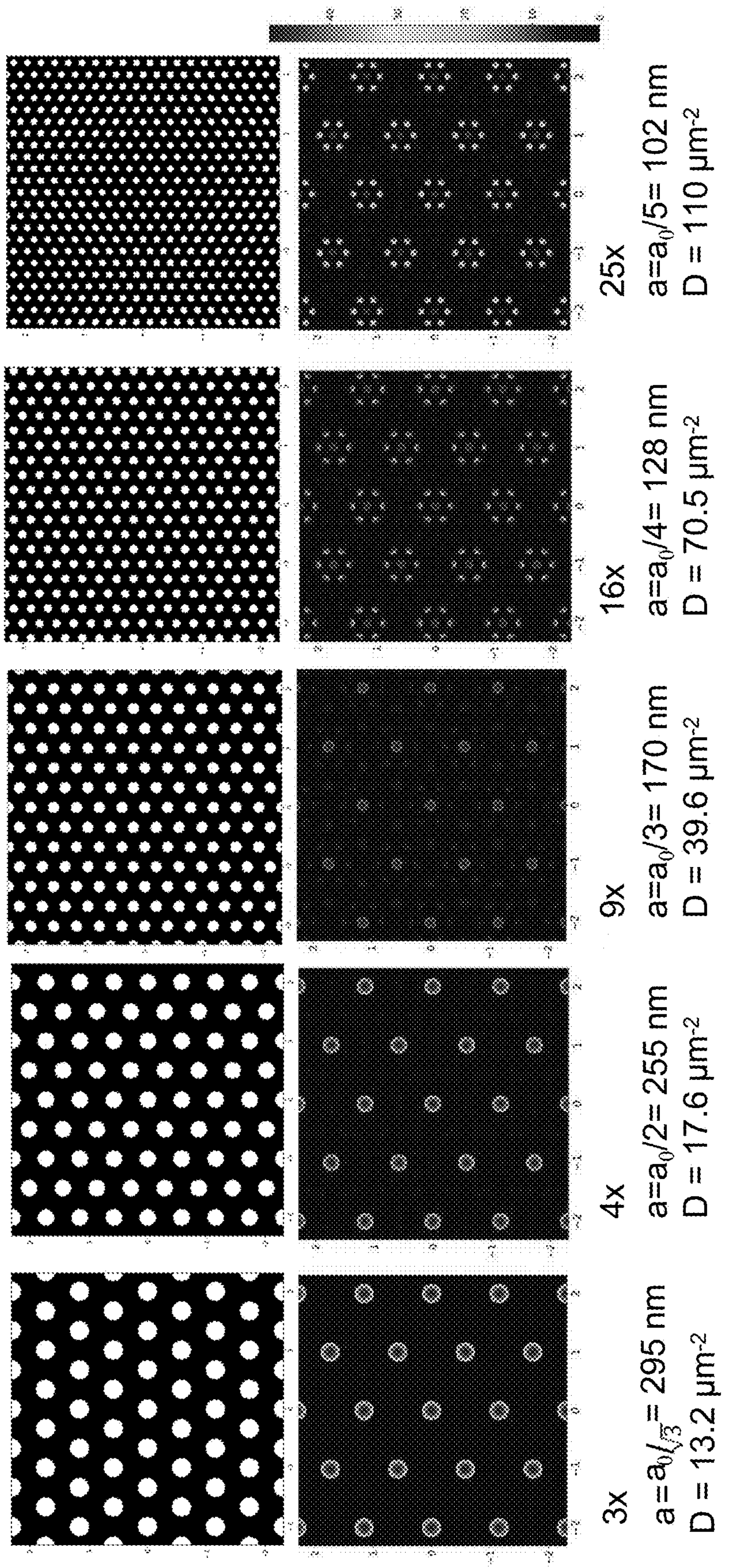
FIG. 9 shows exemplary simulations of arrays of sites at predetermined locations on a substrate (top) at different site densities on a substrate of the present disclosure, and the resulting excitation patterns (bottom) when a subset of the sites is excited.
Figure 10:
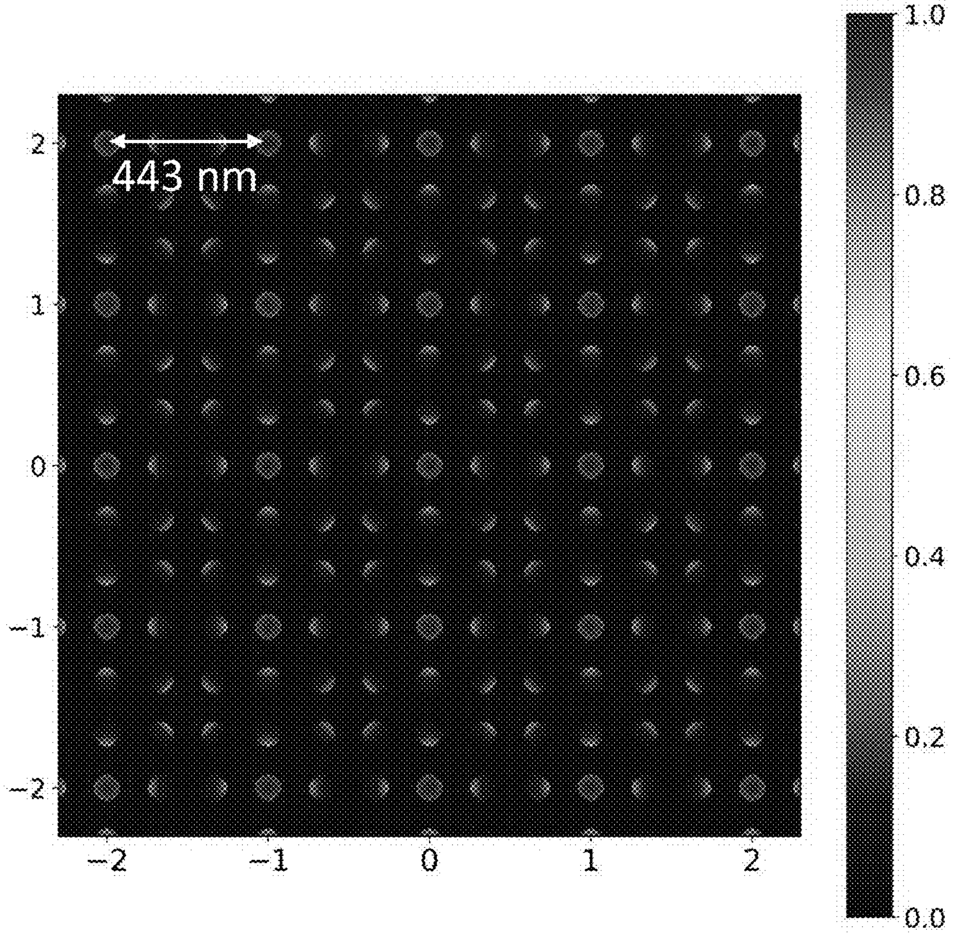
FIG. 10 shows an exemplary simulation of an excitation pattern on a substrate of the present disclosure when a subset of sites at predetermined locations is excited.

The density of the analyte binding site array on the surface of the substrate is adjusted to increase the number of analyte-binding sites while maintaining a spacing of the selectively excited subset of binding sites that is optically resolvable. The top row of FIG. 9 shows a series of substates having arrays of binding sites spaced by period "a" with the array period decreasing and the site density "D" of the array thus increasing from left to right in the figure. The bottom row of FIG. 9 shows the overlap of a simulated excitation pattern generated with a grating 620 having a period $a_0$=511 nm (NA=1.2) FWHMD=414 nm with the arrays of binding sites of different densities. In these simulations $S_D=\lambda_D/NA_D$=552 nm/0.8=690 nm and $S_I=\lambda_I/NA_I$=532 nm/1.2=443 nm. The color scale shows the spatial variation of the excitation pattern across the array of sites. As shown in the simulated illumination data of FIG. 9, as the density of analyte-binding sites in the array increases from 13.2 $\mu m^{-2}$ to 110 $\mu m^{-2}$ the spacing between the selectively excited subset of sites decreases and the ability to resolve the individual sites decreases. In this substrate configuration, the selectively excited analyte binding sites are well resolved at a density (D) of 39.6 $\mu m^{-2}$. An alternative analyte binding site array arrangement is shown in the simulated illumination data provided in FIG. 10. The analyte-binding sites may be arranged in a variety of patterns such as rectangular lattice (FIG. 10) or a hexagonal lattice (FIG. 9).

Example 4

Two-Dimensional Photonic Structure for High-Resolution Optical Readout

This example describes a two-dimensional photonic structure for use in an optical system for high-resolution optical readout. The two-dimensional photonic structure is part of a substrate that includes an array of analyte binding sites at predetermined locations on the surface of the substrate. The analyte binding sites bind analytes that produce a fluorescence signal upon excitation with an excitation light. The two-dimensional photonic structure includes a first set of topographical features located on the surface of the substrate and interspersed with the analyte binding sites. The first set of topographical features includes an array of nanopillars composed of metal or dielectric material. Optionally, the nanopillars are made of a metal, such as aluminum, gold, platinum, copper, or titanium, or a dielectric material such as glass, mica, quartz, fused silica, a plastic, porcelain, or a metal oxide. The nanopillar array is located on or imbedded in the surface of the substrate. As illustrated by the top view of a substrate 600 shown in FIG. 6A, the nanopillar array ("pillars" 605) is interspersed with the array of analyte binding sites ("pads" 610). In the present example (two-dimensional photonic structure) the first set of topographical features also includes features designed to launch and propagate surface plasmon or guided waves.

Figure 11:
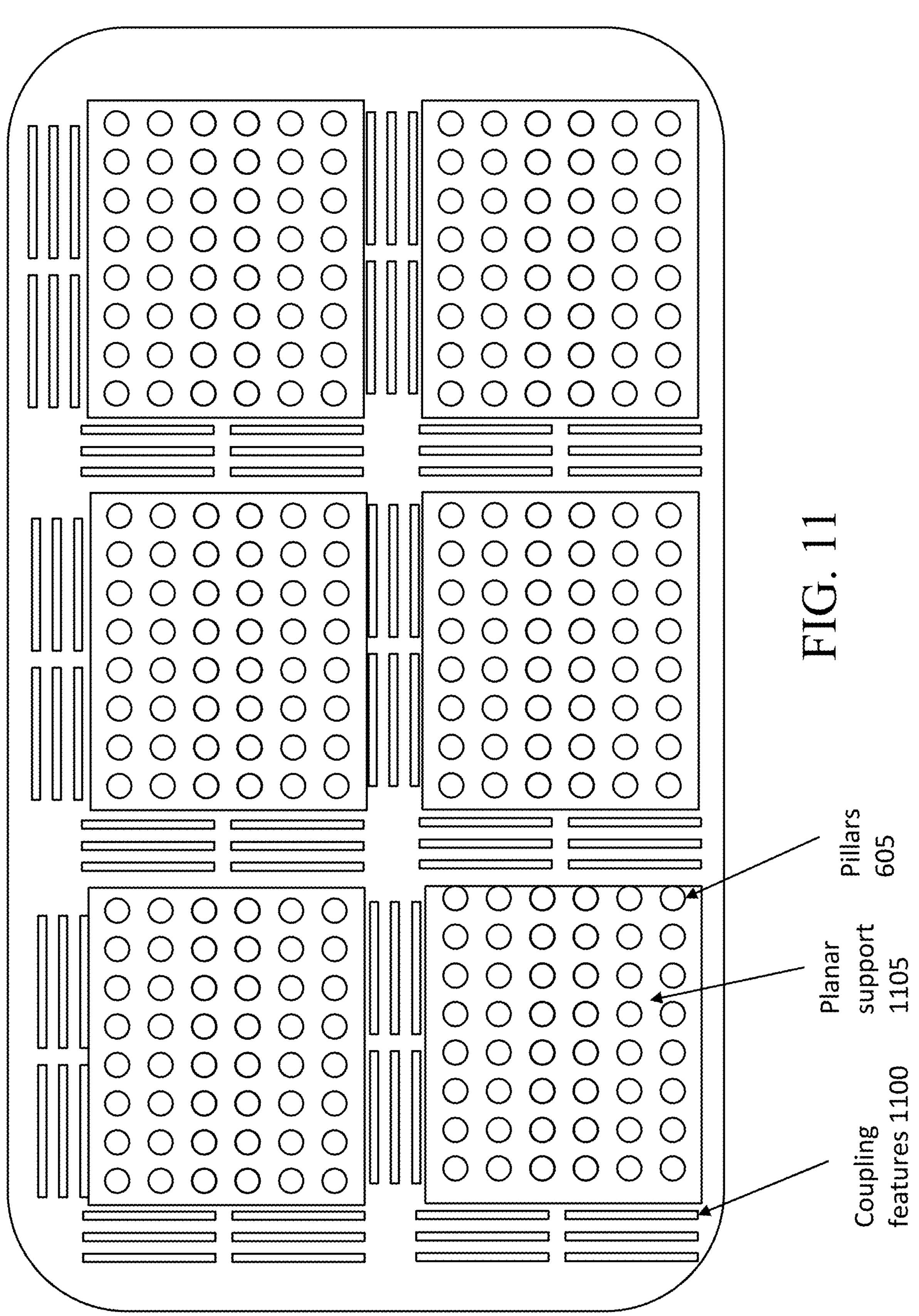
FIG. 11 shows a non-limiting top-view schematic of a substrate comprising a photonic structure.
Figure 12:
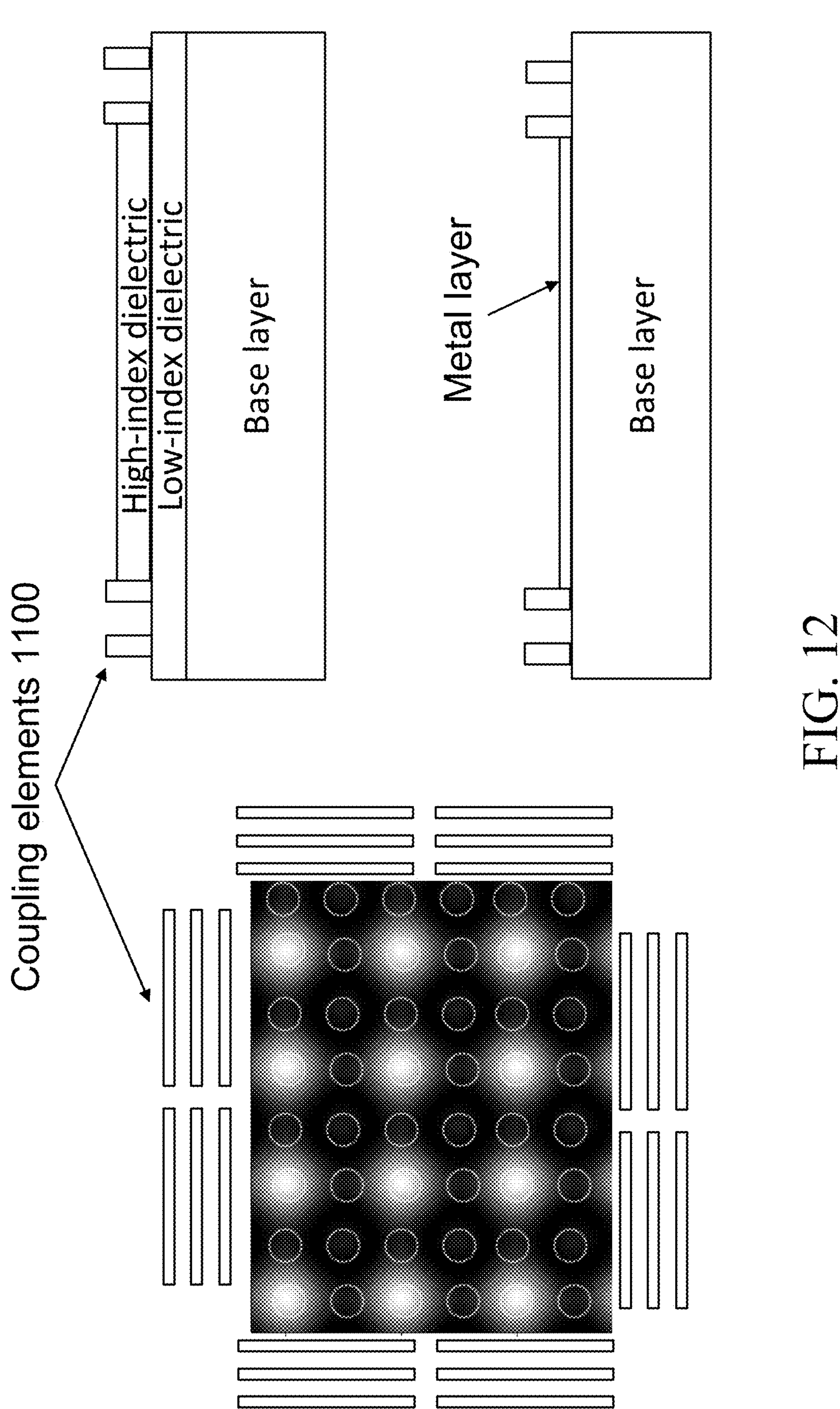
FIG. 12 shows non-limiting top-view and side-view schematics of a substrate comprising a photonic structure.

As seen in FIG. 11, the two-dimensional substrate includes a second set of topographical coupling features 1100 positioned on the periphery of the nanopillar array of the first set of topographical features. The second set of topographical features, illustrated as sets of parallel structures in FIG. 11, are arranged to launch surface plasmon or guided waves. Additionally, planar supports 1105 beneath the nanopillar arrays propagate the surface plasmon or guided waves along the substrate surface to selectively excite a subset of predetermined locations on the substrate, as shown in FIG. 12. The tiling of the wave-supporting pads and the coupling features can be designed to provide selective illumination for the site lattice (hexagonal, rectangular, . . . ). The planar supports are made of a metal layer such as aluminum, gold, platinum, copper, or titanium, or a layered low-index dielectric material and a high-index dielectric material such as glass, mica, quartz, fused silica, a plastic, porcelain, or a metal oxide.

In a first example substrate, illustrated in a first side view shown in FIG. 12 (top), a high-index dielectric material is located between the coupling elements of the second set of topographical features and a low-index dielectric material located is below the high-index dielectric material and below the coupling elements on the substrate surface. In a second example substrate, illustrated in the second side view shown in FIG. 12 (bottom), a metal material is located between the coupling elements of the second set of topographical features. The coupling elements of the second set of topographical features enable selective attenuation of surface plasmon or guided waves in a subset of analyte binding sites in the array. The surface plasmon or guided waves selectively excite the subset of analyte binding sites based on a property of the excitation light incident upon the photonic structure. Changing the property of the excited light, such as the angle of incidence, alters the surface plasmon or guided waves on the surface of the substrate, and selectively exciting a different subset of the analyte binding sites.

Example 5

Selective Excitation Via Localized Plasmon Excitation

This example describes selective excitation of subsets of predetermined locations using localized plasmon excitation. Substrates with photonic structures, such as the three-dimensional photonic structure as described in EXAMPLE 3 or the two-dimensional photonic structure as described in EXAMPLE 4, include topographical features that support localized plasmon excitation. The metallic and/or dielectric nanostructures present in the photonic structures create localized electromagnetic fields in the substrate. The excitation light is used to excite the localized surface plasmons in the photonic structures near subsets of predetermined locations on the substrate surface, which in turn excite fluorophores at the subsets of predetermined locations via near-field interactions. The size, geometry and location of the localized surface plasmons, and therefore the arrangement of the excited subset of predetermined locations, is determined by the geometry of the photonic structure. Specific excitation intensity patterns are generated by exciting different localized electromagnetic modes by applying different illumination configurations, such as illumination angle or illumination polarization. Optionally, the photonic structures that are used to create localized excitation patterns include arrays of plasmon-supporting metal nanostructures, such as nanocubes or nanocylinders, in a sub-surface layer of the substrate. The photonic structures in the sub-surface layer are covered by a protective layer of silica; arrays of metal nanocubes or nanocylinder located on the surface of the substrate between groups of sites. Optionally, the photonic structures include arrays of surface features etched into or deposited onto the surface of a substrate composed of silicon or another material with a high refractive index. Optionally, the photonic structures include arrays of plasmon-supporting nanoantennae. The photonic structures concentrate the electromagnetic energy at different predetermined locations depending on properties of the excitation light, such as angle of incidence.

In addition to providing small excitation intensity patterns with nanoscale features for enhanced selectivity of excitation, such photonic structures can provide an enhancement of excitation strength due to the concentration of electromagnetic energy in a small volume, or due to resonance enhancement of the excitation intensity.

Example 6

Simultaneous Excitation of Different Subsets of Predetermined Locations

This example describes the simultaneous excitation of different subsets of an array of predetermined locations on a substrate. Different subsets are excited by directing excitation light with different properties to different regions of the substrate. Multiple detection elements, such as multiple detectors or multiple regions of a single detector, are used to simultaneously collect optical signals from the different subsets. Excitation light is directed onto a substrate such as the three-dimensional photonic structures described in EXAMPLE 3, the two-dimensional photonic structures described in EXAMPLE 4, or the localized plasmon excitation features described in EXAMPLE 5 to generate high-resolution optical readout. Each of these photonic structures enable selective excitation of subsets of analyte-containing sites on the substrate based on a property of the excitation light incident on the photonic structure. For simultaneous excitation of different subsets, multiple beams of excitation light having different properties and directed to different regions of the substrate such that a different subset of analyte binding sites is excited in each of the different regions.

Figure 8B:
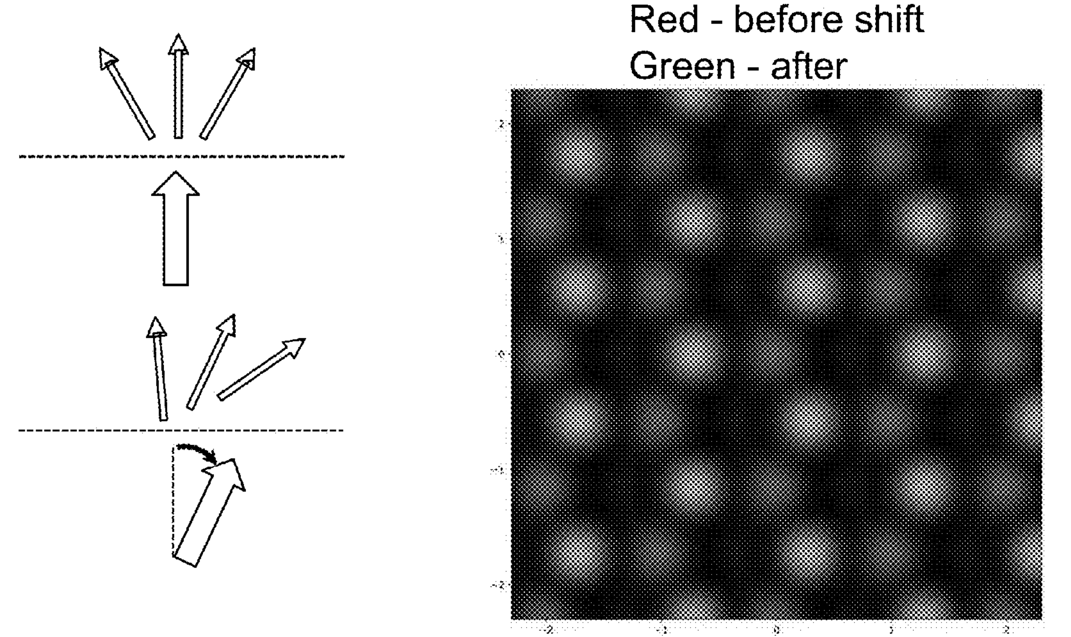
FIG. 8B shows an exemplary simulation of an array of subsets of sites at predetermined locations on a substrate excited based on an angle of incidence of an excitation light.
Figure 13A:
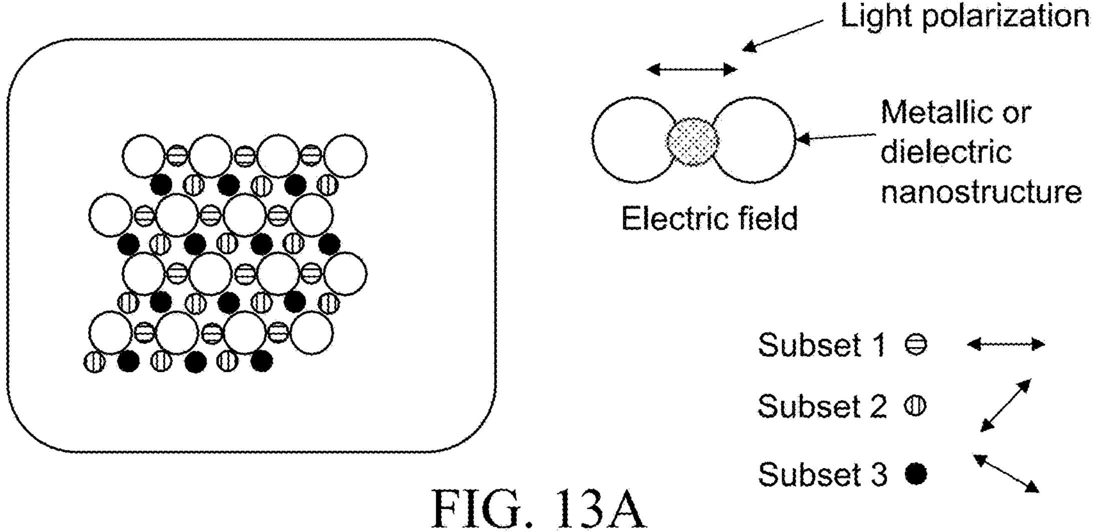
FIG. 13A illustrates selective excitation of a subset of predetermined locations on a substrate based on polarization of an excitation light.
Figure 13B:
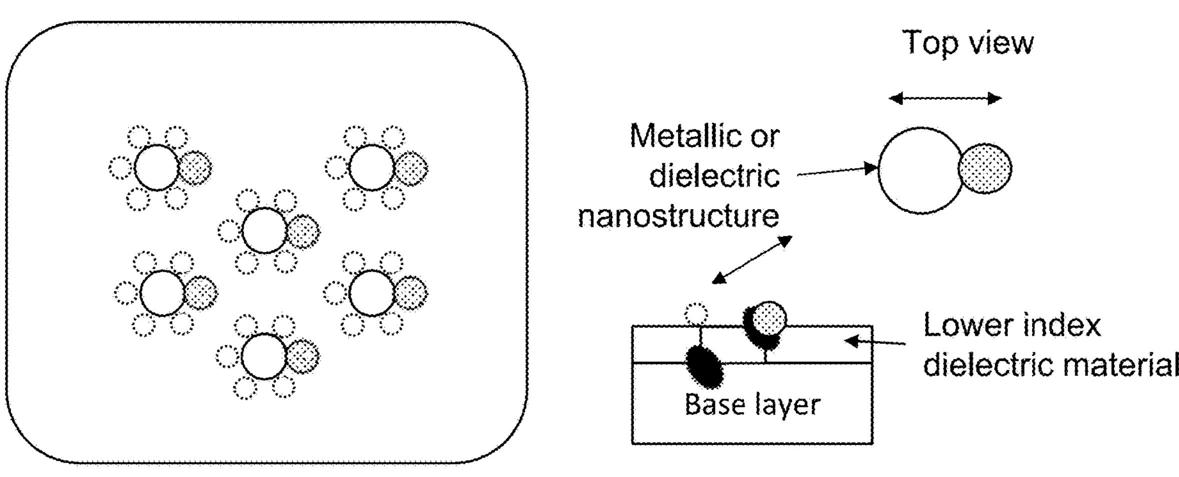
FIG. 13B illustrates selective excitation of a subset of predetermined locations on a substrate based on polarization and angle of incidence of an excitation light.
Figure 13C:
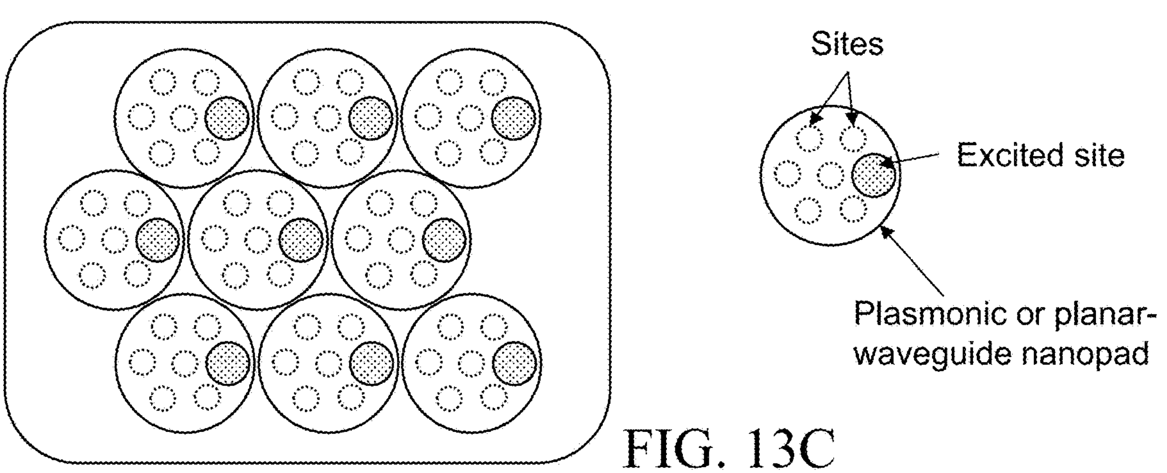
FIG. 13C illustrates selective excitation of a subset of predetermined locations on a substrate with plasmonic or planar-waveguide nanopads.

Selective excitation of subsets of the array of sites is achieved by altering a property of the excitation light incident on the photonic structure. In one example, a subset of the array is excited based on the angle of incidence of light passing through a first diffraction grating of a three-dimensional photonic structure, as illustrated in FIG. 8B. In another example, a subset of the array is excited based on interactions between the excitation light and a coupling element of a two-dimensional photonic structure, as illustrated in FIG. 12, based on properties of the excitation light. In another example, a subset of the array is excited based on polarization angle of the excitation light to generate localized plasmon excitation, as illustrated in FIG. 13A which shows three different subsets of the sites excited by three different polarization angles of the excitation light. In another example, a subset of the array is excited based on polarization angle and an angle of incidence of the excitation light to generate localized plasmon excitation, as illustrated in FIG. 13B. In another example, a subset of the array is excited within a plasmonic or planar waveguide nanopad as illustrated in FIG. 13C.

Figure 14A:
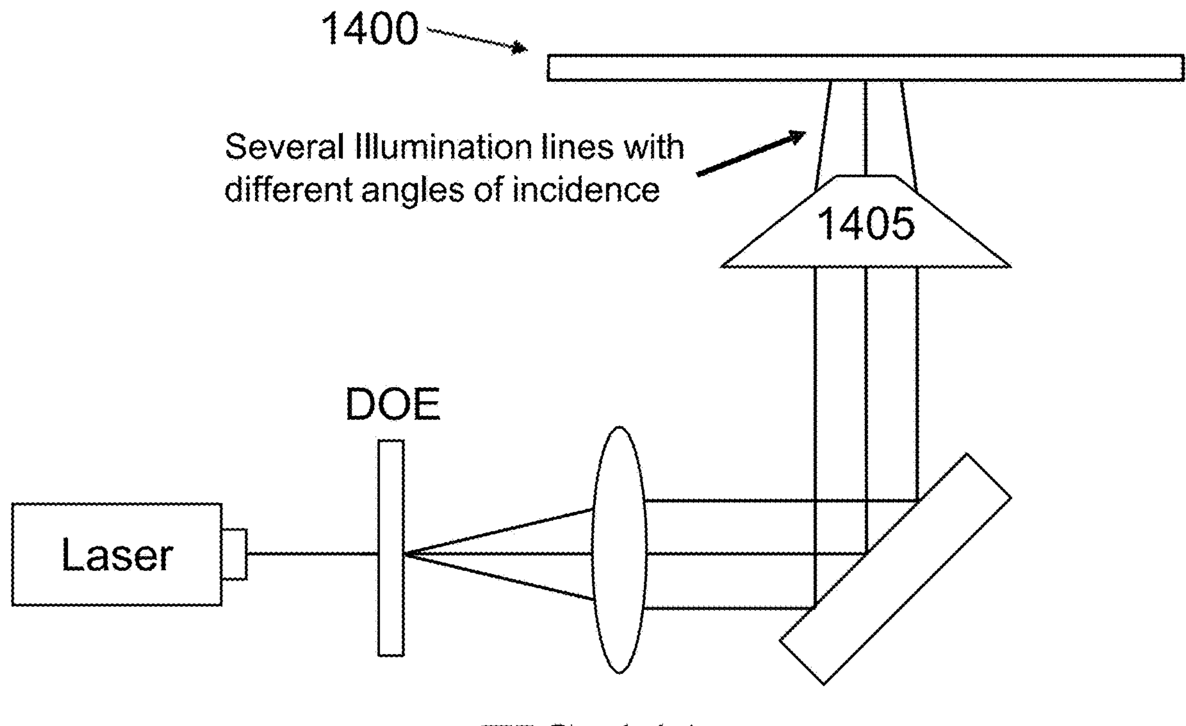
FIG. 14A shows a non-limiting schematic of an optical system for high-resolution optical readout.
Figure 14B:
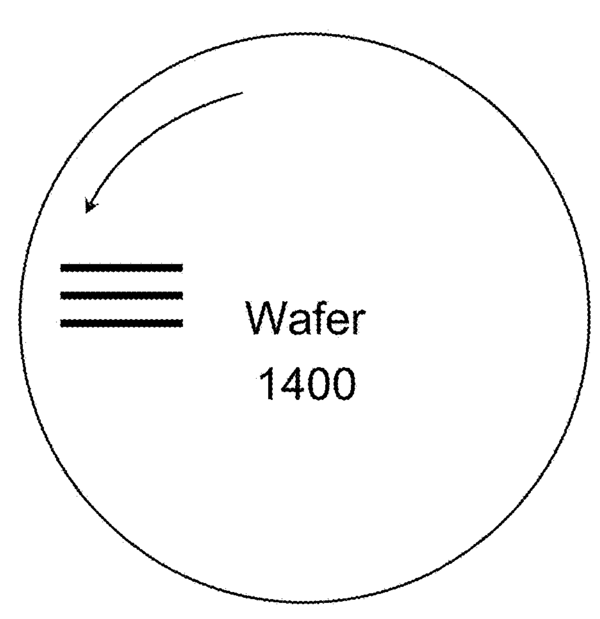
FIG. 14B shows a non-limiting schematic of a wafer substrate for high-resolution optical readout.
Figures 15A, 15B:
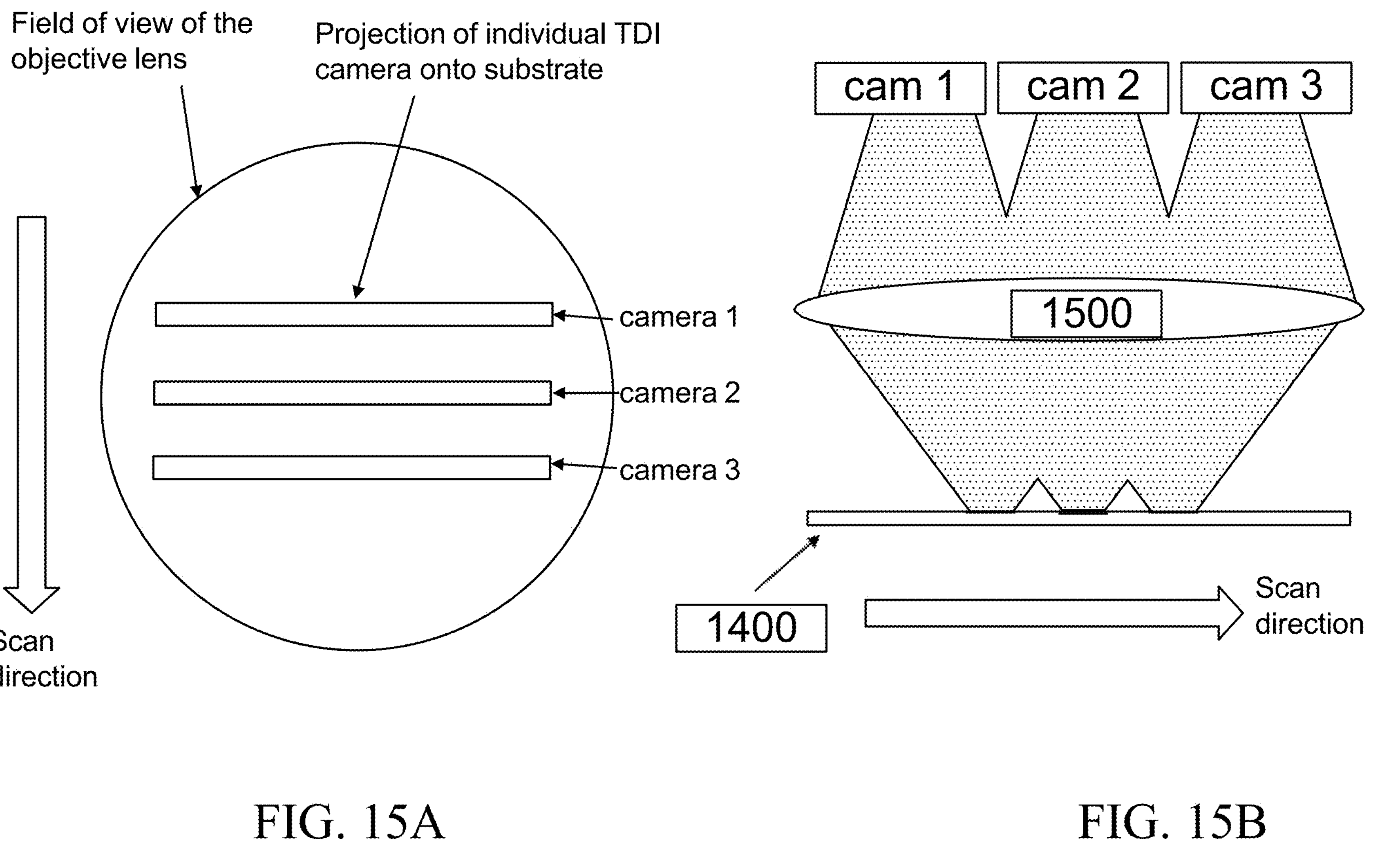
FIG. 15A shows a non-limiting schematic of regions on a substrate for simultaneous detection of multiple subsets of predetermined locations on the substrate.
FIG. 15B shows a non-limiting schematic of a camera configuration for simultaneous detection of multiple subsets of predetermined locations on the substrate.
Figures 16A, 16B:
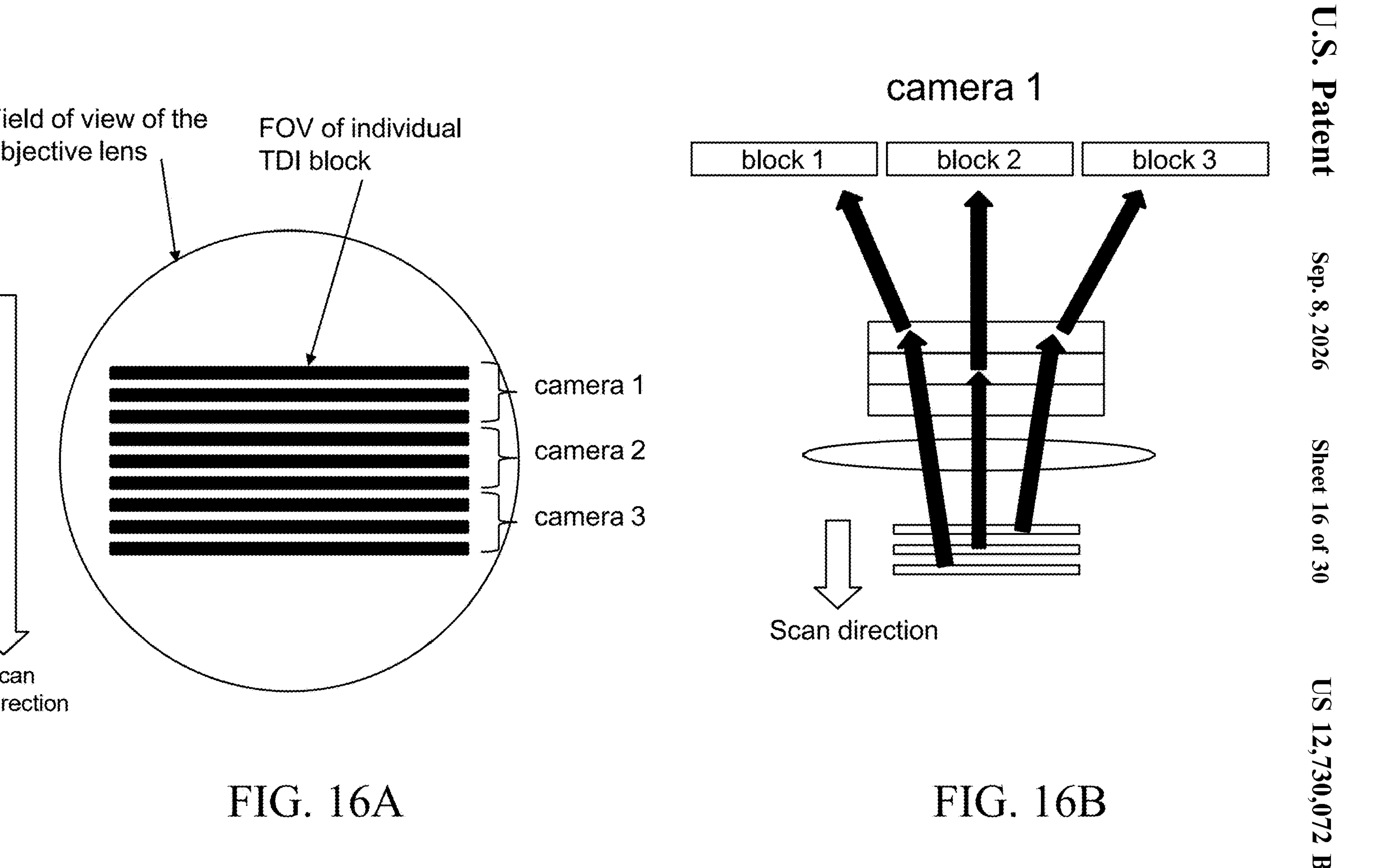
FIG. 16A shows a non-limiting schematic of regions on a substrate for simultaneous detection of multiple subsets of predetermined locations on the substrate.
FIG. 16B shows a non-limiting schematic of a camera configuration for simultaneous detection of multiple subsets of predetermined locations on the substrate.
Figure 17A:
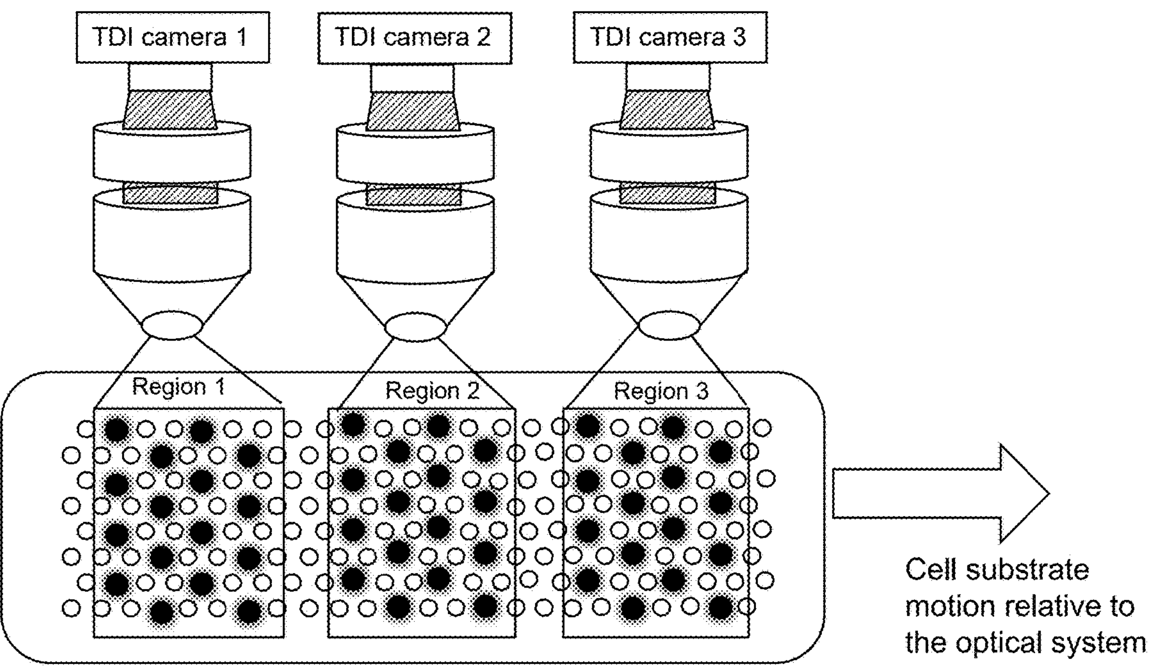
FIG. 17A shows a non-limiting schematic of a camera configuration for simultaneous detection of multiple subsets of predetermined locations on the substrate.
Figure 17B:
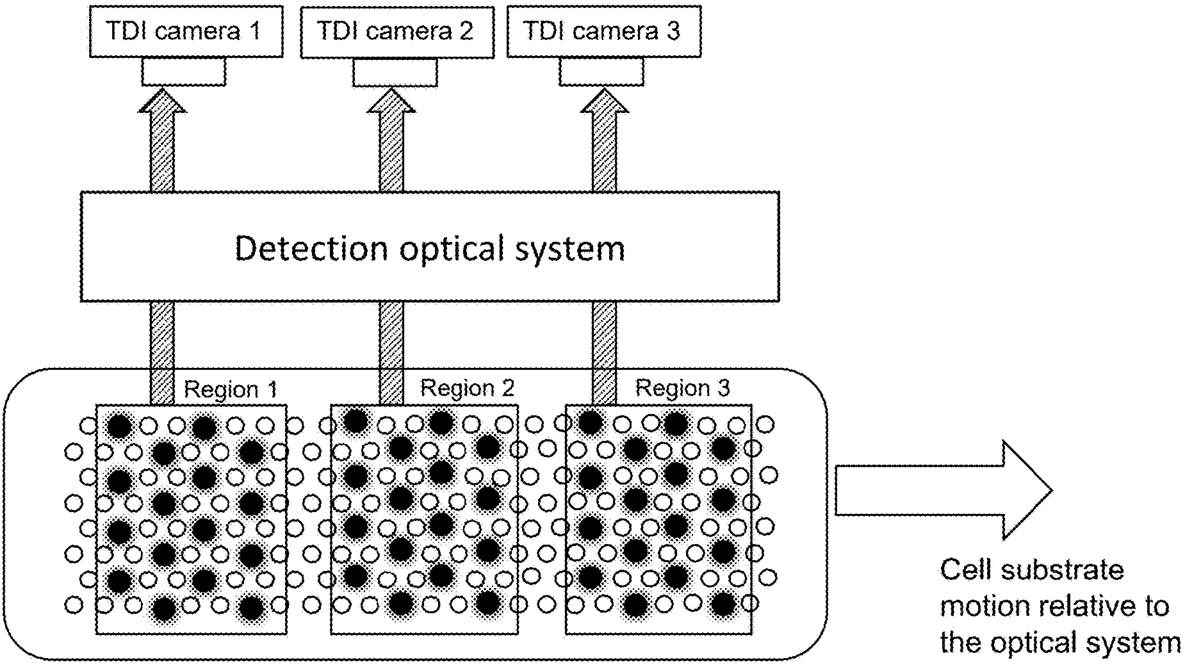
FIG. 17B shows a non-limiting schematic of a camera configuration for simultaneous detection of multiple subsets of predetermined locations on the substrate.

As shown in FIG. 14A the property of the excitation light, such as the of incidence or polarization, is differentially applied to the different beams of the excitation light (e.g., by a diffractive optical element DOE as shown), and an optical system directs each beam to a different region of the substrate 1400, such as by using a prism 1405 to alter the illumination light paths. The resulting multiple beams with different properties, such as different angles of incidence, are directed onto the substrate 1400, such as a rotating wafer, as shown in FIG. 14B. The optical signals produced by each region of the substrate illuminated by the different beams of excitation light are then detected by separate detectors or separate detection regions. The separate detectors can be multiple time delay integration (TDI) cameras. The signal detection for the multiple light paths resulting from different subsets in the array are then detected by three detection regions on the substrate 1400 ("Camera 1", "Camera 2", and "Camera 3", in FIG. 15A). A side-view of the three detection regions ("Cam 1", "Cam 2", and "Cam 3") as viewed through an objective lens 1500 is shown in FIG. 15B. A detector can be divided into separate regions to detect optical signals from multiple regions with a single detector. For example, as shown in FIG. 16A, three TDI cameras are each divided into three separate detection regions allowing for nine TDI detection regions. As shown in FIG. 16B, each TDI camera has three TDI blocks ("Block 1", "Block 2", and "Block 3") that detect optical signals from different regions of the substrate as the substrate is scanned. Light signals from different subsets of the array on the sample in different regions ("Region 1", "Region 2", and "Region 3") on the substrate are detected by separate TDI cameras (FIG. 17A) or first detected by the detection optical system and then by separate TDI cameras (FIG. 17B). The detection optical system adjusts the signal to route it to one or more of the detection regions by use of mirrors or other reflective elements.

Example 7

Sequential Excitation of Different Subsets of Predetermined Locations

This example describes the sequential excitation of different subsets of an array of predetermined locations on a substrate. Different subsets are excited by changing properties of an excitation light directed to the substrate over time. Changing the properties of the excitation light over time sequentially excites different subsets of the predetermined locations, and optical signals produced by each of the subsets are collected. Excitation light is directed onto a substrate such as the three-dimensional photonic structures described in EXAMPLE 3, the two-dimensional photonic structures described in EXAMPLE 4, or the localized plasmon excitation features described in EXAMPLE 5 to generate high-resolution optical readout. Each of these photonic structures enable selective excitation of subsets of analyte-containing sites on the substrate based on a property of the excitation light incident on the photonic structure. For sequential excitation of different subsets, the property of the excitation light is changed over time, so that a single subset is excited at a time.

Selective excitation of subsets of the array is achieved by altering a property of the excitation light incident on the photonic structure. In one example, a subset of the array is excited based on the angle of incidence of light passing through a first diffraction grating of a three-dimensional photonic structure, as illustrated in FIG. 8B. In another example, a subset of the array is excited based on interactions between the excitation light and a coupling element of a two-dimensional photonic structure, as illustrated in FIG. 12, based on properties of the excitation light. In another example, a subset of the array is excited based on polarization angle of the excitation light to generate localized plasmon excitation, as illustrated in FIG. 13A. In another example, a subset of the array is excited based on polarization angle and an angle of incidence of the excitation light to generate localized plasmon excitation, as illustrated in FIG. 13B. In another example, a subset of the array is excited within a plasmonic or planar waveguide nanopad, as illustrated in FIG. 13C.

Excitation light having a first property is directed to the substrate, and a first subset is excited. Optical signals produced by the first subset are detected by a detector. The property of the excitation light, such as the angle of incidence or the polarization, is then changed to selectively excite a second subset of the array, and the resulting optical signals are detected by the detector. This process is repeated until the optical signals of all subsets in the array have been detected.

Example 8

Interference Patterns for Selective Excitation

Figure 18:
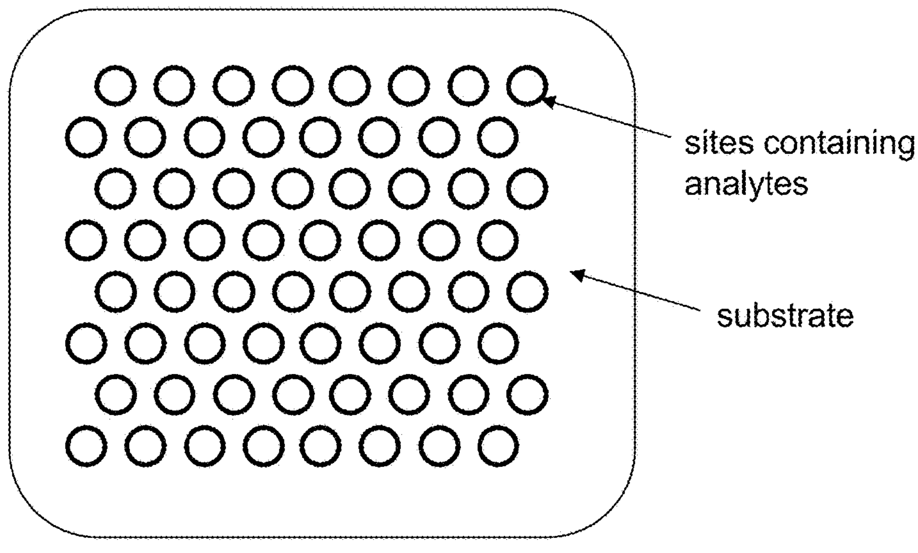
FIG. 18 shows a non-limiting schematic of an array of analyte binding sites at predetermined locations on a substrate.
Figure 19A:
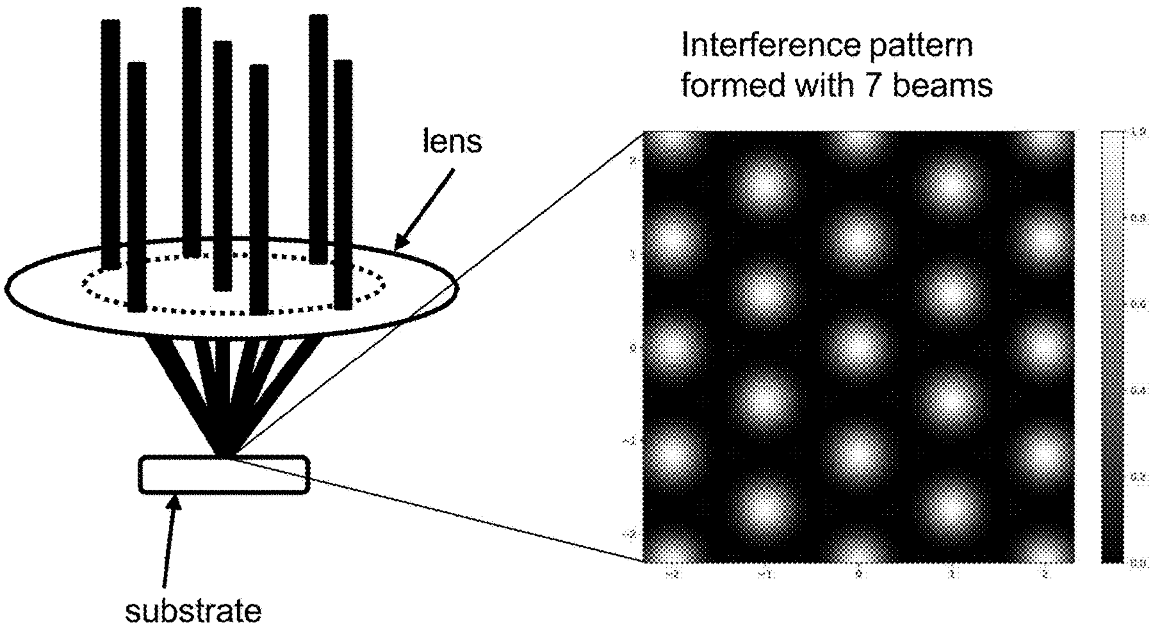
FIG. 19A shows a non-limiting schematic of an array of analyte binding sites at predetermined locations on a substrate.
Figure 19B:
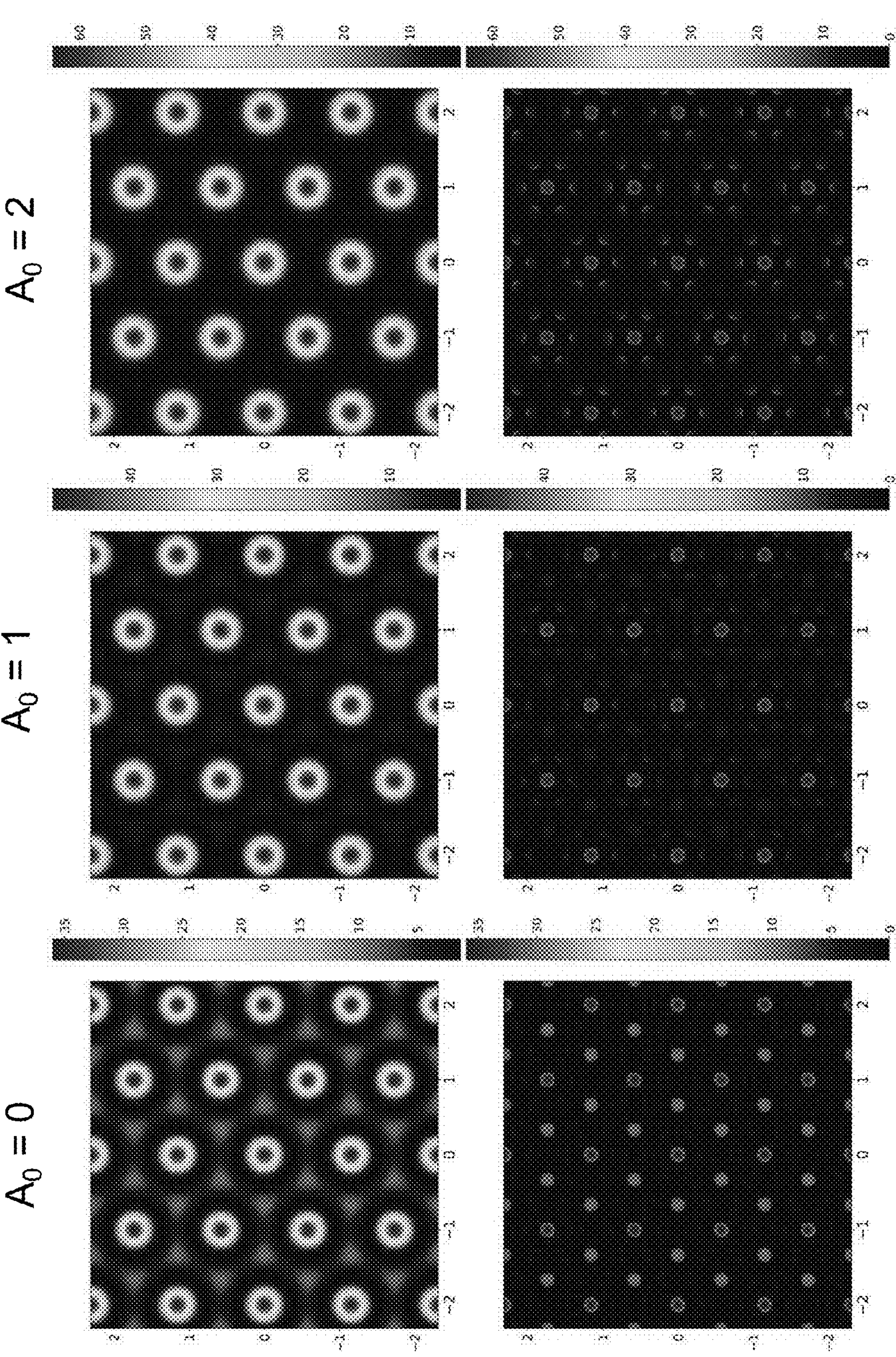
FIG. 19B shows exemplary simulations of array of a patterned excitation on a substrate (top) at different numerical apertures, and the resulting excitation patterns (bottom) when a subset of analyte binding sites is excited.

This example describes the generation of an interference pattern for selective excitation of a subset of predetermined locations on a substrate. The interference pattern is generated through light patterning optics and projected onto a substrate containing an array of analyte binding sites at predetermined locations (FIG. 18). Optionally, the substrate includes a three-dimensional photonic structure as described in EXAMPLE 3, a two-dimensional photonic structure as described in EXAMPLE 4, or a substrate that supports local plasmon excitation as described in EXAMPLE 5. In one configuration, excitation light in a 7-beam interference pattern passes through a lens to the substrate (FIG. 19A) to excite analytes present at analyte-binding sites on the substrate. The interference pattern is projected onto the substrate such that subsets of the analyte binding sites are selectively excited. The density of the excitation beams in the interference pattern can be adjusted (FIG. 19B, top), as shown for configurations with $A_0$ of 0 (top left), 1 (top center), 2 (top right), to change density of the sites that are selectively excited (FIG. 19B, bottom) and therefore the resolution of the optical readout. The color scales in FIG. 19B shows the spatial variation of the excitation pattern across the array of sites (top) and the spatial variation of signal detected from the array sites (bottom) when excited by the corresponding excitation pattern. In the example of FIG. 19B $\lambda_I=3\lambda_L$, $a=a_0/3=157$ 157 nm, and $D=46\ \mu m^{-2}$.

Figure 20:
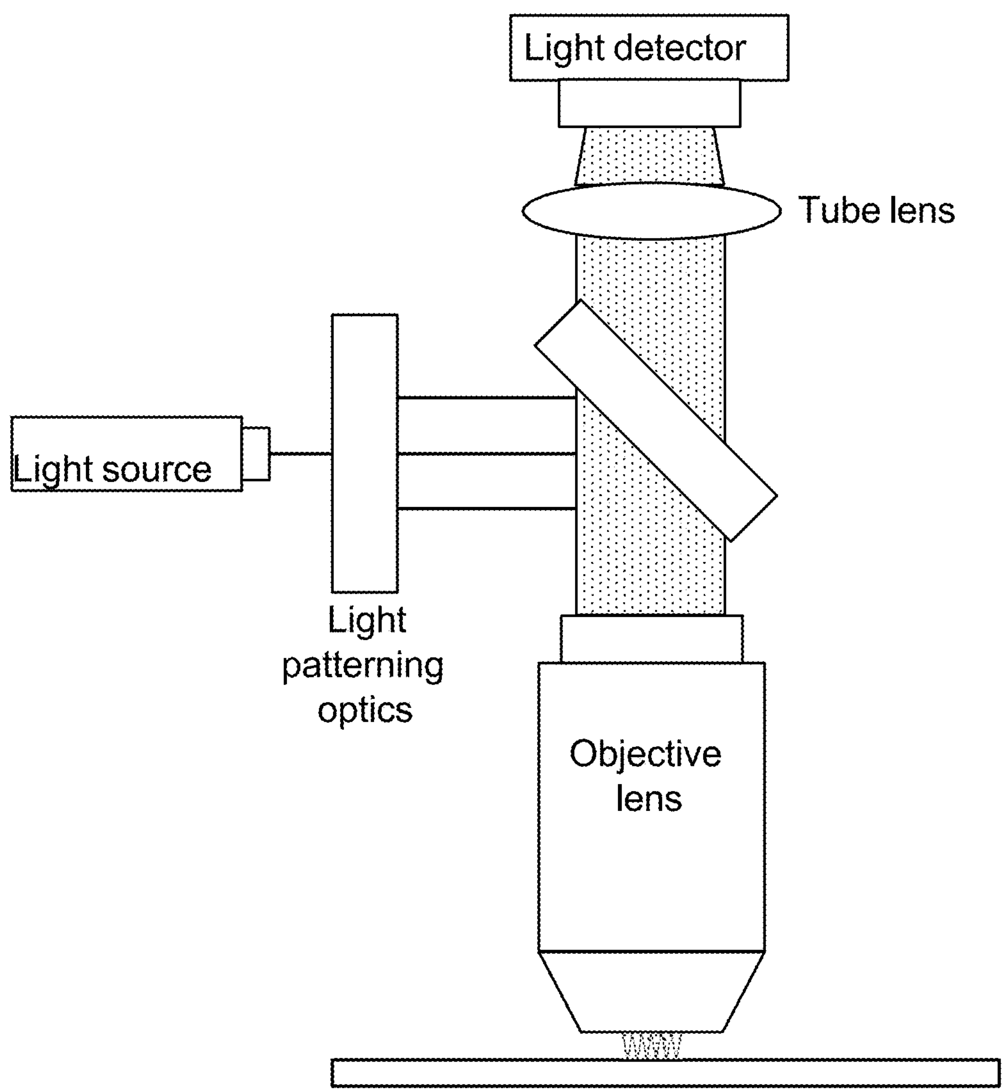
FIG. 20 shows a non-limiting schematic of an optical system for high-resolution optical readout.
Figures 21, 22:
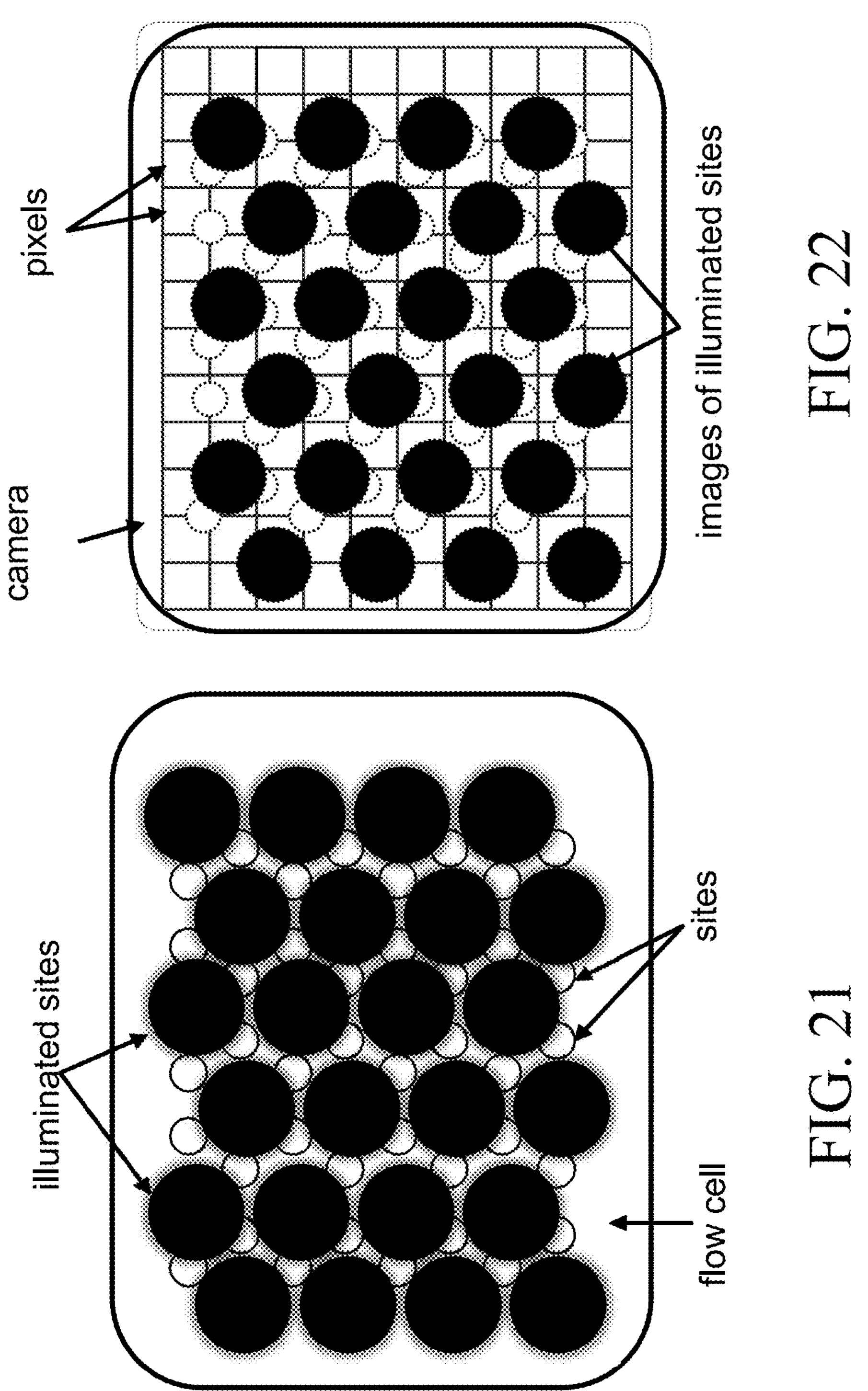
FIG. 21 illustrates selective excitation of a subset of analyte binding sites on a substrate.
FIG. 22 illustrates an optical signal produced by a subset of analyte binding sites excited on a substrate.
Figure 23:
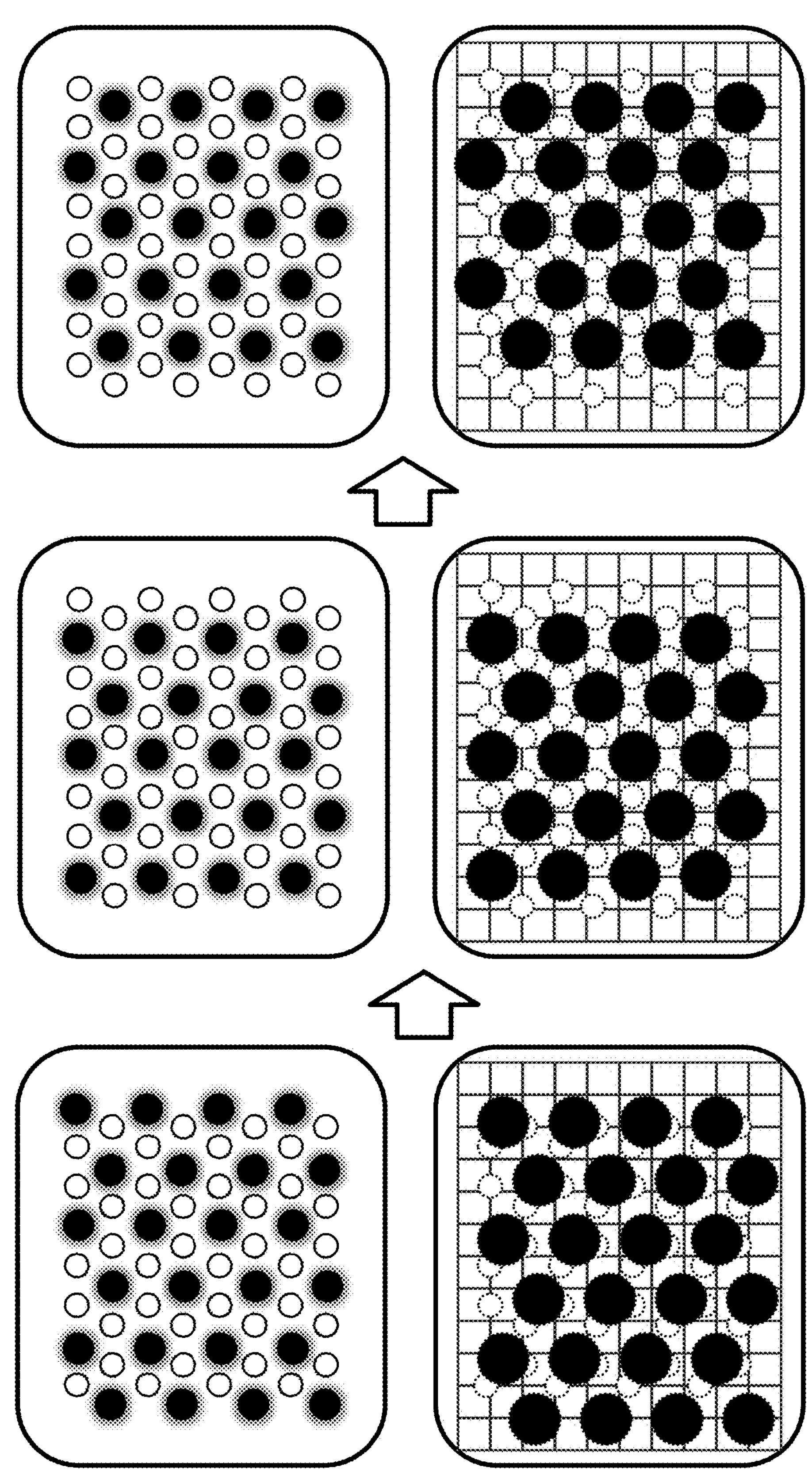
FIG. 23 illustrates sequential selective excitation of subsets of analyte binding sites using an optical system of the present disclosure and the resulting optical signals.
Figure 24:
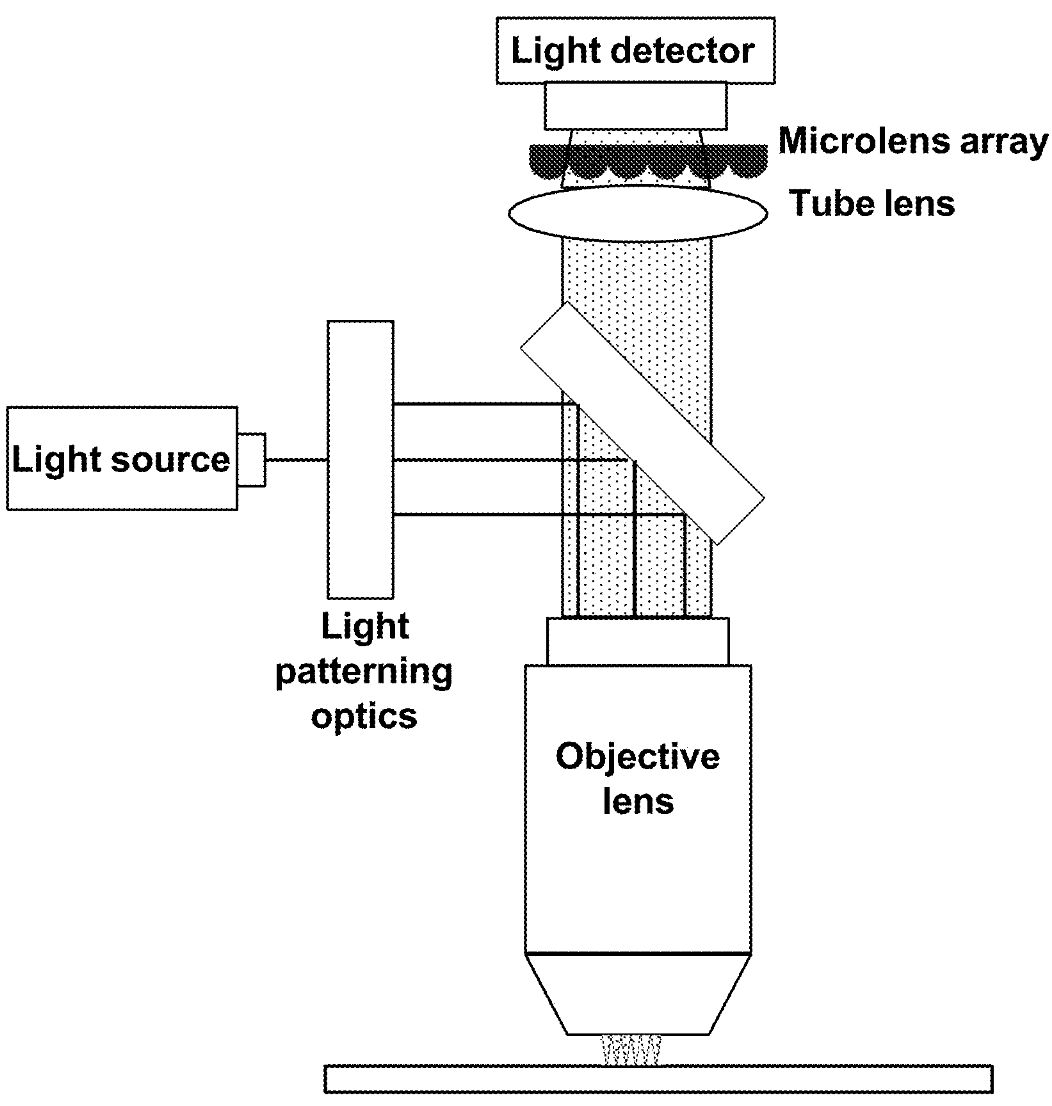
FIG. 24 shows a non-limiting schematic of an optical system for high-resolution optical readout.
Figure 25:
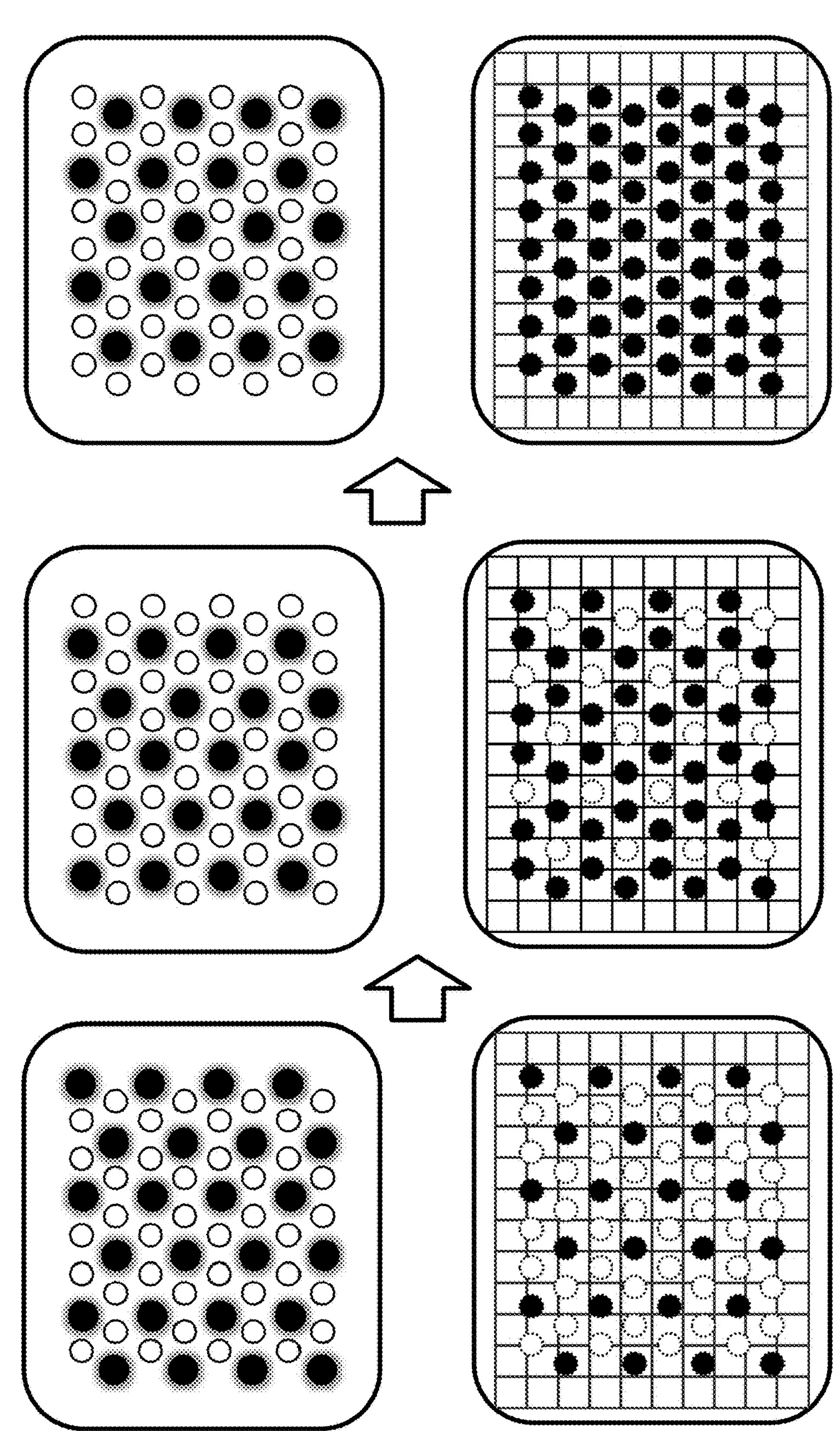
FIG. 25 illustrates sequential selective excitation of subsets of analyte binding sites using an optical system of the present disclosure and the resulting optical signals.

An optical system configured to generate a patterned excitation, direct the patterned excitation to the substrate, and collected the resulting optical readout is shown in FIG. 20. The interference excitation pattern excites a subset of analyte-binding sites on a substrate (FIG. 21) which produces optical signals, such as images, of the illuminated sites (FIG. 22). By sequentially changing the interference excitation pattern, or by simultaneously projecting different interference patterns on different regions of the substrate, different subsets of the analyte-binding sites arrays are excited (FIG. 23, excitation patterns on the left and corresponding signal patterns on the right). To increase the resolution of the optical system, a microlens array is added before the detector (FIG. 24) that improves the optical readout when imaging subsets of the analyte-binding site array (FIG. 25).

Figure 26:
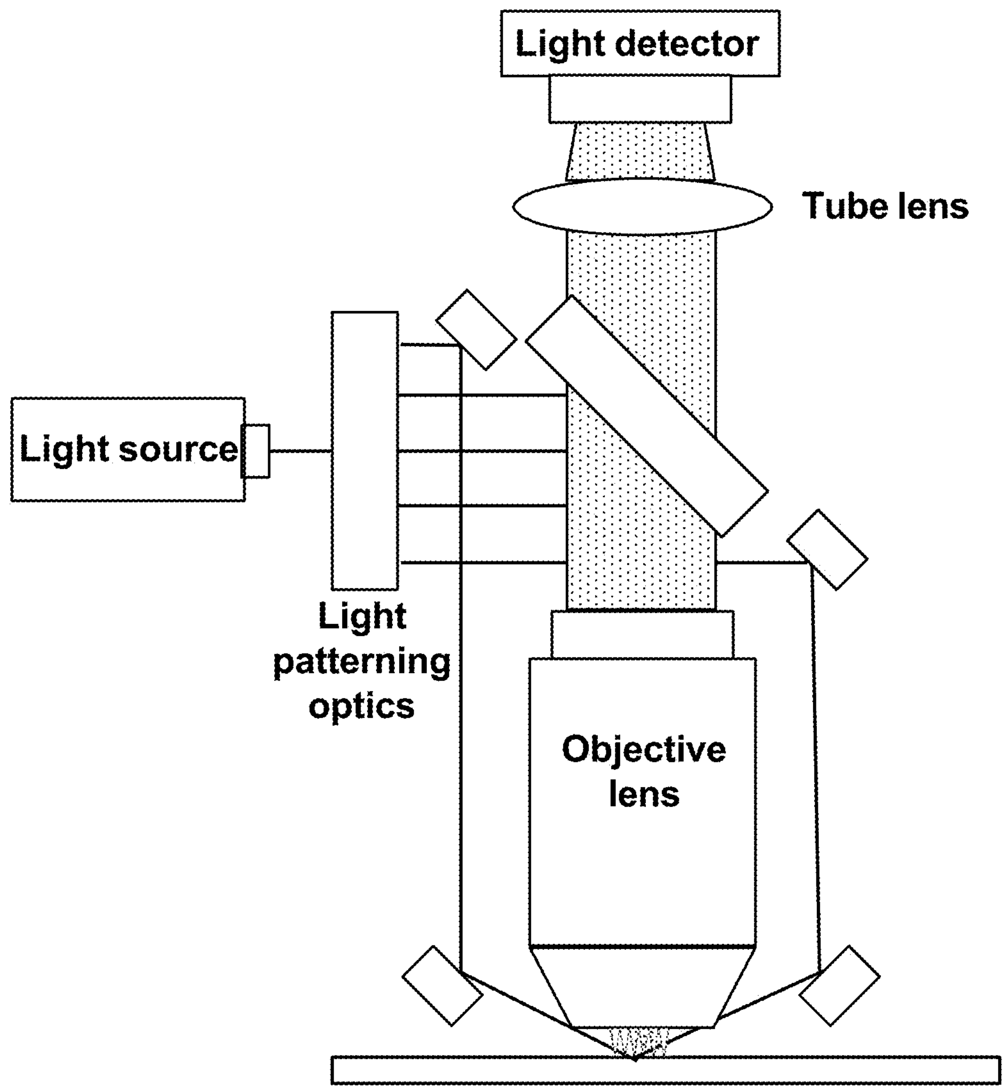
FIG. 26 shows a non-limiting schematic of an optical system for high-resolution optical readout.
Figure 27:
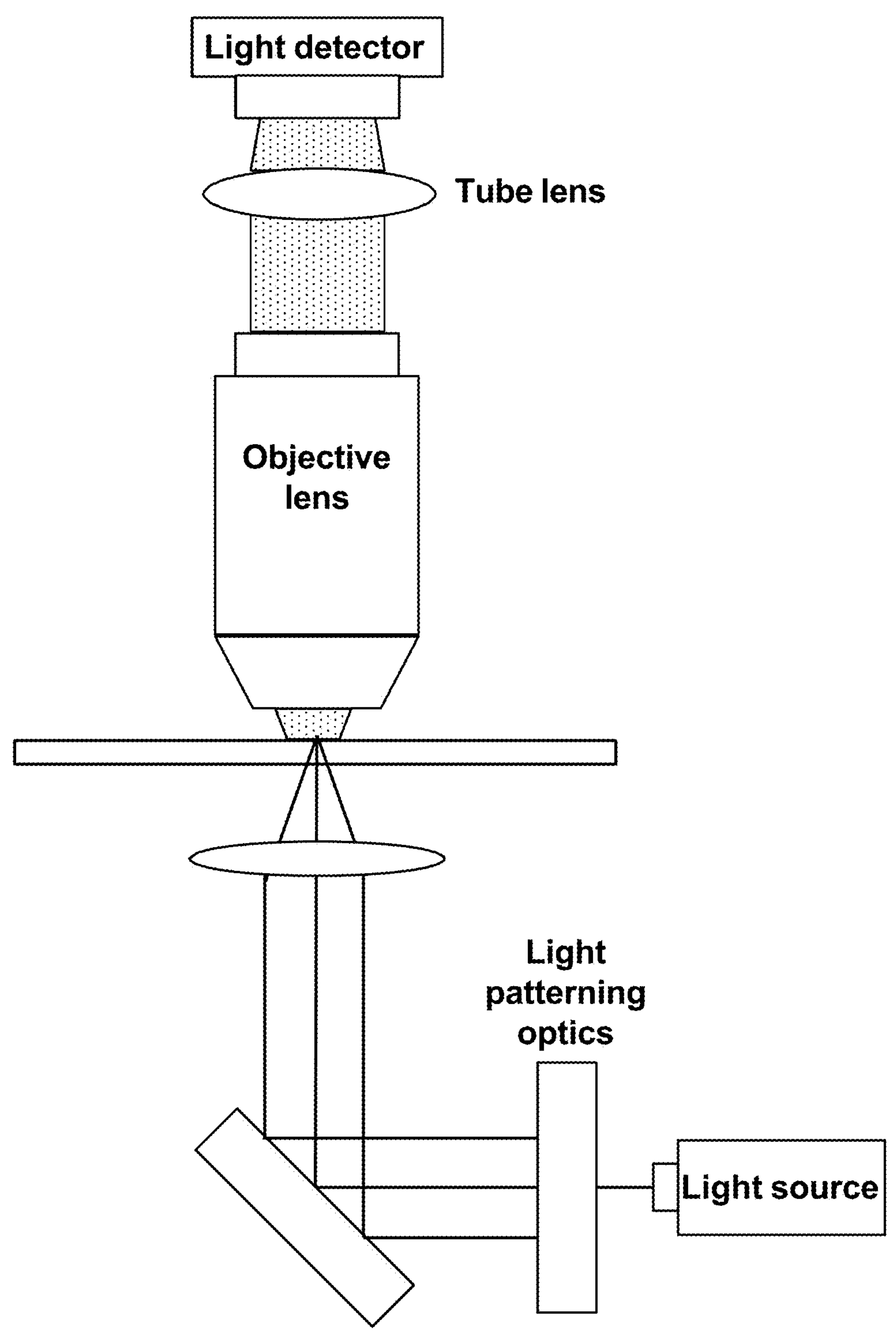
FIG. 27 shows a non-limiting schematic of an optical system for high-resolution optical readout.
Figure 28:
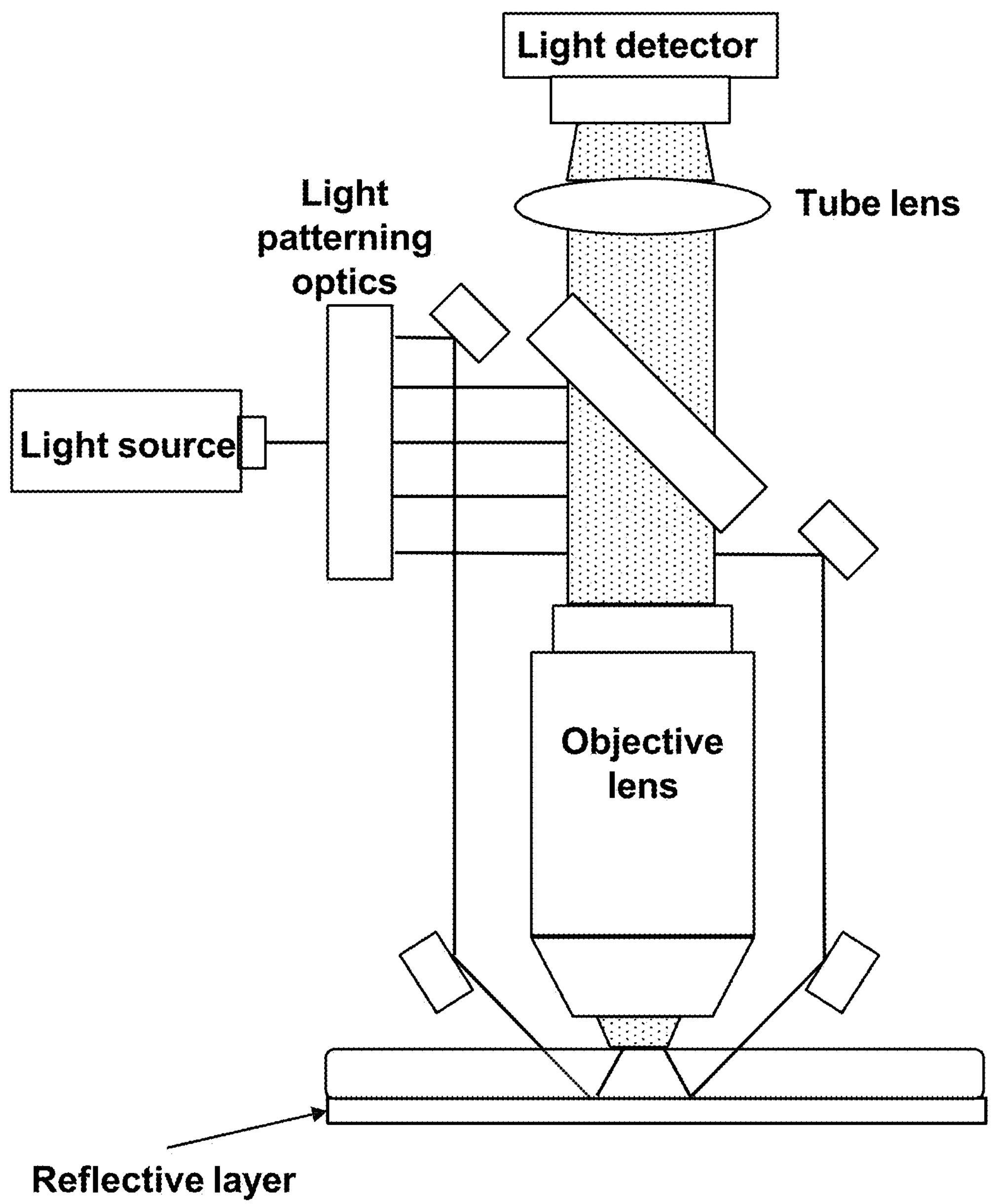
FIG. 28 shows a non-limiting schematic of an optical system for high-resolution optical readout.
Figure 29:
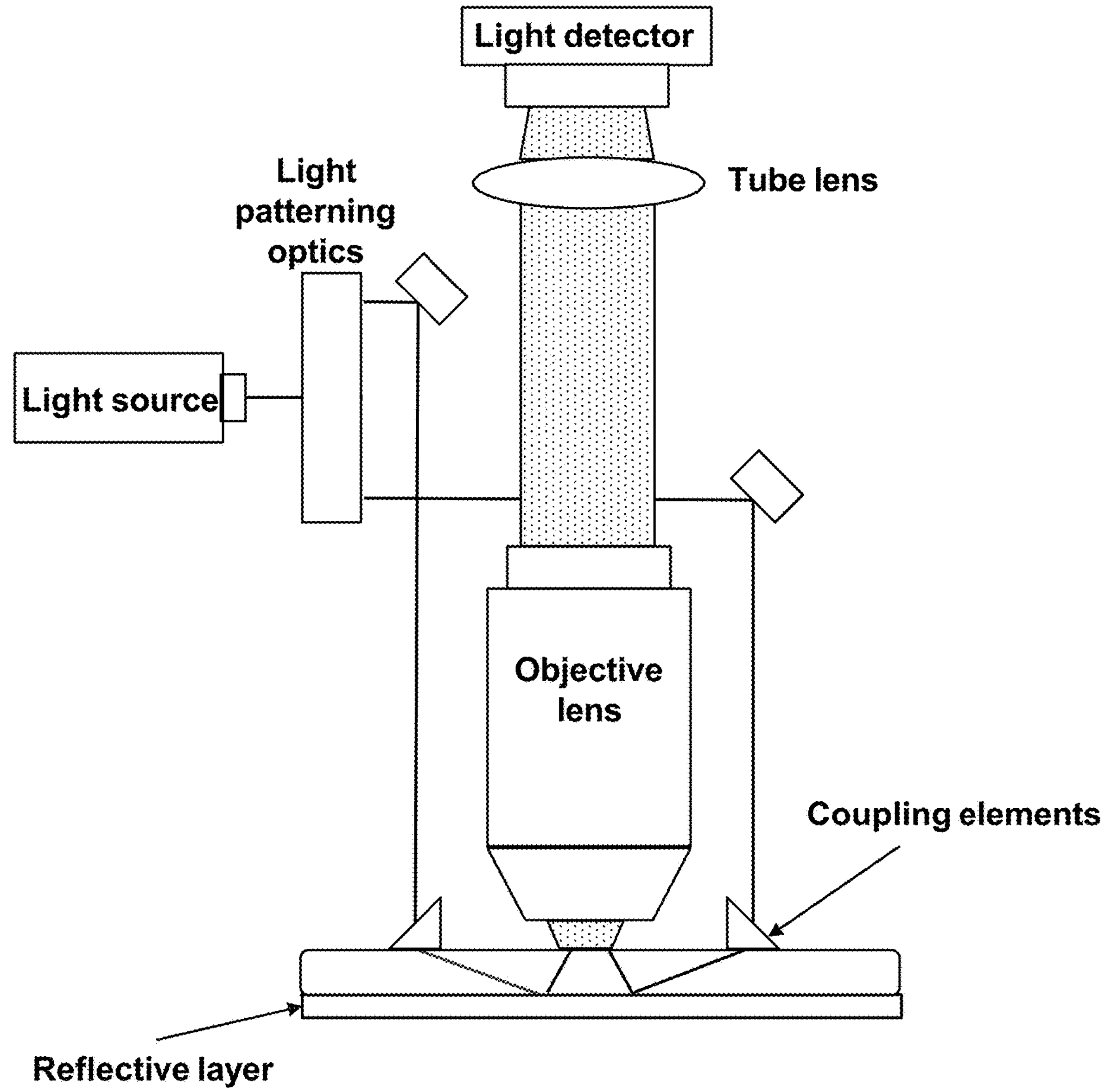
FIG. 29 shows a non-limiting schematic of an optical system for high-resolution optical readout.

Alternative configurations of the optical system include configurations to decrease the effective diffraction limit of the optical system, thereby increasing the resolution of the optical system, by increasing the effective numerical aperture of the system. One configuration to decrease the effective numerical aperture is direct components of the excitation light to the substrate from outside of the objective. This can be accomplished using mirrors other reflective elements, as shown in FIG. 26, or using prisms, as shown in FIG. 29. In another configuration, the excitation light is directed through the back side of the substrate (back-illumination) rather than through the fluid on the top of the substrate, as shown in FIG. 27. The higher refractive index of the substrate compared to the fluid enables the light to be directed to the surface of the substrate at wider angles relative, thereby increasing the effective numerical aperture. In another configuration, a reflective layer is added to the substrate reflect the light and direct it to the surface of the substrate at a wide angle, thereby increasing the effective numerical aperture (FIG. 28).

Figure 30:
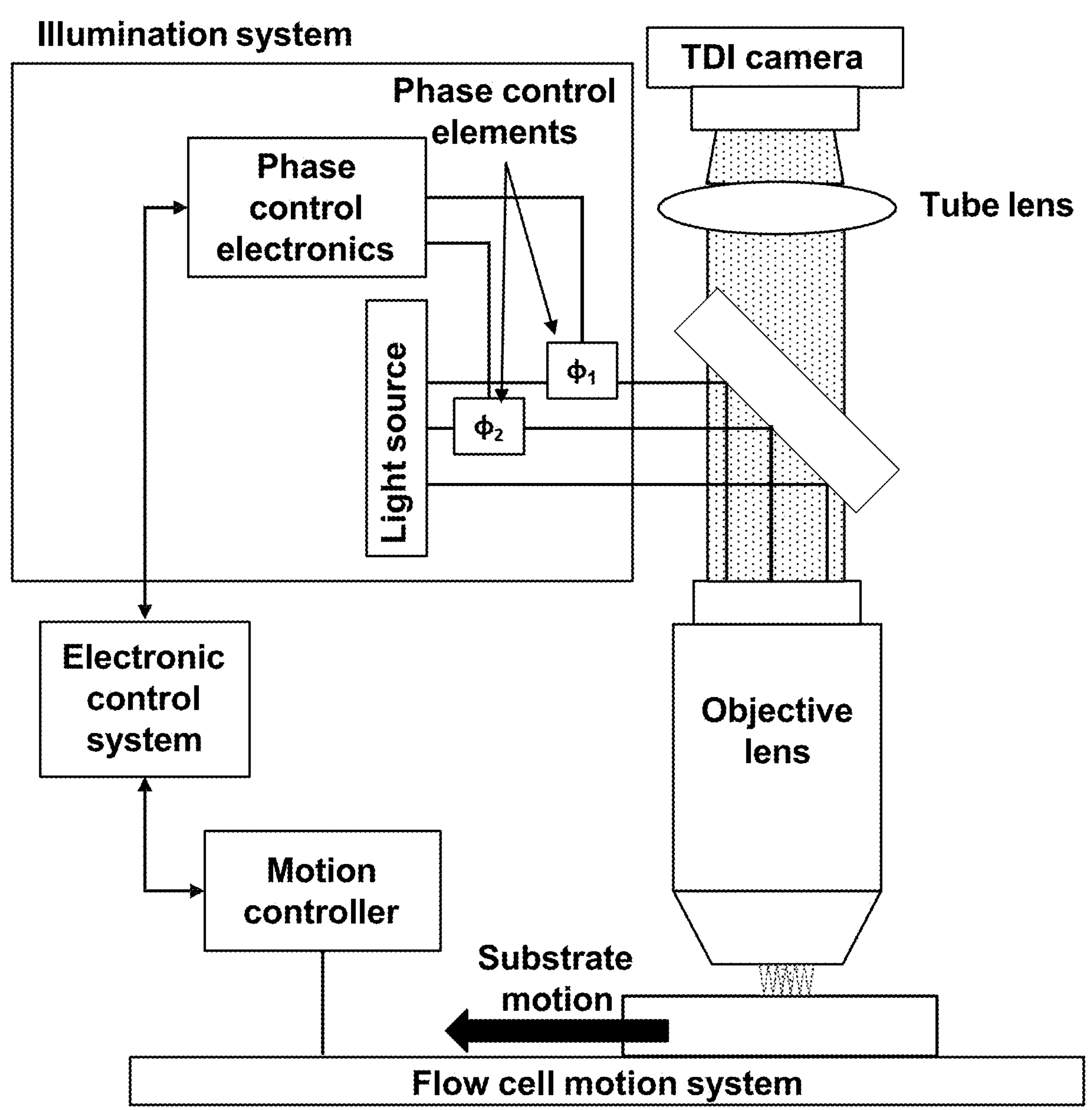
FIG. 30 shows a non-limiting schematic of an optical system for high-resolution optical readout.

In another configuration, a patterned illumination is generated using phase control elements. This is illustrated in FIG. 30 for an optical system where the substrate is moving. Phase control modulators create an interference pattern, exciting subsets of analyte binding sites on the substrate, and optical signals are detected from subset of sites. Optionally, the phase control modulators are free-space or fiber-coupled electro-optical modulators, acousto-optical modulators, liquid crystal phase retarders, or digital micro mirror devices. A feedback loop between the motion controller on the substrate, the electronic control system, the phase control electronics, and the phase control elements is configured adjust the position of the illumination patter based on the movement of the substrate.

Example 9

Photonic Structures for Enhanced Photon Collection Efficiency

Figures 31A, 31B, 31C:
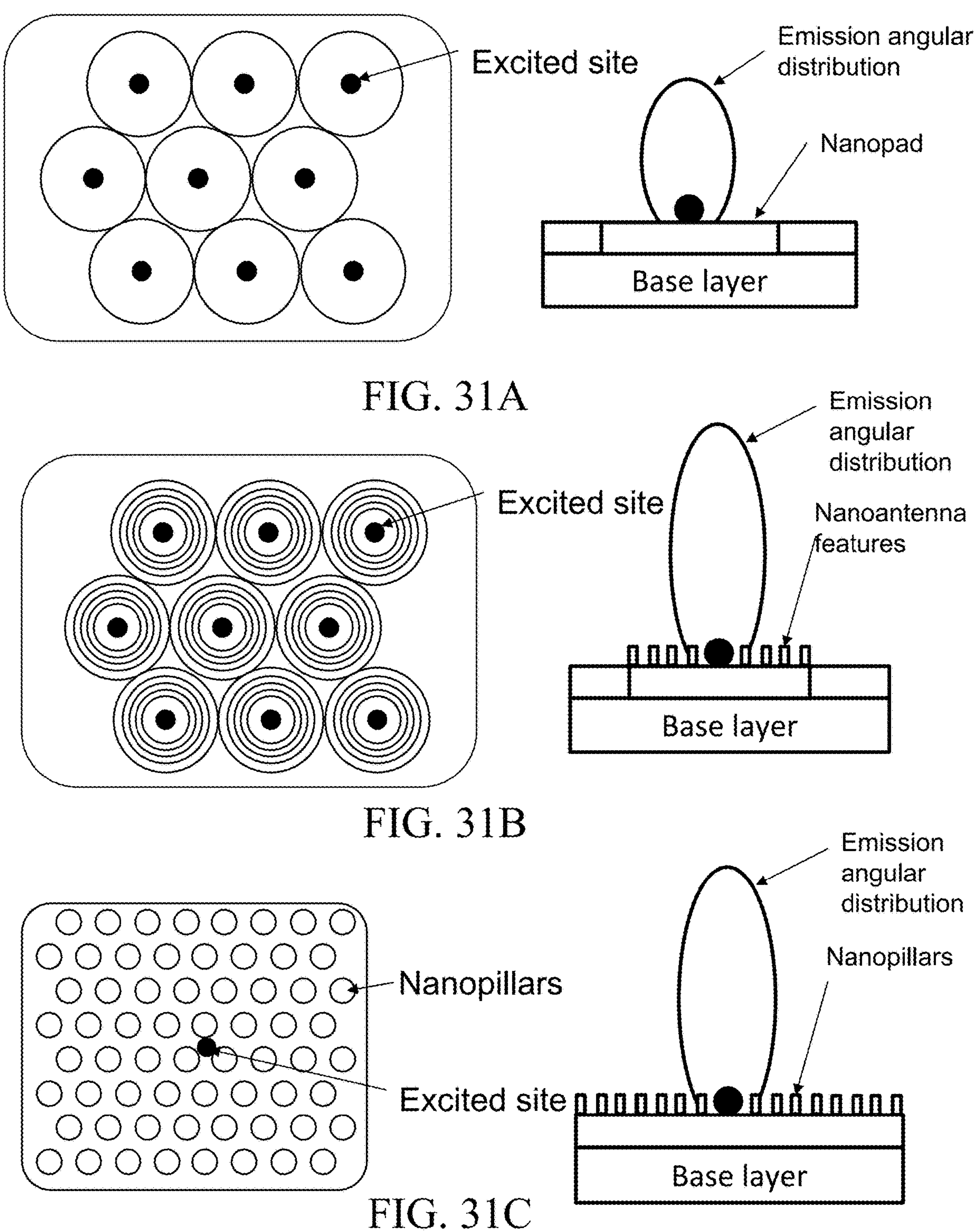
FIG. 31A shows non-limiting top-view and side-view schematics of a substrate for enhanced photon collection efficiency.
FIG. 31B shows non-limiting top-view and side-view schematics of a substrate for enhanced photon collection efficiency.
FIG. 31C shows non-limiting top-view and side-view schematics of a substrate for enhanced photon collection efficiency.

This example describes photonic structures that enhance the photon collection efficiency of an optical system. For substrates with high analyte-binding site density, analyte binding sites are small and, therefore, have small analyte-containing volumes. At very high densities, analyte binding sites are limited to a single fluorescent analyte molecule per binding site, resulting in low fluorescence emission intensity and low signal to noise ratios. While increasing excitation intensity can increase emission intensity to a point, this is limited by photodegradation and quantum yield of the fluorophore. Alternatively, increasing photon detection efficiency can increase the detection intensity. Photonic structures, as illustrated in FIG. 31A-FIG. 31C, are designed to direct a larger fraction of emitted photons to a detector, thereby increasing photon detection efficiency. The substrate is engineered to reshape the angular distribution of fluorescence emission to enable a higher collection efficiency with a give numerical aperture of the optical system. The local electromagnetic environment in the vicinity of individual analyte-binding sites in the array is structured to control the angular distribution of emission via near-field coupling between the emitter and the adjacent features on the substrate.

The substrate is engineered to reshape the angular distribution of the fluorescence emission in three optional ways. A first photonic structure configuration to reshape the angular distribution of the fluorescence emission includes analyte-binding sites arrayed on top of a nanopad with a nano mirror, as illustrated in FIG. 31A. The nanopad redirects emitted photons toward the detector that otherwise would not have reached the detector, thereby increasing photon detection efficiency. A second photonic structure configuration to reshape the angular distribution of the fluorescence emission includes analyte-binding sites between nanoantennae that reshape the emission light, as illustrated in FIG. 31B. The nanoantennae redirect emitted photons toward the detector that otherwise would not have reached the detector, thereby increasing photon detection efficiency. A third photonic structure configuration to reshape the angular distribution of the fluorescence emission includes analyte-binding sites surrounded by nanopillars, as illustrated in FIG. 31C. The nanopillars redirect emitted photons toward the detector that otherwise would not have reached the detector, thereby increasing photon detection efficiency. By increasing photon detection efficiency through angular distribution of the emission fluorescence, lower concentrations of analyte, such as single molecules, can be detected by an optical system with sufficiently high signal intensities, enabling higher analyte binding site densities, higher spatial resolution, and higher throughput of the optical system.

The following numbered clauses provide additional non-limiting aspects of the disclosure.

1. A substrate, comprising:
   - a plurality of predetermined locations configured to immobilize a plurality of analytes; and
   - a photonic structure that is configured to transform one or more illumination light beams of an illumination condition impinging thereon to provide excitation to a subset of the plurality of predetermined locations, whereby:
     - at a first illumination condition, a first subset of the plurality of predetermined locations is provided with a first range of excitation intensities that is higher than a predetermined excitation intensity threshold, wherein a remainder of the plurality of predetermined locations excluding the first subset is provided with a second range of excitation intensities lower than the predetermined excitation intensity threshold, and
     - at a second illumination condition, a second subset of the plurality of predetermined locations is provided with the first range of excitation intensities, wherein a remainder of the plurality of predetermined locations excluding the second subset is provided with the second range of excitation intensities; and
   - wherein the first illumination condition differs from the second illumination condition, and wherein the first subset differs from the second subset.
2. The substrate of clause 1, wherein the one or more illumination light beams of the illumination condition forms an intensity pattern, wherein the one or more illumination light beams comprise one or more predetermined characteristics selected from the group consisting of an angle of incidence, a wavelength, a spectrum, a polarization, a phase, an amplitude, an intensity, a power, an intensity distribution pattern, an interference pattern, a spatial, angular or spectral distribution of any of said predetermined characteristics, and a combination thereof.
3. The substrate of clause 1 or clause 2, wherein the illumination condition consists of a single light beam.
4. The substrate of clause 1 or clause 2, wherein the illumination condition comprises a plurality of light beams.
5. The substrate of any one of clauses 1-4, wherein the photonic structure comprises a plurality of features corresponding to the plurality of predetermined locations.
6. The substrate of any one of clauses 1-4, wherein the photonic structure comprises a plurality of features, and wherein the plurality of predetermined locations is different from locations of the plurality of features.
7. The substrate of any one of clauses 1-6, wherein the plurality of predetermined locations comprises a plurality of predefined analyte binding sites, and wherein each predefined analyte binding site comprises a binder for immobilizing an analyte.
8. The substrate of clause 7, wherein each predefined analyte binding site is spatially separated from other analyte binding sites of the plurality of predefined analyte binding sites.

9. The substrate of any one of clauses 7-8, wherein each predefined analyte binding site is smaller than 10 micrometers (μm) in its longest dimension.
10. The substrate of any one of clauses 7-9, wherein each predefined analyte binding site is larger than 0.01 μm in its smallest dimension.
11. The substrate of any one of clauses 7-10, wherein a predefined analyte binding site of the plurality of predefined analyte binding sites has a cross-sectional shape of a circle, a square, a rectangle, a line, an oval, a trapezoid, a polygon, or an irregular shape.
12. The substrate of any one of cl clauses 7-11, wherein a predefined analyte binding site of the plurality of predefined analyte binding sites comprises a pad, trough, protrusion, or well configured to immobilize an analyte thereon.
13. The substrate of any one of clauses 7-12, wherein a predefined analyte binding site of the plurality of predefined analyte binding sites has an affinity for the analyte.
14. The substrate of any one of clauses 7-13, wherein a predefined analyte binding site of the plurality of predefined analyte binding sites has an analyte-binding surface that confers an affinity for the analyte.
15. The substrate of any one of clauses 7-14, wherein a predefined analyte binding site of the plurality of predefined analyte binding sites comprises a chemical modification.
16. The substrate of any one of clauses 7-15, wherein a predefined analyte binding site comprises a material having an electrostatic charge.
17. The substrate of any one of clauses 1-16, wherein the plurality of predetermined locations is configured to immobilize at least $10^6$, at least $10^7$, at least $10^8$, at least $10^9$, at least $10^{10}$, at least $10^{11}$, at least $10^{12}$, at least $10^{13}$, or at least $10^{14}$ analytes or clusters thereon.
18. The substrate of any one of clauses 1-17, wherein the photonic structure comprises a material having a predetermined refractive index, wherein the material is selected from the group consisting of a metal, a dielectric material, a semiconductor, and a combination thereof.
19. The substrate of clause 18, wherein the metal comprises aluminum, gold, platinum, copper, or titanium.
20. The substrate of clause 18, wherein the dielectric material comprises glass, mica, quartz, fused silica, a polymer material, an organic material, a photoresist material, a ceramic material, or a metal oxide.
21. The substrate of any one of clauses 1-20, wherein the photonic structure comprises a layered structure, a nanopillar array, a nanowell array, a planar waveguide, an optical antenna array, a nanoantenna array, a reflective underlayer, a diffraction grating, a waveguide, a photonic crystal, or a combination thereof.
22. The substrate of clause 21, wherein the planar waveguide is configured to propagate a guided wave or a surface plasmon wave to the predetermined locations.
23. The substrate of any one of clauses 1-22, further comprising one or more additional layers, wherein a layer of the one or more additional layers has a different material than the photonic structure.
24. The substrate of any one of clauses 1-23, wherein the photonic structure is integral to the plurality of predetermined locations, is layered on top of the plurality of predetermined locations, is layered under the plurality of predetermined locations, or is in contact with the plurality of predetermined locations.
25. The substrate of any one of clauses 1-24, the substrate having a largest dimension between 0.1 mm and 0.5 m.
26. The substrate of any one of clauses 1-25, the substrate having a smallest dimension between 0.1 mm and 0.5 m.
27. The substrate of any one of clauses 1-26, wherein the total surface area of the substrate is between 0.1 $mm^2$ to 0.2 $m^2$.
28. The substrate of any one of clauses 1-27 wherein the photonic structure occupies 5% to 100% of the total surface area of the substrate.
29. The substrate of any one of clauses 1-28, the substrate having a depth between 0.1 mm and 50 mm, and wherein the photonic structure spans between 1% to 100% of the full depth.
30. The substrate of any one of clauses 1-29, wherein the photonic structure occupies 0.1% to 100% of the total volume of the substrate.
31. The substrate of any of clauses 1-30, wherein the photonic structure is patterned on the substrate.
32. The substrate of any one of clauses 1-31, wherein the photonic structure comprises a first plurality of features.
33. The substrate of clause 32, wherein the photonic structure further comprises a second plurality of features.
34. The substrate of clause 33, wherein features of the first or second plurality of features are arranged in a periodic pattern.
35. The substrate of any one of clauses 33-34, wherein the first or second plurality of features is embedded in, coated onto, etched into, or in contact with the plurality of predetermined locations.
36. The substrate of any one of clauses 33-35, wherein the first or second plurality of features comprises a planar waveguide, a diffraction grating, or a photonic crystal.
37. The substrate of any one of clauses 33-36, wherein the first or second plurality of features comprises one or more layers, each of the layers comprising a diffraction grating.
38. The substrate of any one of clauses 33-37, wherein features in the first plurality of features comprise layers separated by a first pitch between 0.1 μm and 10 μm, between 0.2 μm and 5 μm, between 0.3 μm and 3 μm, between 0.5 μm and 2 μm, between 0.7 μm and 1.5 μm, between 0.8 μm and 1.3 μm, or between 0.9 μm and 1.2 μm.
39. The substrate of clause 38, wherein features in the second plurality of features comprise layers separated by a second pitch that is an integer multiple of the first pitch.
40. The substrate of any one of clause 1-39, wherein the first subset and the second subset comprise approximately the same number of predetermined locations.
41. The substrate of any one of clauses 1-40, wherein the first subset and the second subset overlap at under 90%, 80%, 70%, 60%, 50%, 40%, 30%, 20%, 10%, 5%, or 1% of the plurality of predetermined locations.
42. The substrate of any one of clauses 1-41, wherein the first subset forms a first periodic arrangement.
43. The substrate of any one of clauses 1-42, wherein the second subset forms a second periodic arrangement.
44. The substrate of clause 42 or clause 43, wherein a pitch of the first or second periodic arrangement is less than a predetermined threshold pitch selected from the group consisting of 2 μm, 1 μm, 800 nm, 600 nm, 500 nm, 400 nm, 300 nm, 200 nm, and 100 nm.

45. The substrate of any one of clauses 1-44, wherein two adjacent predetermined locations of the first subset of the plurality of predetermined locations have a center-to-center distance smaller than 5 μm.
46. The substrate of any one of clauses 1-45, wherein two adjacent predetermined locations of the second subset of the plurality of predetermined locations have a center-to-center distance smaller than 5 μm.
47. The substrate of any one of clauses 1-46, wherein two adjacent predetermined locations of the first subset of the plurality of predetermined locations have a center-to-center distance larger than 100 nm.
48. The substrate of any one of clauses 1-47, wherein two adjacent predetermined locations of the second subset of the plurality of predetermined locations have a center-to-center distance larger than 100 nm.
49. The substrate of any one of clauses 1-48, wherein each pair of predetermined locations in the first subset or second subset of the plurality of predetermined locations has a center-to-center distance between 125 nm and 500 nm, between 150 nm and 400 nm, between 175 nm and 300 nm, or between 200 nm and 250 nm.
50. A system, comprising:

a substrate comprising:

a plurality of predetermined locations configured to immobilize a plurality of analytes; and a photonic structure that is configured to transform one or more illumination light beams of an illumination condition impinging thereon to provide excitation to a subset of the plurality of predetermined locations, whereby:

at a first illumination condition, a first subset of the plurality of predetermined locations is provided with a first range of excitation intensities that is higher than a predetermined excitation intensity threshold, wherein a remainder of the plurality of predetermined locations excluding the first subset is provided with a second range of excitation intensities lower than the predetermined excitation intensity threshold, and at a second illumination condition, a second subset of the plurality of predetermined locations is provided with the first range of excitation intensities, wherein a remainder of the plurality of predetermined locations excluding the second subset is provided with the second range of excitation intensities; and wherein the first illumination condition differs from the second illumination condition, and wherein the first subset differs from the second subset.

51. The system of clause 50, further comprising an illumination unit and one or more processors in operable communication with the illumination unit, wherein the one or more processors are configured to direct the illumination unit to provide predetermined illumination conditions to the substrate.
52. The system of clause 51, wherein the illumination unit comprises one or more optics components selected from the group consisting of: light patterning optics, a microlens array, a phase control element, a prism, a reflective surface, and combinations thereof.
53. The system of any one of clauses 51-52, further comprising one or more data storage devices in operable communication with the one or more processors, wherein the one or more data storage devices store a plurality of configuration instructions of the illumination unit corresponding to the predetermined illumination conditions.
54. The system of any one of clauses 51-53, further comprising a detector in optical communication with the substrate, wherein the detector is configured to detect one or more signals from the substrate.
55. The system of any one of clauses 51-54, further comprising a fluidics unit in operable communication with the one or more processors, wherein the one or more processors are configured to direct the fluidics unit to dispense a reagent to the substrate to contact an analyte of the plurality of analytes.
56. The system of clause 55, wherein the reagent is a sequencing reagent.
57. The system of any one of clauses 51-56, further comprising an actuator operably coupled to the substrate or to the illumination unit, configured to change an excitation pattern produced by the illumination condition on the substrate.
58. The system of any one of clauses 50-57, wherein the substrate is rotatable.
59. A method, comprising:

a. providing a substrate comprising (i) a plurality of predetermined locations comprising a plurality of analytes immobilized thereto and (ii) a photonic structure that is configured to transform one or more illumination light beams of an illumination condition impinging thereon to provide excitation to a subset of the plurality of predetermined locations;

b. at a first time point, receiving a first illumination condition by the substrate and, via transformation of one or more first illumination light beams of the first illumination condition by the photonic structure, providing a first subset of the plurality of predetermined locations with a first range of excitation intensities that is higher than a predetermined excitation intensity threshold, wherein a remainder of the plurality of predetermined locations excluding the first subset is provided with a second range of excitation intensities lower than the predetermined excitation intensity threshold; and c. at a second time point, receiving a second illumination condition by the substrate and, via transformation of one or more second illumination light beams of the second illumination condition by the photonic structure, providing a second subset of the plurality of predetermined locations with the first range of excitation intensities, wherein a remainder of the plurality of predetermined locations excluding the second subset is provided with the second range of excitation intensities, wherein the first illumination condition differs from the second illumination condition, and wherein the first subset differs from the second subset.

60. The method of clause 59, further comprising generating the photonic structure on the substrate via a lithography method.
61. The method of clause 60, wherein the lithography method comprises etching, reactive (and deep reactive) ion etching, ion milling, spin-coating, ink-jetting, dip pen nanolithography, contact printing, grayscale lithography, holographic (or interference) lithography, plasma etching, wet etching, chemical vapor deposition, atomic layer deposition (ALD), photolithography, contact photolithography, nanoimprint lithography (NIL), extreme ultraviolet lithography, electron beam lithography, focused ion beam lithography, plasmonic direct write lithography, direct write laser lithography, multiple e beam lithography, i-line stepper/scanner lithography, deep ultraviolet (DUV) lithography, extreme ultraviolet (EUV) lithography, X-ray lithography, micro/nano molding, injection compression molding, hot embossing, or a combination thereof.

62. The method of any one of clauses 59-61, further comprising, subsequent to (b), detecting first optical signals from a first subset of the plurality of analytes immobilized at the first subset of the plurality of predetermined locations, and subsequent to (c), detecting second optical signals from a second subset of the plurality of analytes immobilized at the second subset of the plurality of predetermined locations.

63. The method of clause 62, further comprising generating an optical readout based on the first optical signals and the second optical signals.

64. The method of any one of clauses 62-63, wherein the first optical signals or second optical signals are fluorescent signals.

65. The method of any one of clauses 62-64, wherein the first optical signals and second optical signals are detected at identical or substantially identical wavelengths.

66. The method of any one of clauses 62-64, wherein the first optical signals and second optical signals are detected at different wavelengths.

67. The method of any one of clauses 63-66, further comprising redistributing an emission angle of the first optical signals via the photonic structure, thereby enhancing the optical readout.

68. The method of any one of clauses 62-67, wherein the plurality of analytes comprises a nucleic acid molecule, and further comprising processing the first optical signals and the second optical signals to generate a sequencing read of the nucleic acid molecule.

69. The method of any one of clauses 62-68, further comprising rotating the substrate while detecting signals from the substrate.

70. The method of any one of clauses 59-69, wherein the substrate comprises the substrate of any one of clauses 1-49.

71. The method of any one of clauses 59-70, wherein the method is performed using the system of any one of clauses 50-58.

72. The method of any one of clauses 59-71, wherein the first time point and the second time point are the same.

73. The method of any one of clauses 59-72, wherein the first time point and the second time point are different.

74. The method of any one of clauses 59-73, wherein the plurality of analytes comprises a plurality of biological analytes.

75. The method of clause 74, wherein the plurality of biological analytes comprises a plurality of nucleic acid molecules.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A substrate, comprising:

a plurality of predetermined locations in or on a surface of the substrate, the predetermined locations configured to immobilize a plurality of analytes; and a photonic structure that is configured to transform one or more illumination light beams of an illumination condition impinging thereon to provide excitation to a subset of the plurality of predetermined locations, whereby:

at a first illumination condition, a first subset of the plurality of predetermined locations is provided with a first range of excitation intensities that is higher than a predetermined excitation intensity threshold, wherein a remainder of the plurality of predetermined locations excluding the first subset is provided with a second range of excitation intensities lower than the predetermined excitation intensity threshold, and at a second illumination condition, a second subset of the plurality of predetermined locations is provided with the first range of excitation intensities, wherein a remainder of the plurality of predetermined locations excluding the second subset is provided with the second range of excitation intensities; and wherein the first illumination condition differs from the second illumination condition, and wherein the first subset differs from the second subset.

2. The substrate of claim 1, wherein the plurality of predetermined locations comprises a plurality of predefined analyte binding sites each at a corresponding one of the predetermined locations.

3. The substrate of claim 2, wherein each predefined analyte binding site is spatially separated from other analyte binding sites of the plurality of predefined analyte binding sites.

4. The substrate of claim 2, wherein each predefined analyte binding site is smaller than 10 micrometers (μm) in its longest dimension.

5. The substrate of claim 2, wherein each predefined analyte binding site is larger than 0.01 μm in its smallest dimension.

6. The substrate of claim 1, wherein the first subset of predetermined locations and the second subset of predetermined locations are interleaved, with predetermined locations of the first subset and predetermined locations of the second subset adjacent to each other.

7. The substrate of claim 6, wherein the first subset of predetermined locations forms a periodic arrangement, and the second subset of predetermined locations forms a periodic arrangement.

8. The substrate of claim 7, wherein nearest neighbor predetermined locations of the first subset of the plurality of predetermined locations have a center-to-center distance smaller than 5 μm and nearest neighbor predetermined locations of the second subset of the plurality of predetermined locations have a center-to-center distance smaller than 5 μm.

9. The substrate of claim 8, wherein nearest neighbor predetermined locations of the first subset of the plurality of predetermined locations have a center-to-center distance between 125 nm and 500 nm, between 150 nm and 400 nm, between 175 nm and 300 nm, or between 200 nm and 250 nm and nearest neighbor predetermined locations of the second subset of the plurality of predetermined locations have a center-to-center distance between 125 nm and 500 nm, between 150 nm and 400 nm, between 175 nm and 300 nm, or between 200 nm and 250 nm.

10. The substrate of claim 1, wherein:

the one or more illumination light beams comprise one or more predetermined characteristics selected from the group consisting of an angle of incidence, a wavelength, a spectrum, a polarization, a phase, an amplitude, an intensity, a power, an intensity distribution pattern, an interference pattern, a spatial, angular or spectral distribution of any of said predetermined characteristics, and a combination thereof; and the photonic structure is configured to transform the one or more illumination light beams to provide excitation to one of the subsets of the plurality of predetermined locations based on the one or more predetermined characteristics.

11. The substrate of claim 1, wherein the illumination condition consists of a single light beam.

12. The substrate of claim 1, wherein the illumination condition comprises a plurality of light beams.

13. The substrate of claim 1, wherein the photonic structure comprises a layered structure, a nanopillar array, a nanowell array, a planar waveguide, an optical antenna array, a nanoantenna array, a reflective underlayer, a diffraction grating, a waveguide, a photonic crystal, or a combination thereof.

14. The substrate of claim 13, wherein the planar waveguide is configured to propagate a guided wave or a surface plasmon wave to the predetermined locations.

15. The substrate of claim 1, wherein the photonic structure comprises a first plurality of features arranged in a periodic pattern in or on the surface of the substrate.

16. The substrate of claim 15, wherein the photonic structure comprises a second plurality of features disposed in the substrate and arranged in a periodic pattern to form a diffraction grating.

17. The substrate of claim 16, wherein the spacing between adjacent features of the second plurality of features is an integer multiple of the spacing between adjacent features of the first plurality of features.

18. The substrate of claim 15, wherein the photonic structure comprises a second plurality of features disposed in or on the surface of the substrate peripheral to the first plurality of features and configured to propagate a guided wave or a surface plasmon wave to the predetermined locations.

19. The substrate of claim 18 comprising planar structures on which the first plurality of features is arranged, the planar structures configured to support propagation of the guided wave or surface plasmon.

20. The substrate of claim 1, wherein the photonic structure comprises features configured to enhance optical emission from analytes located at the predetermined locations.

* * * * *